United States Patent
Zwimpfer et al.

(10) Patent No.: US 10,869,740 B2
(45) Date of Patent: Dec. 22, 2020

(54) FLOSSER

(71) Applicant: TRISA HOLDING AG, Triengen (CH)

(72) Inventors: Martin Zwimpfer, Lucerne (CH); Roger Kirchhofer, Reitnau (CH)

(73) Assignee: TRISA HOLDING AG, Triengen (CH)

( * ) Notice: Subject to any disclaimer, the term of this patent is extended or adjusted under 35 U.S.C. 154(b) by 137 days.

(21) Appl. No.: 14/785,177

(22) PCT Filed: Apr. 10, 2014

(86) PCT No.: PCT/CH2014/000046
§ 371 (c)(1),
(2) Date: Oct. 16, 2015

(87) PCT Pub. No.: WO2014/169398
PCT Pub. Date: Oct. 23, 2014

(65) Prior Publication Data
US 2016/0067021 A1   Mar. 10, 2016

(30) Foreign Application Priority Data
Apr. 16, 2013 (EP) ...................................... 13405046

(51) Int. Cl.
*A61C 15/04* (2006.01)
*A61C 15/02* (2006.01)

(52) U.S. Cl.
CPC ............ *A61C 15/046* (2013.01); *A61C 15/02* (2013.01)

(58) Field of Classification Search
CPC ....... A61C 15/02; A61C 15/04; A61C 15/046; A61C 15/048
See application file for complete search history.

(56) References Cited

U.S. PATENT DOCUMENTS

| 5,829,458 | A | * | 11/1998 | Chodorow | ........... | A61C 15/046 |
| | | | | | | 132/323 |
| 6,003,525 | A | | 12/1999 | Katz | | |
| 7,997,287 | B2 | * | 8/2011 | Jansheski | ............ | A61C 15/046 |
| | | | | | | 132/323 |
| 8,069,865 | B1 | * | 12/2011 | Winter | ................ | A61C 15/046 |
| | | | | | | 132/323 |
| 2004/0040572 | A1 | * | 3/2004 | Chodorow | ........... | A61B 17/244 |
| | | | | | | 132/323 |

(Continued)

FOREIGN PATENT DOCUMENTS

| CN | 201558187 U | 8/2010 |
| EP | 2204140 A1 | 7/2010 |

(Continued)

OTHER PUBLICATIONS

Aug. 4, 2014 Search Report issued in International Patent Application No. PCT/CH2014/000046.

(Continued)

*Primary Examiner* — Rachel R Steitz
*Assistant Examiner* — Brianne E Kalach
(74) *Attorney, Agent, or Firm* — Oliff PLC

(57) ABSTRACT

A flosser that includes a gripping element, a retainer that is connected to the gripping element and has a first and a second retainer arm and an interdental cleaning element which is secured to the first and second retainer arms and extends between the two retainer arms.

7 Claims, 25 Drawing Sheets

(56) References Cited

U.S. PATENT DOCUMENTS

Figure 9A:
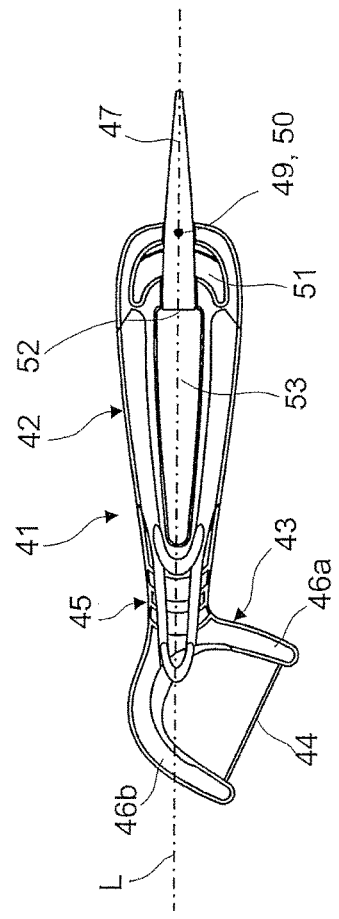

| | | | | |
|---|---|---|---|---|
| 2008/0149134 A1* | 6/2008 | Crossman | ............ | A61C 15/046 132/324 |
| 2011/0132392 A1* | 6/2011 | Crisp | ................ | A46B 15/0055 132/309 |
| 2012/0111348 A1* | 5/2012 | Prokopchuk | ......... | A61C 15/046 132/200 |
| 2013/0048012 A1 | 2/2013 | Lin | | |

FOREIGN PATENT DOCUMENTS

| | | |
|---|---|---|
| FR | 552552 A | 5/1923 |
| WO | 88/07354 A1 | 10/1988 |
| WO | 2012/116451 A1 | 9/2012 |

OTHER PUBLICATIONS

Oct. 20, 2015 International Preliminary Report on Patentability issued in International Patent Application No. PCT/CH2014/000046.

\* cited by examiner

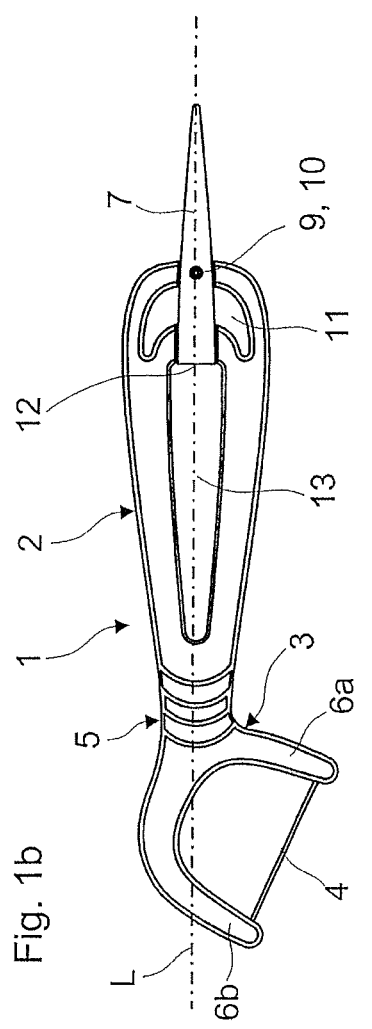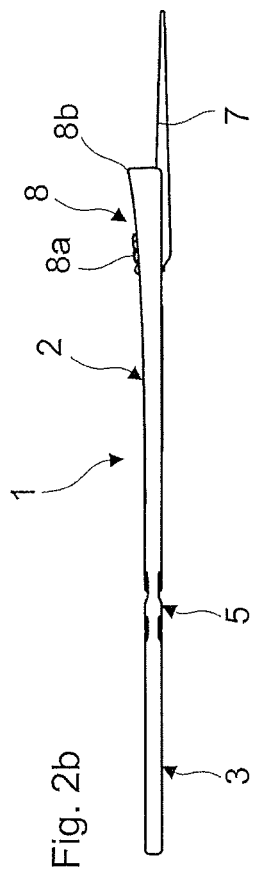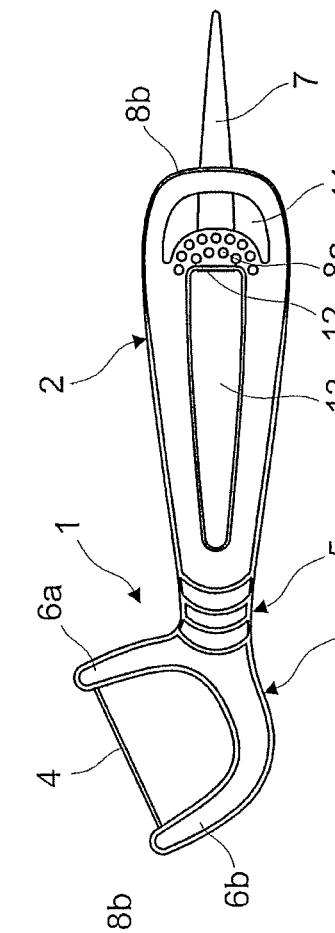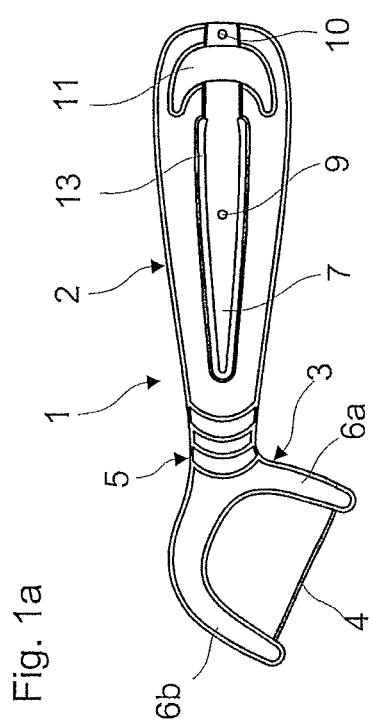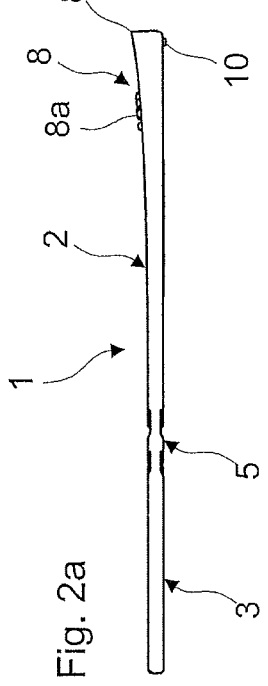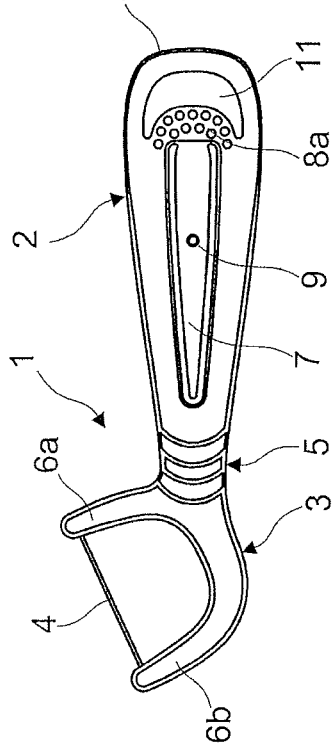

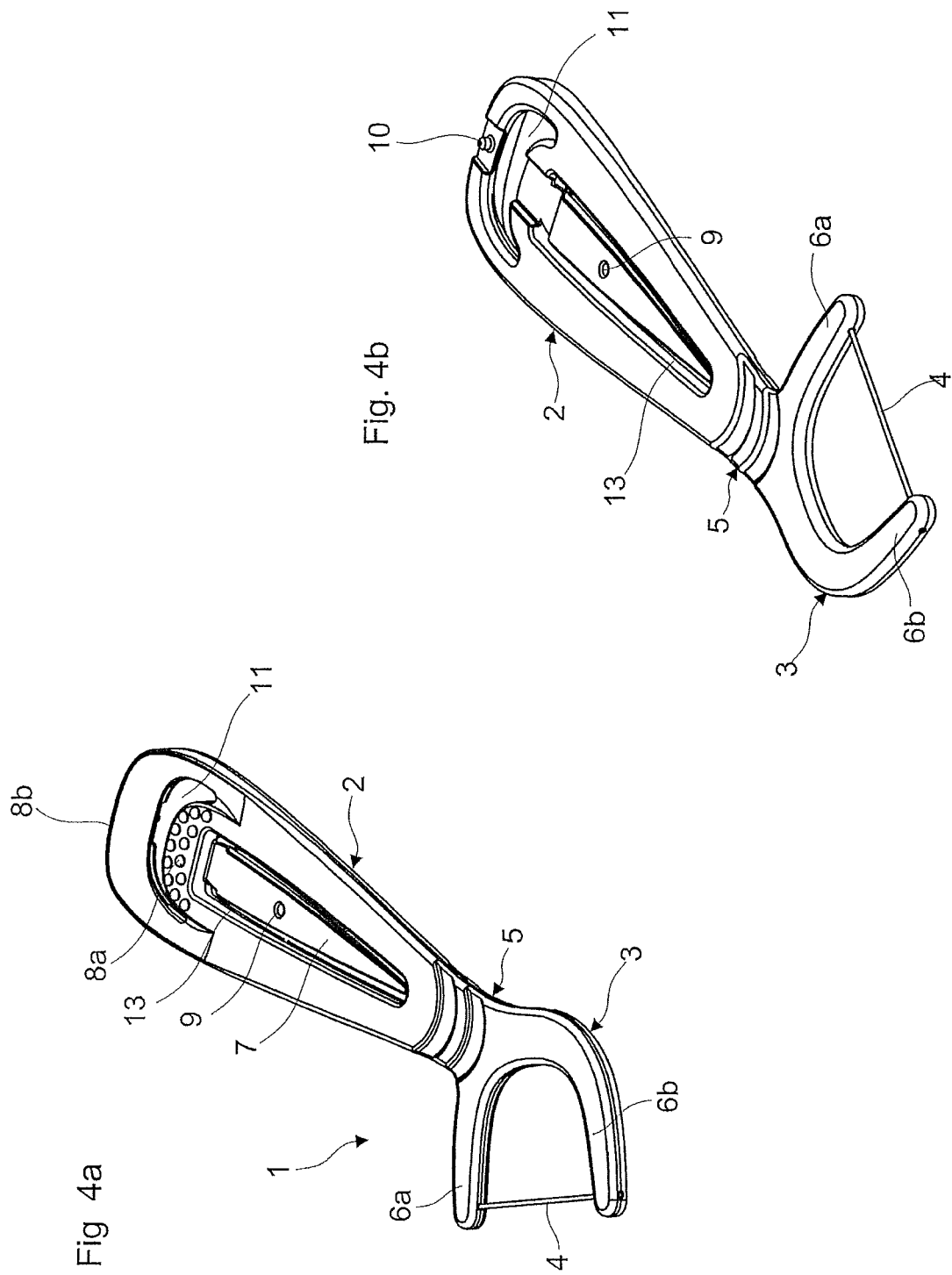

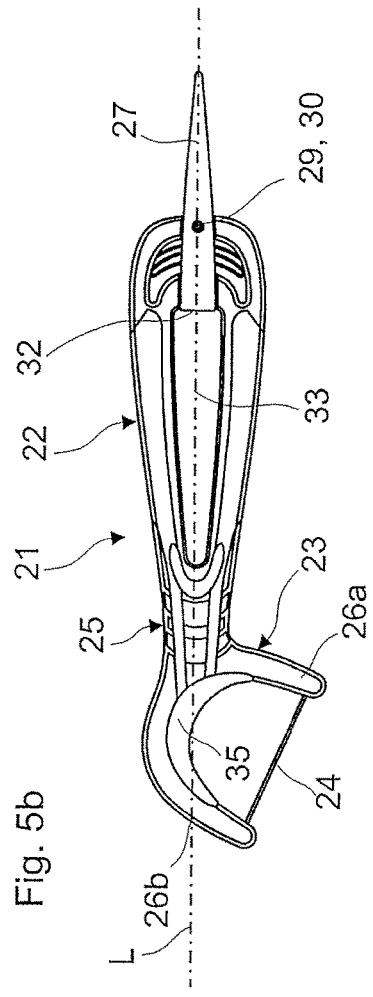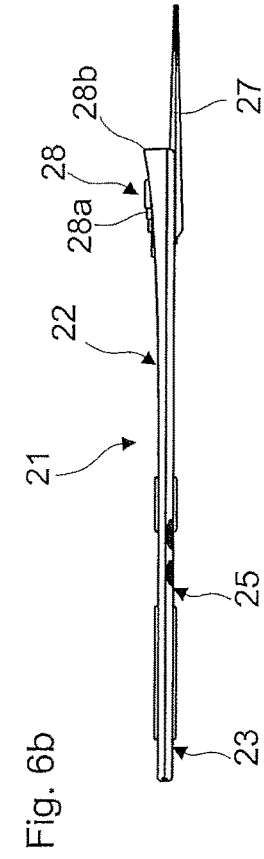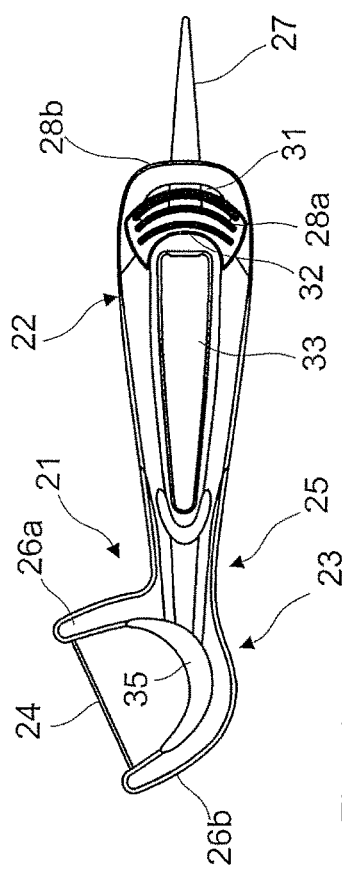
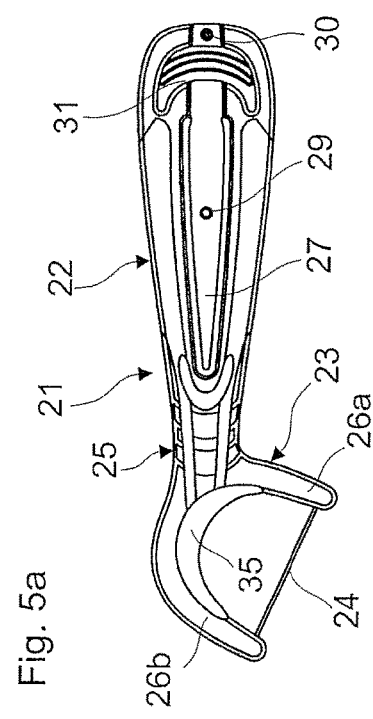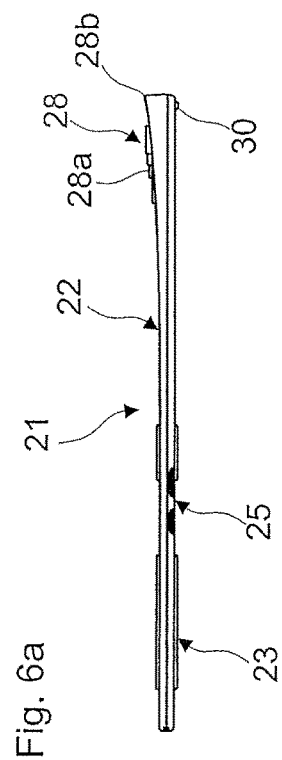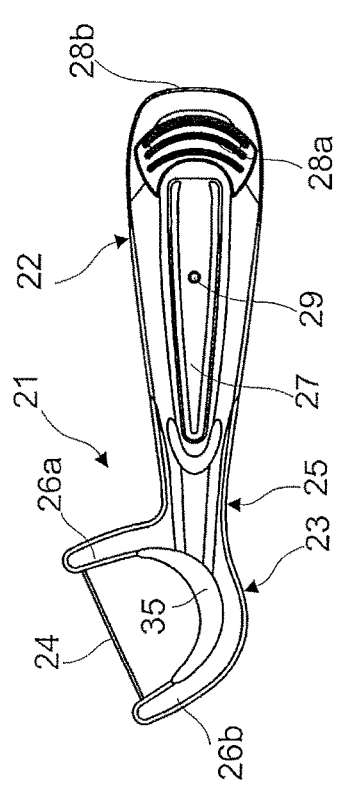

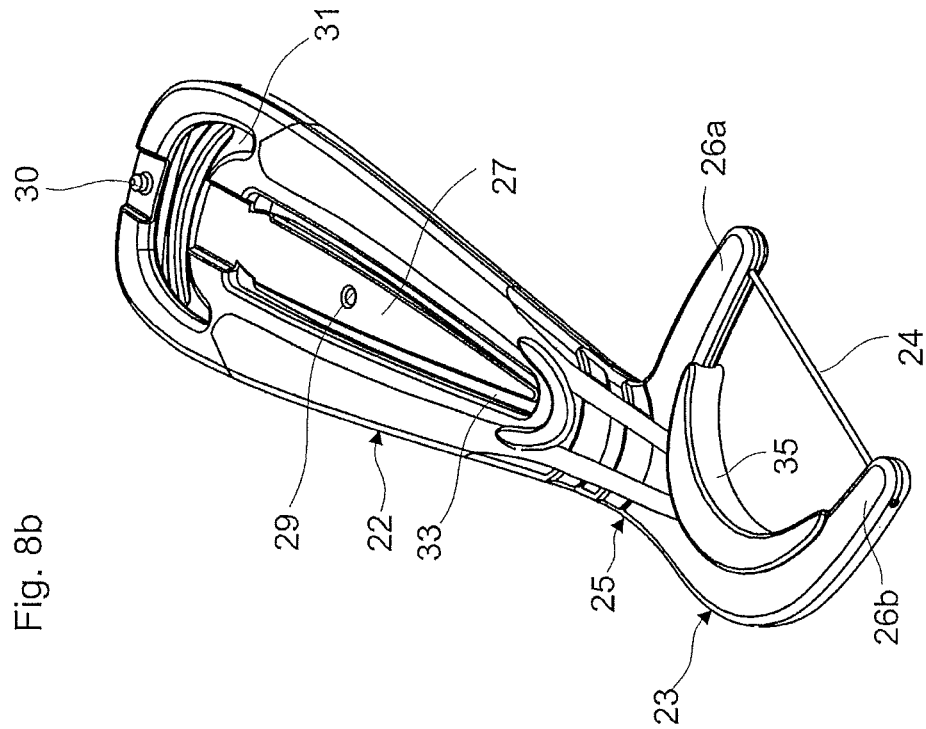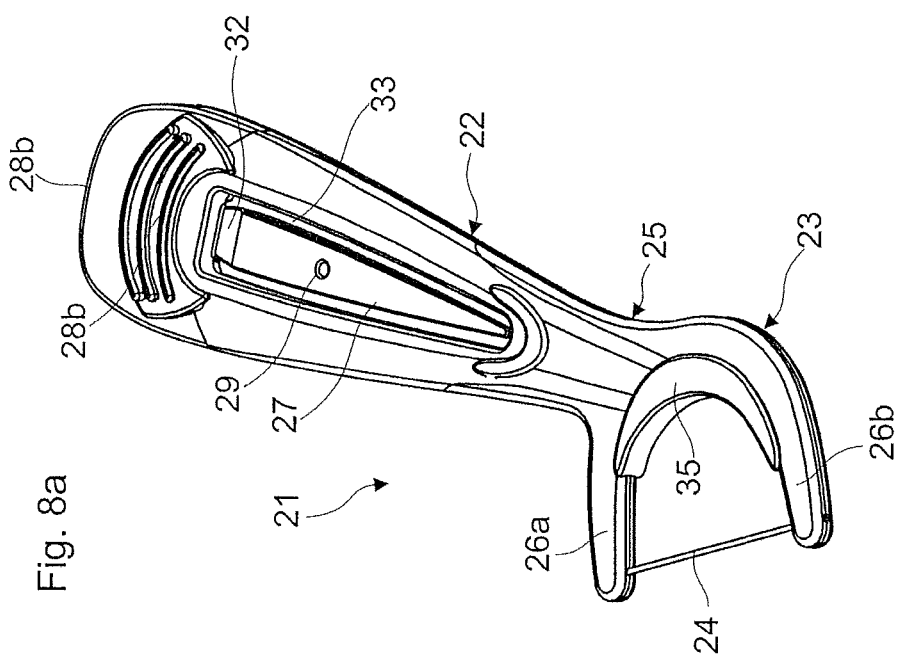

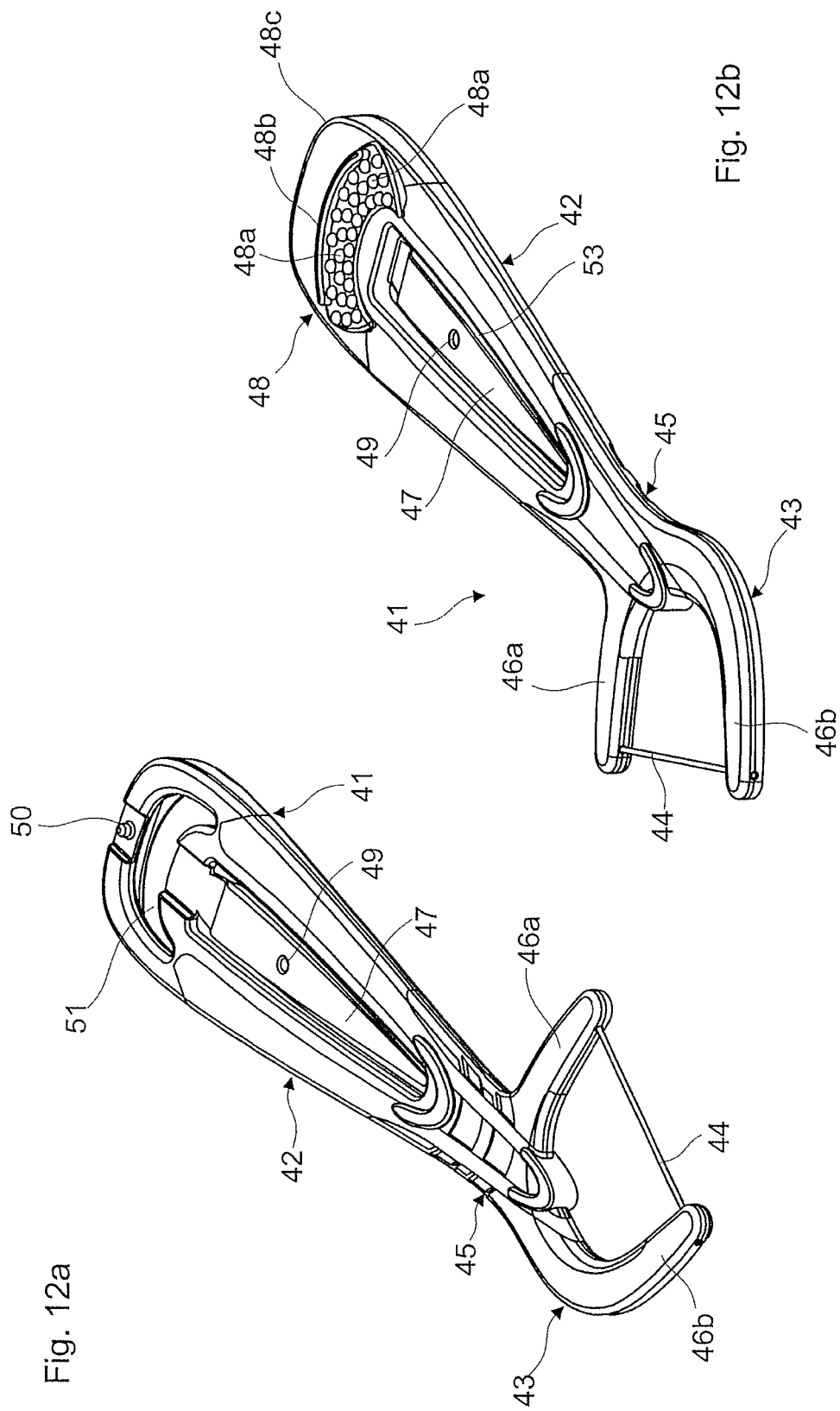

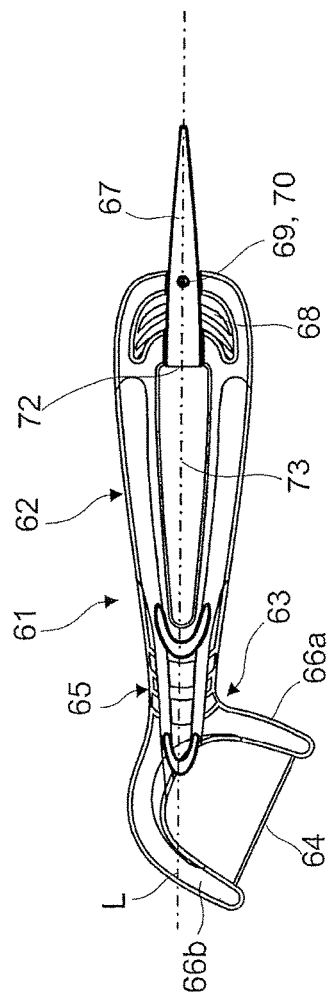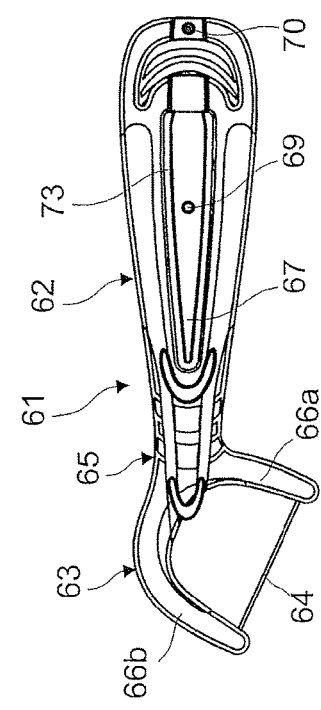
Fig. 13a  Fig. 13b
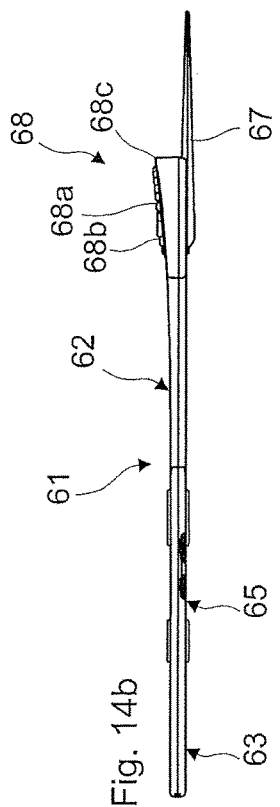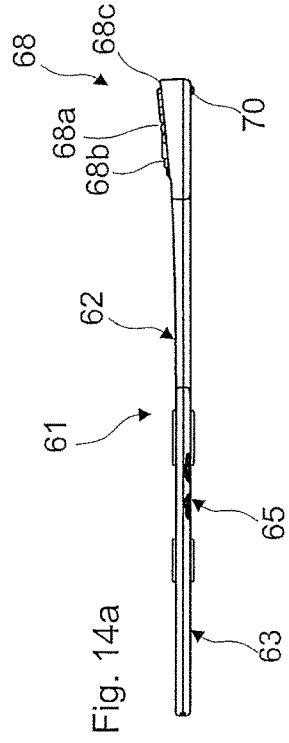
Fig. 14a  Fig. 14b
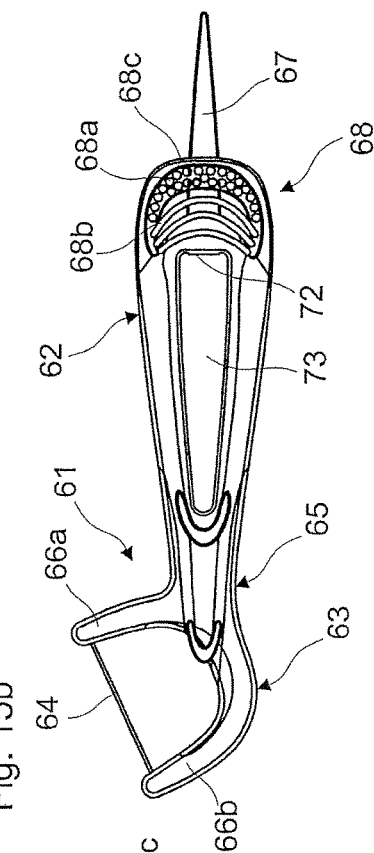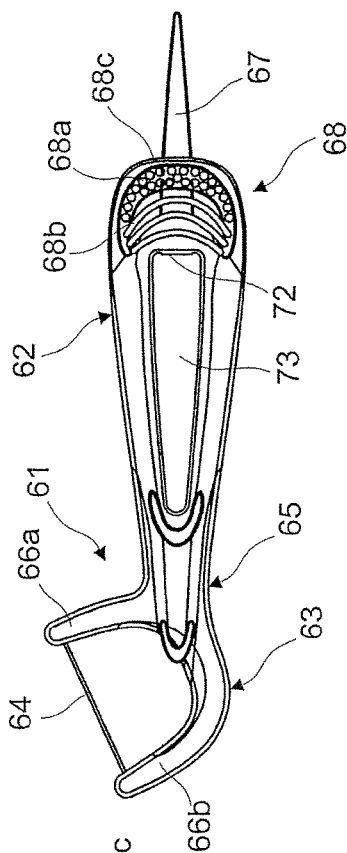
Fig. 15a  Fig. 15b

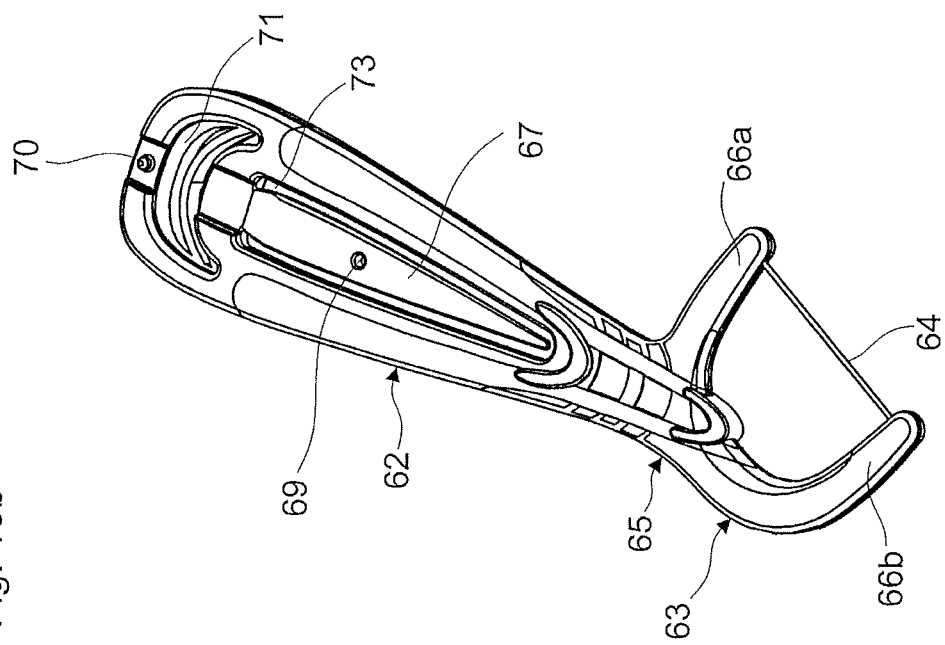
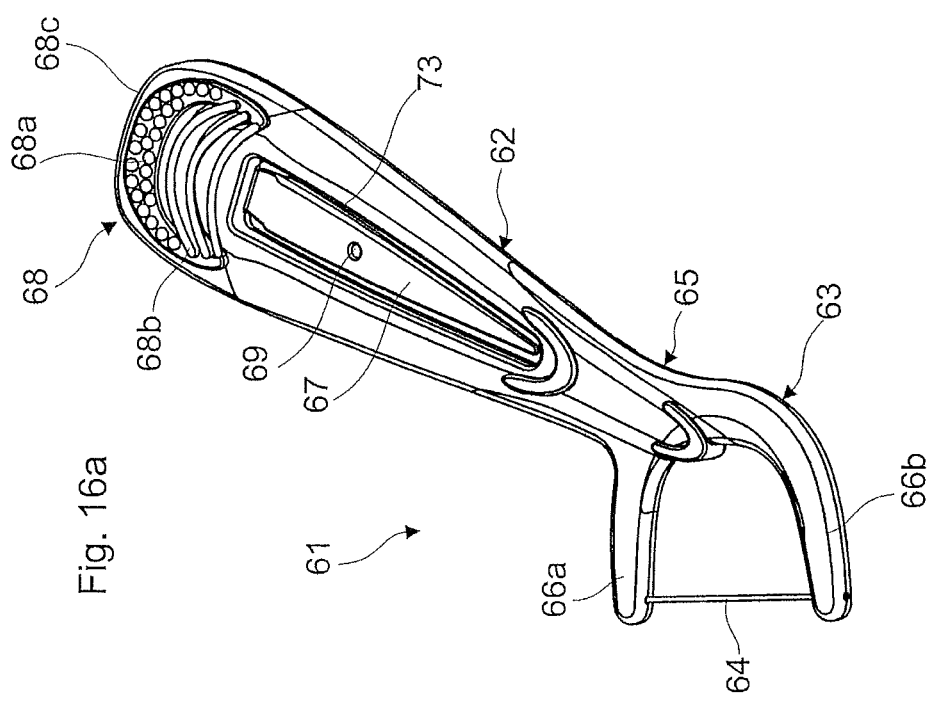

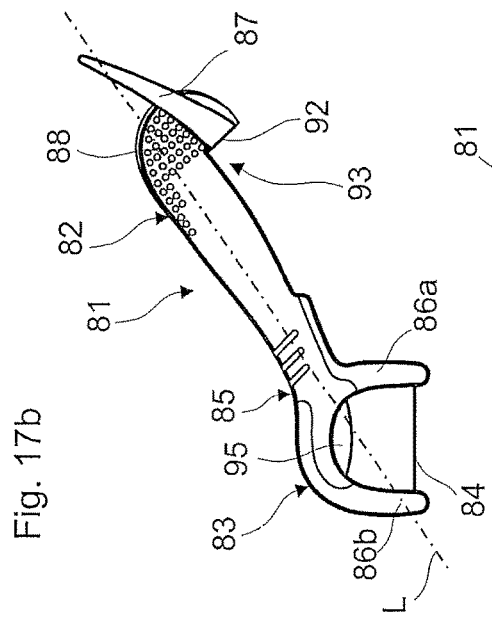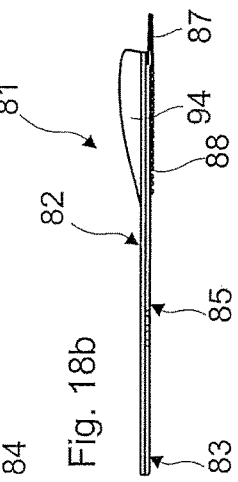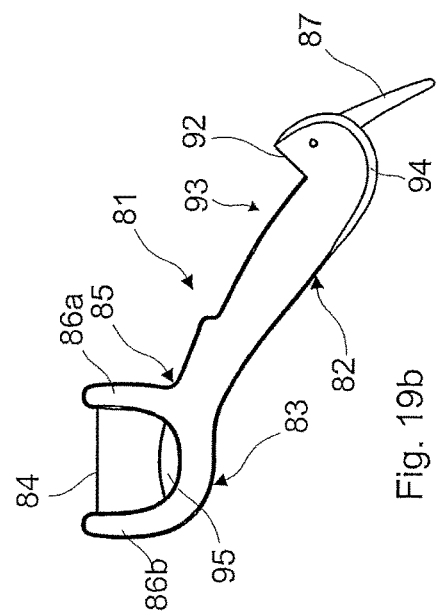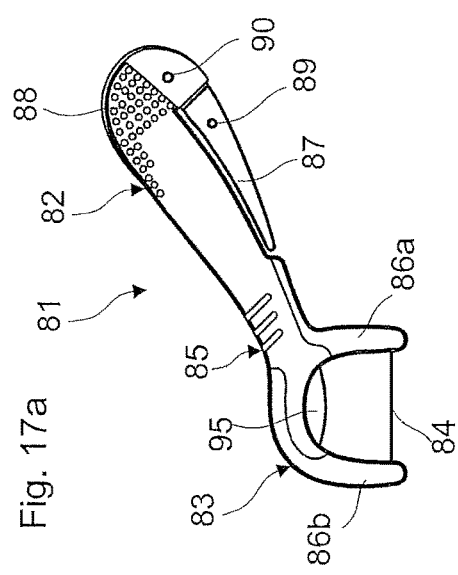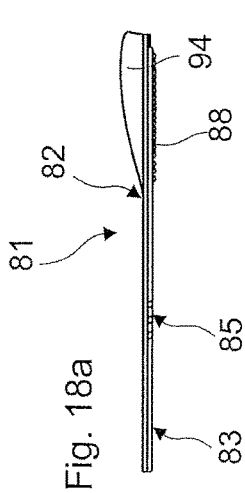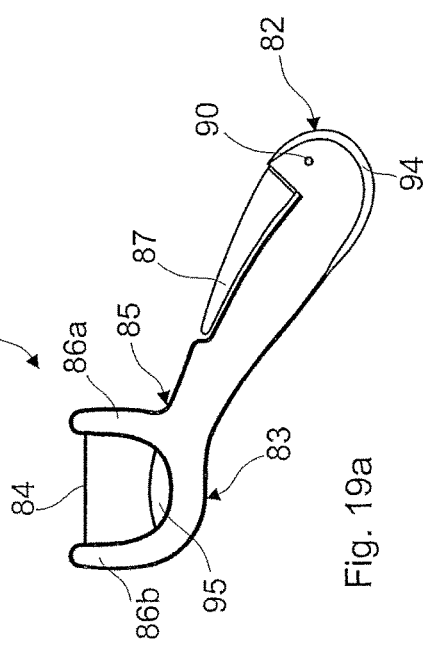

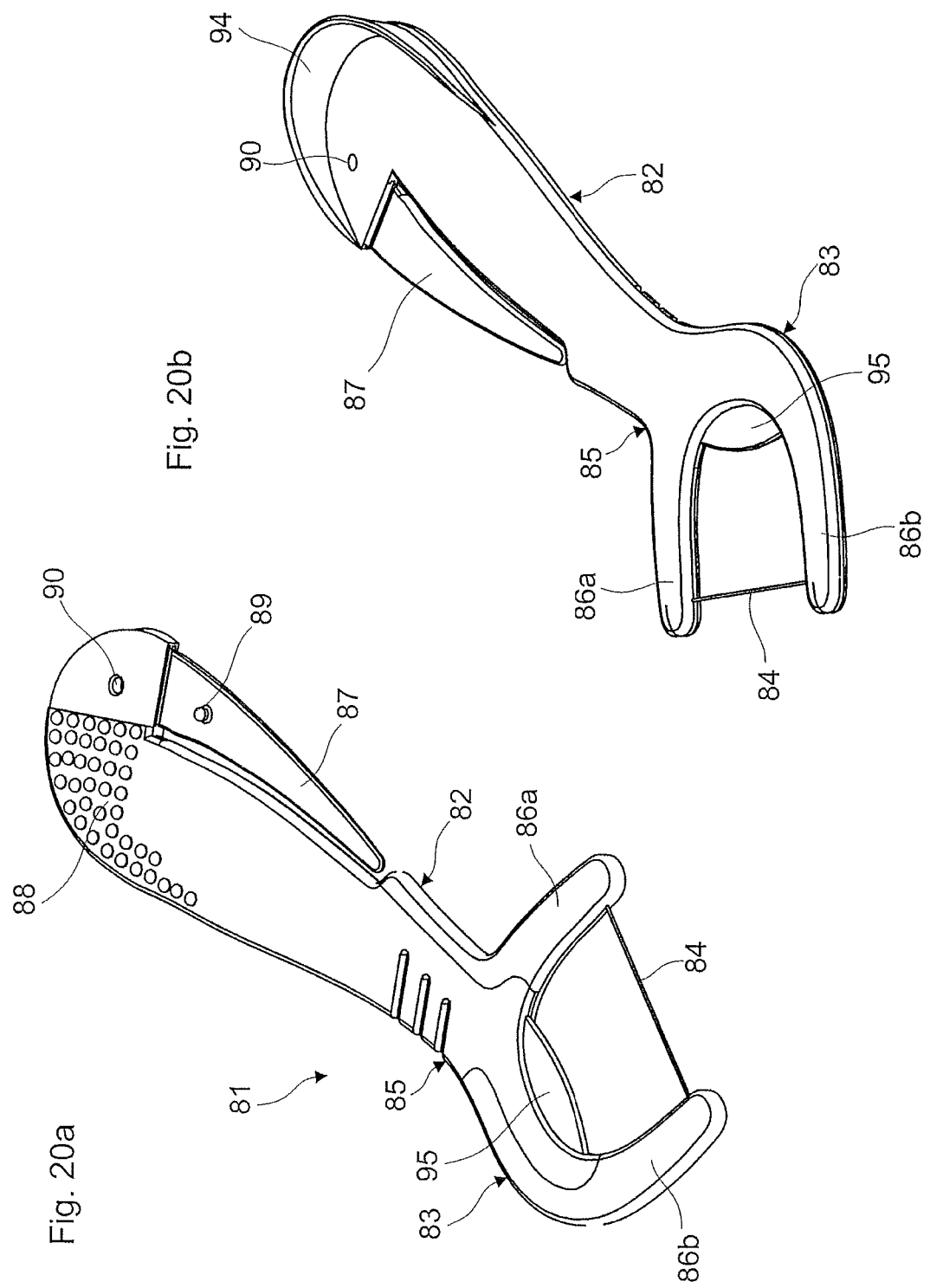

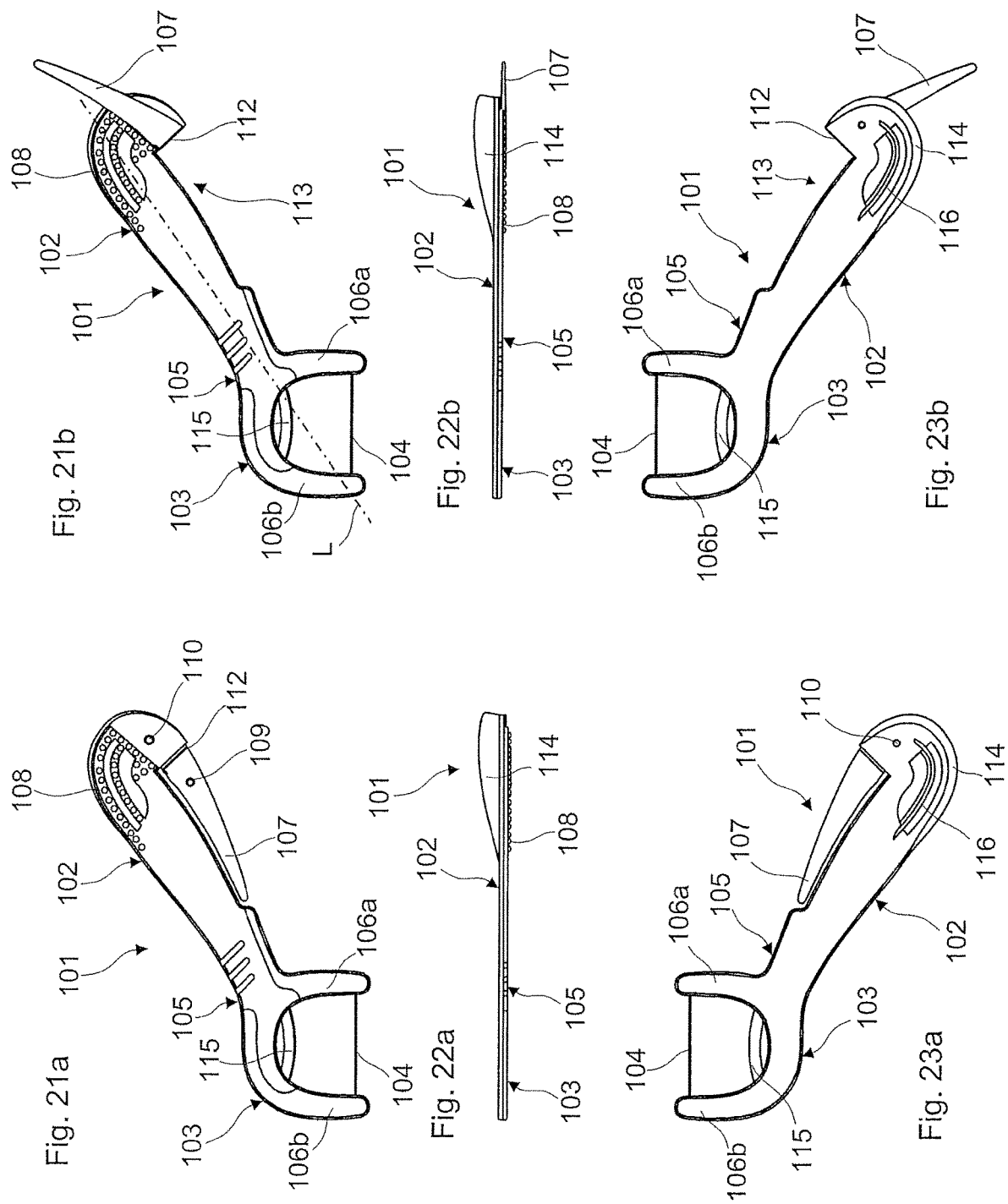

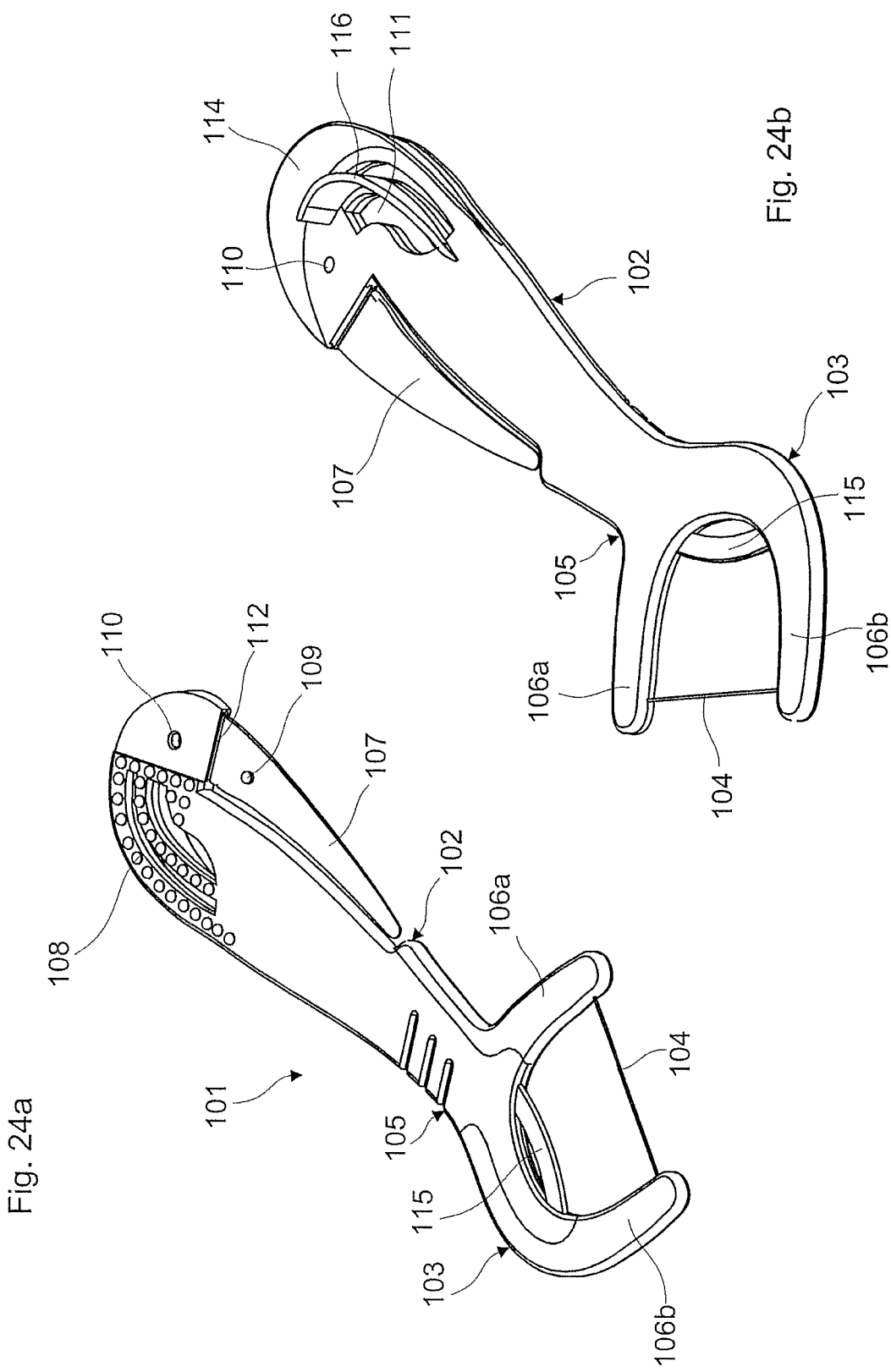

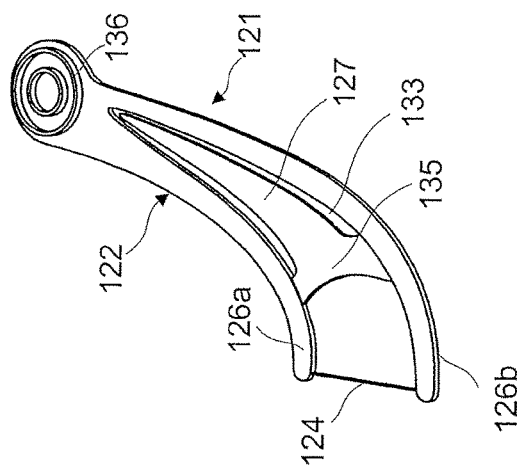
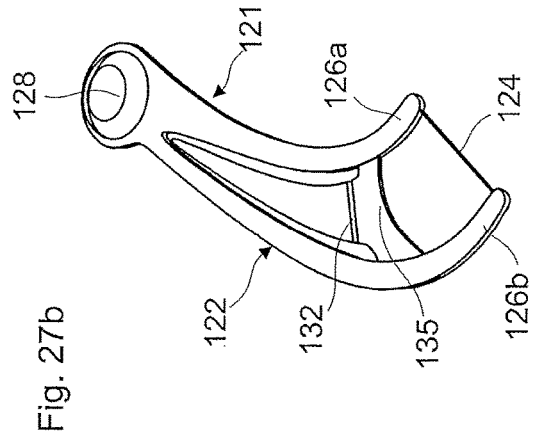
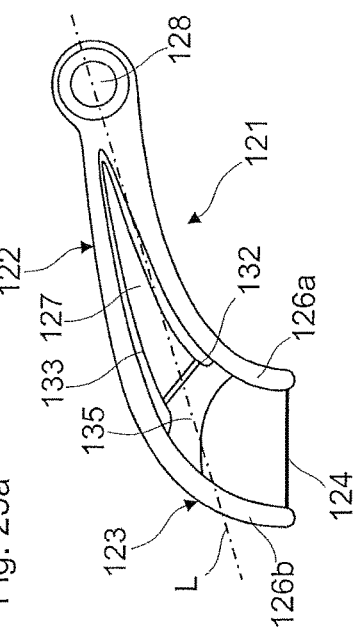
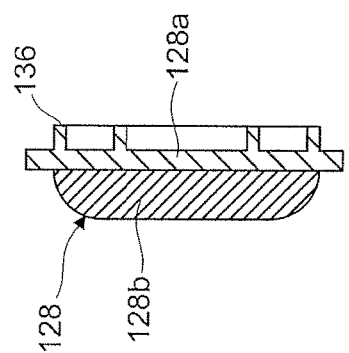
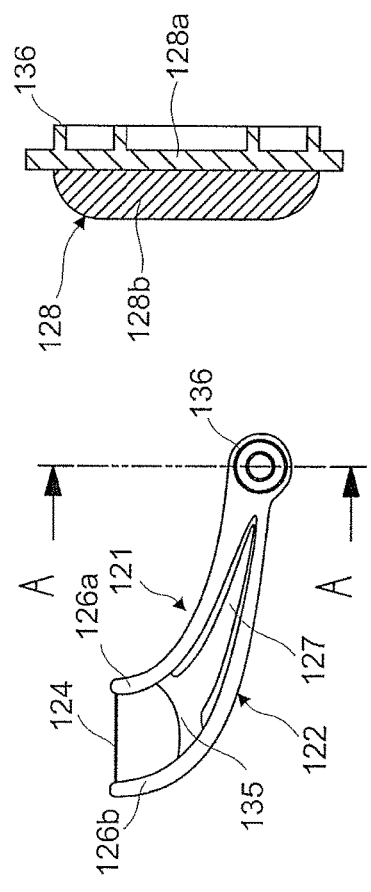

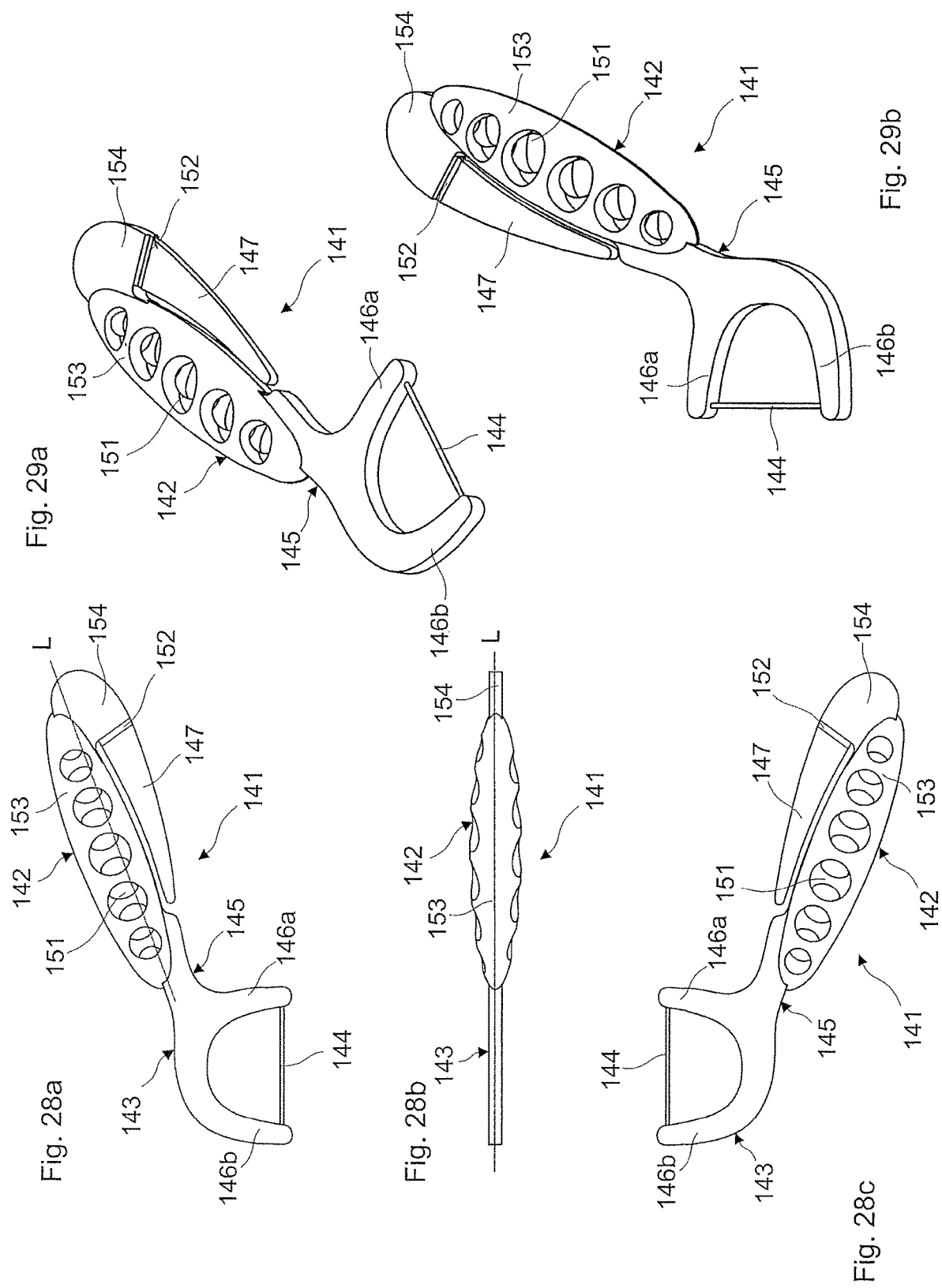

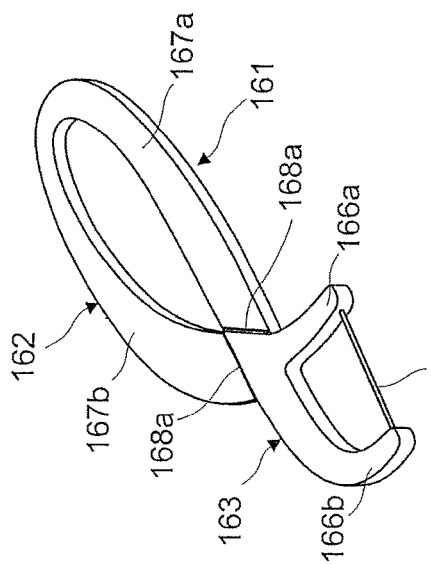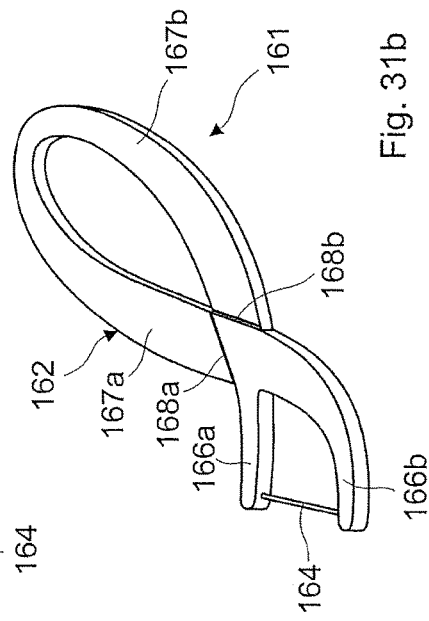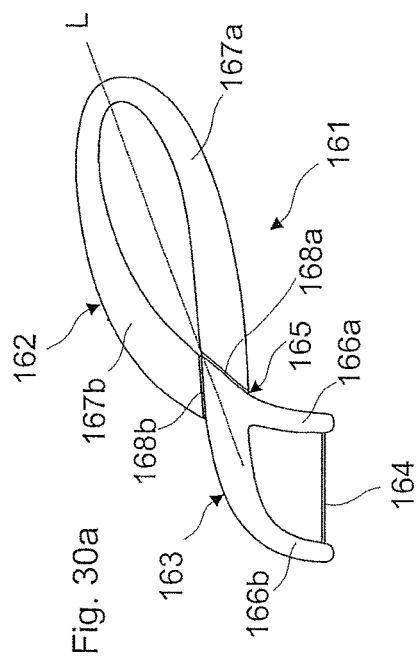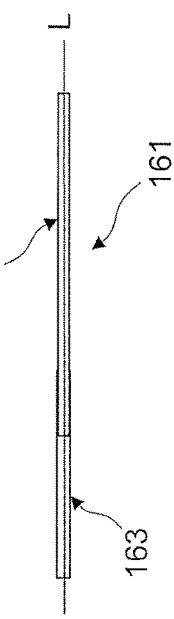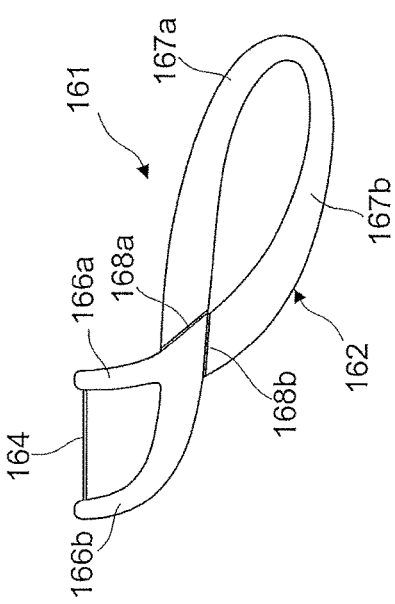

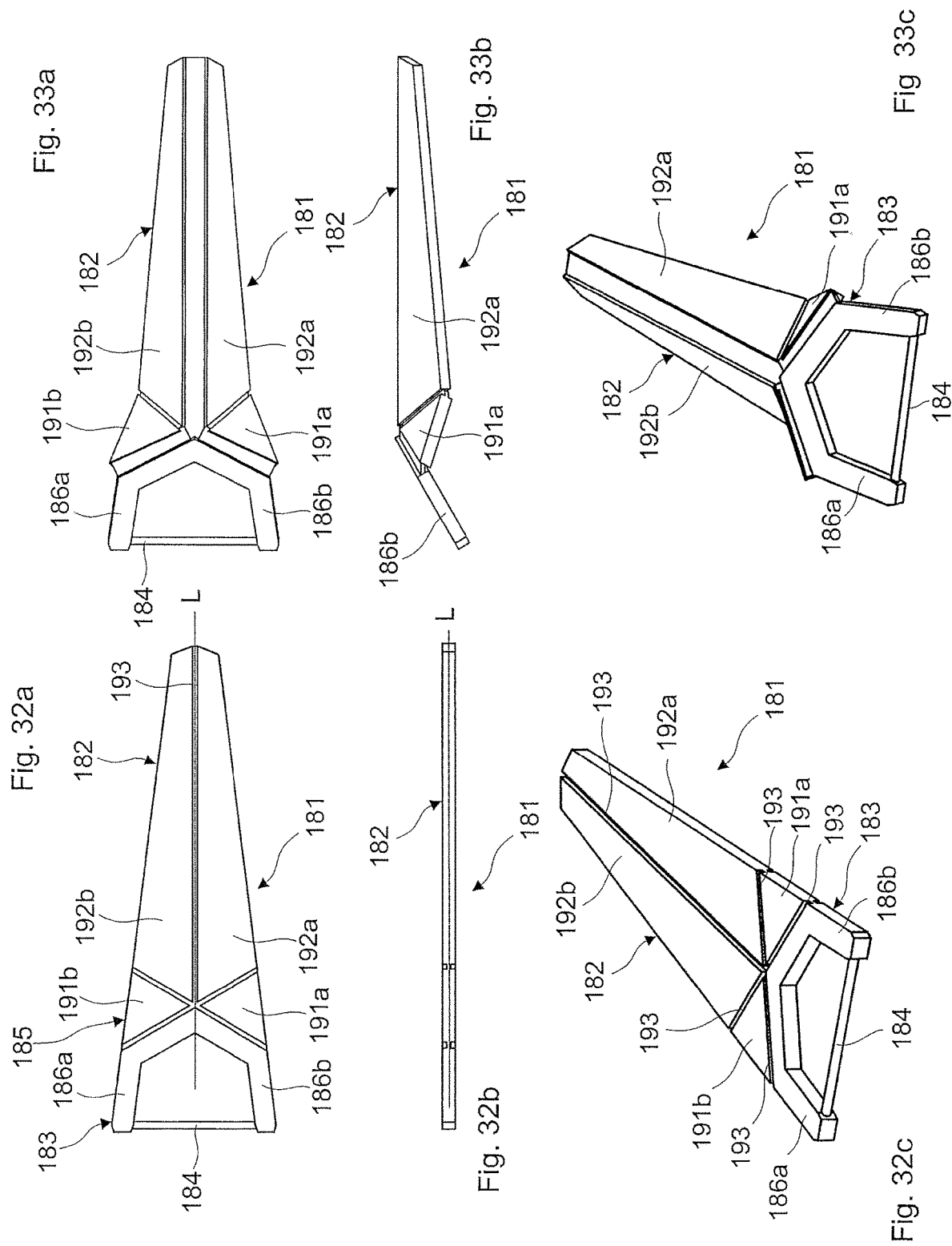

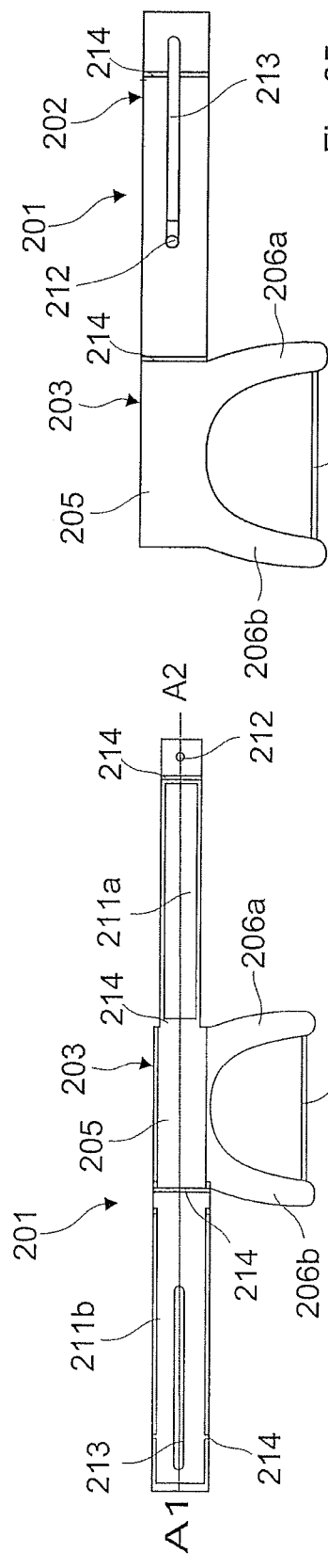
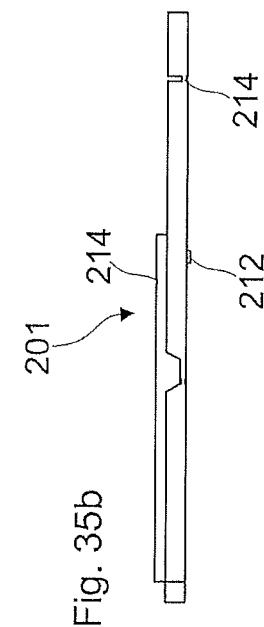
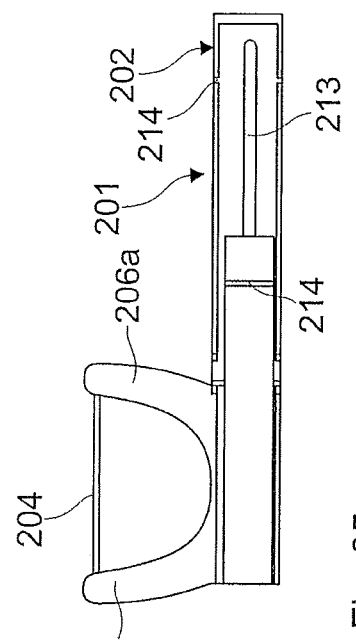
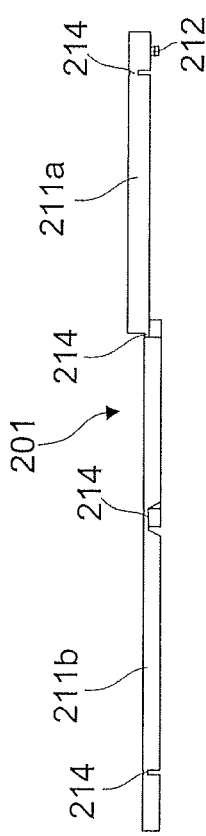
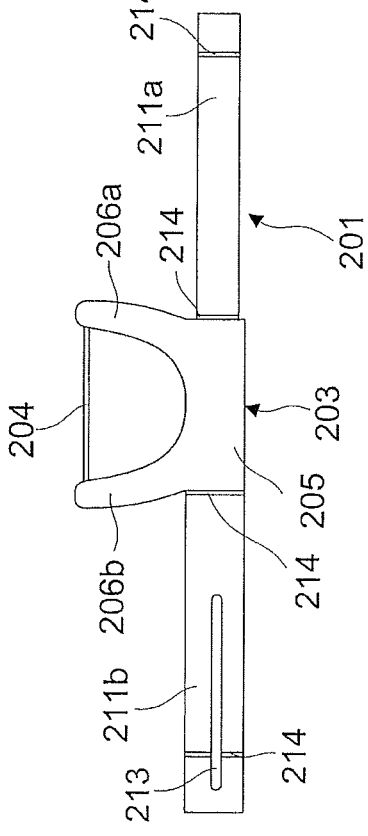

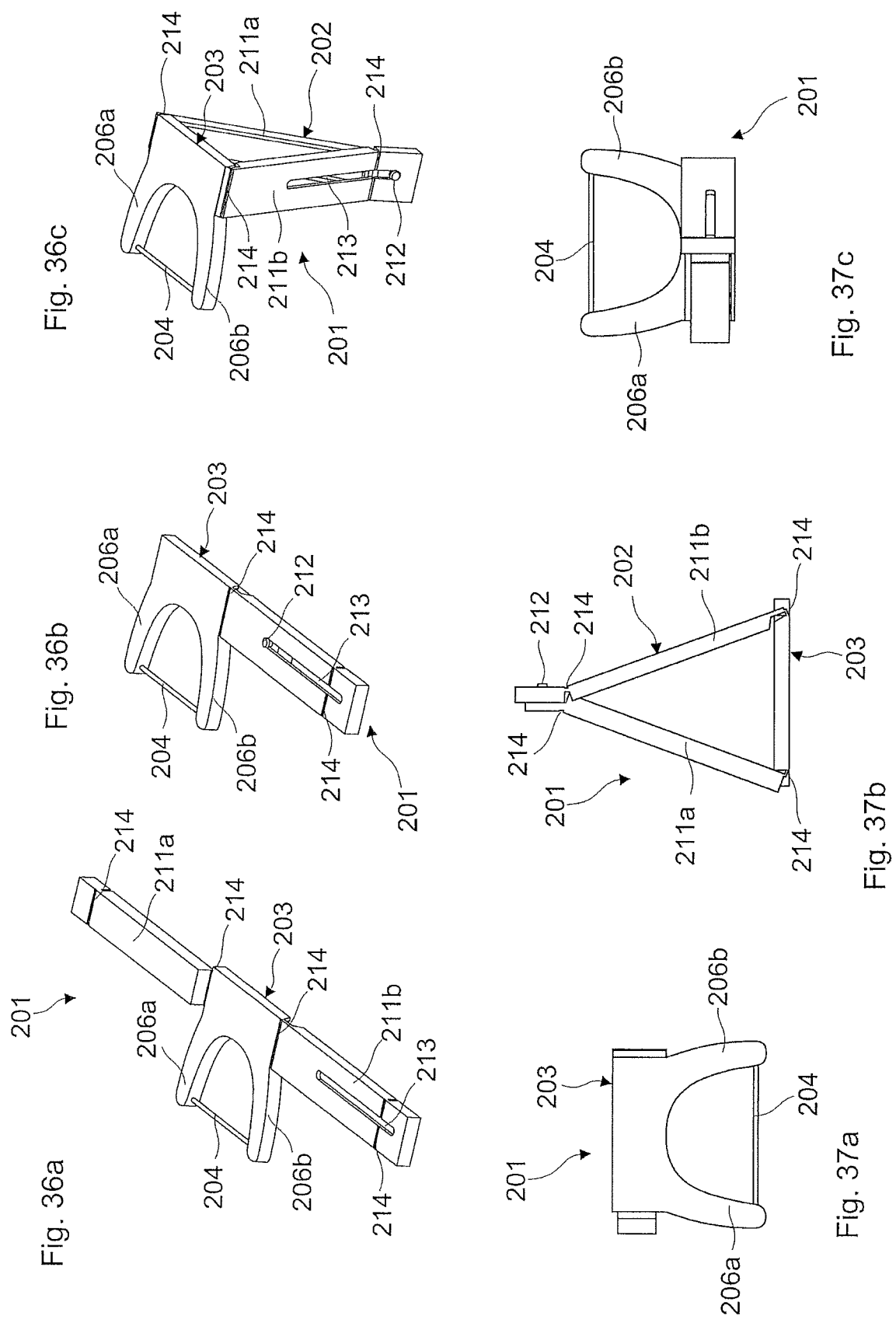

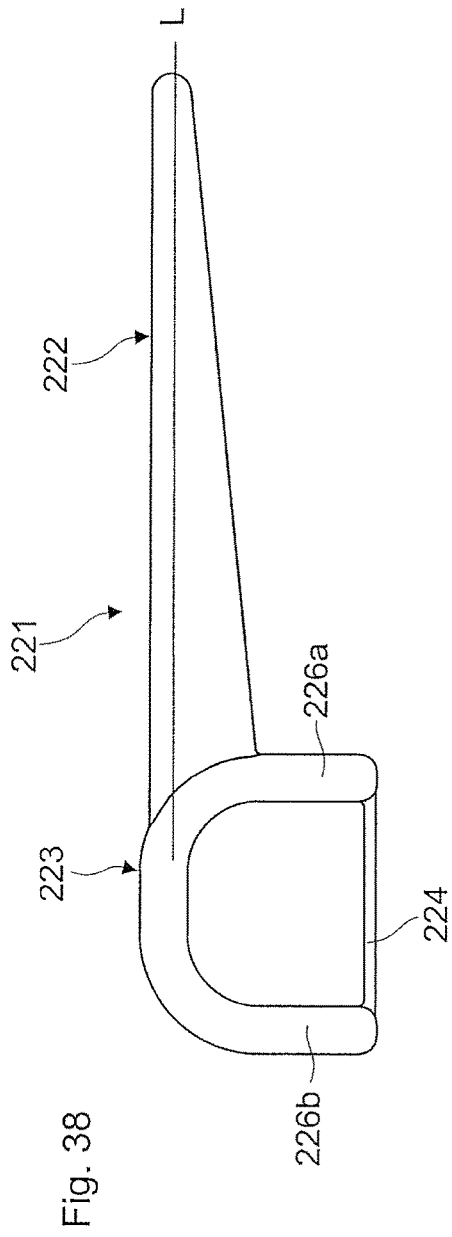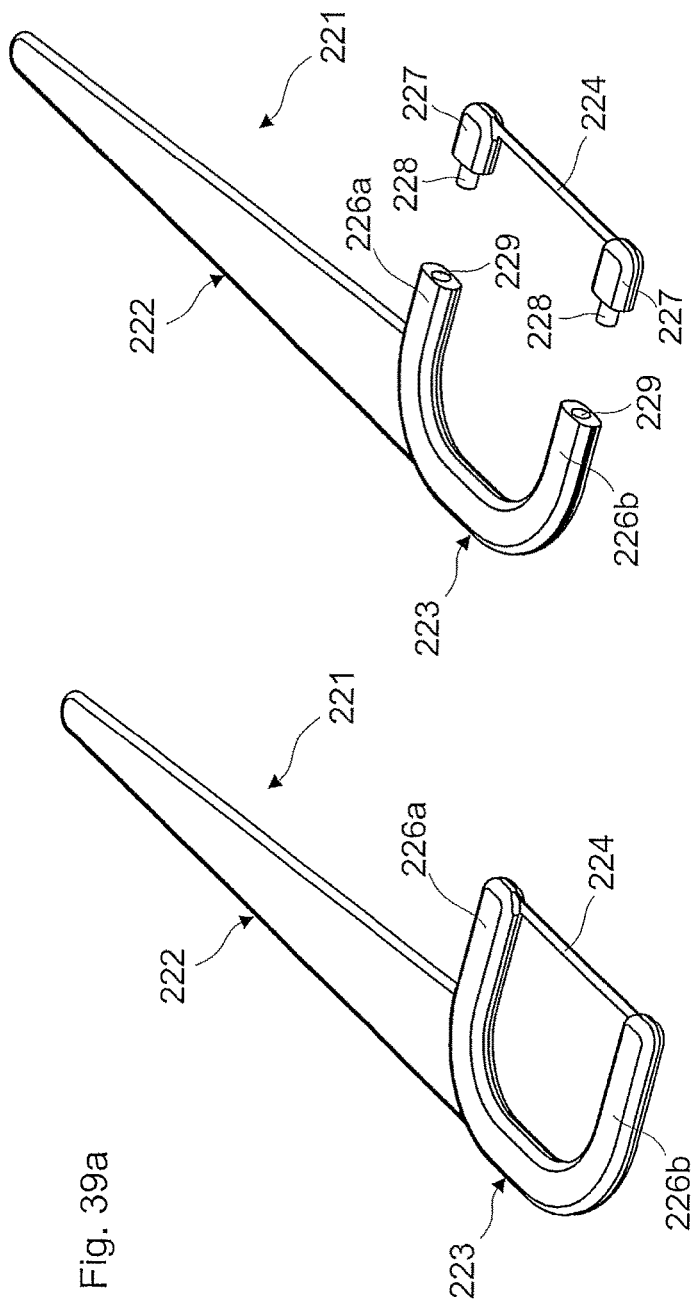

Fig. 49
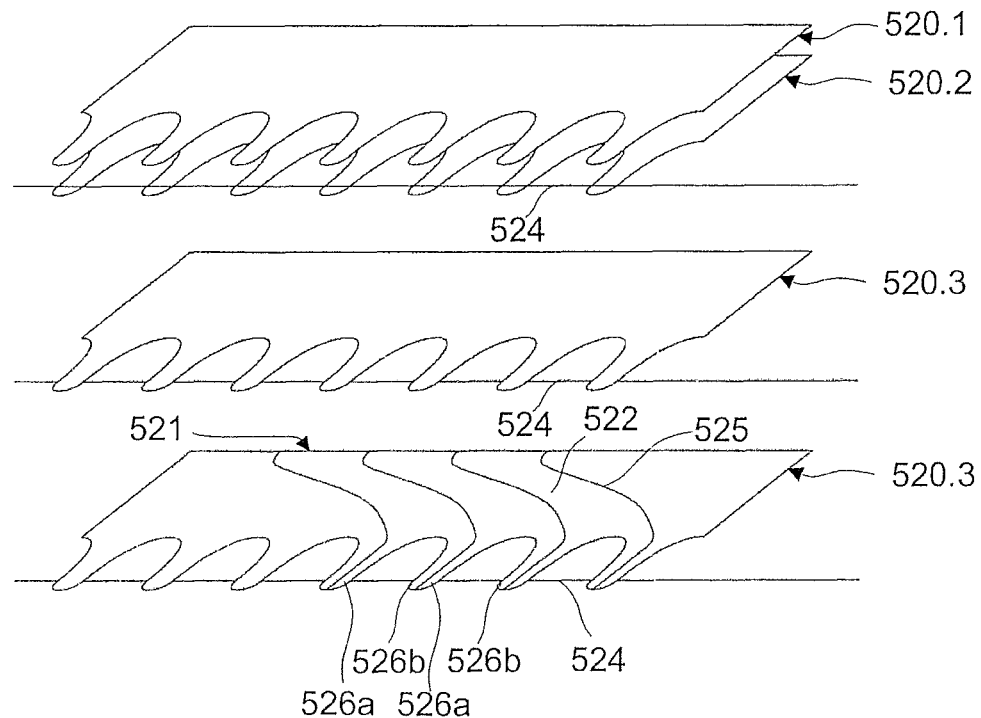
Fig. 50
Fig. 51
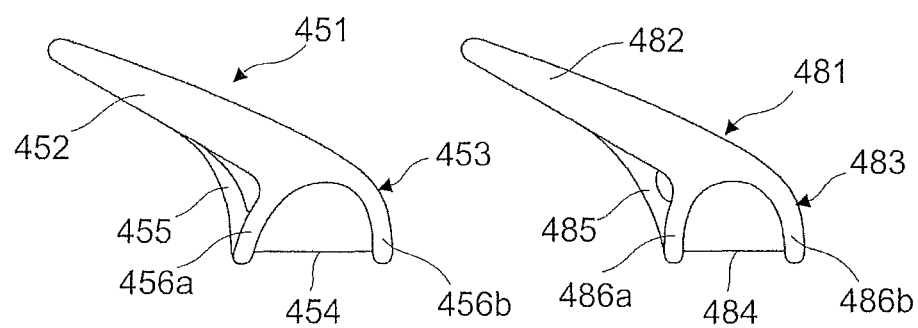

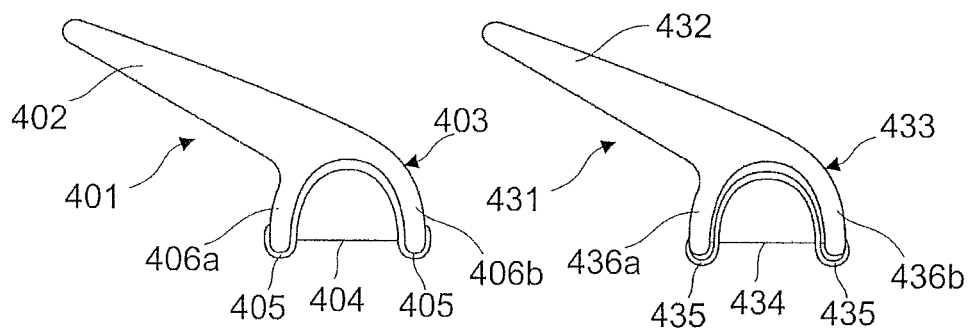
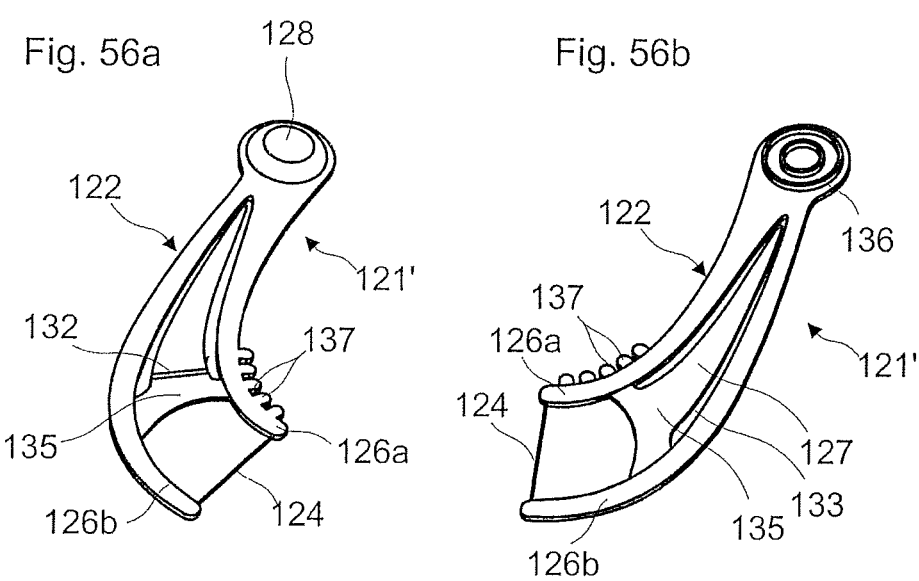

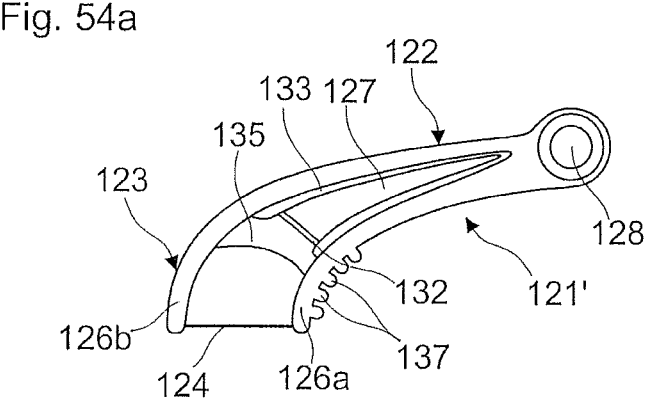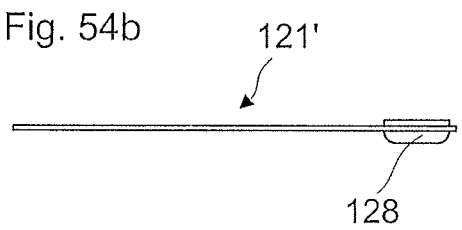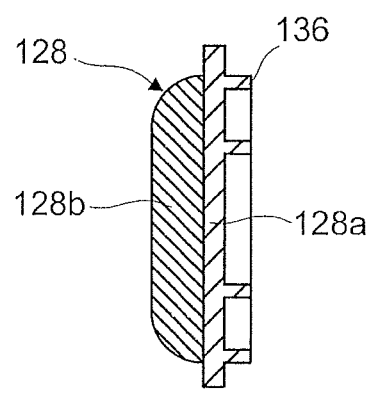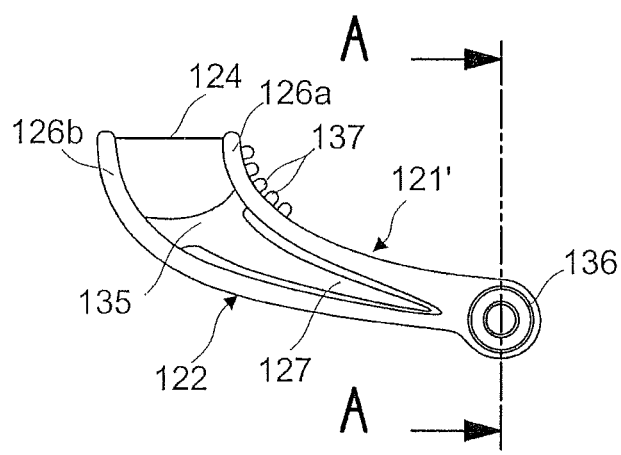

FLOSSER

The invention relates to the field of oral hygiene. It concerns a dental cleaning apparatus, in particular a flosser with a grip body, with a holder which is connected to the grip body and has a first and a second holder arm, and with an interdental space cleaning element which is fastened on the first and second holder arm and extends between the two holder arms.

Flossers are small holders for fixing or mounting dental floss, for the care of interdental spaces. Flossers in particular should simplify the application of the dental floss. Flossers are mostly offered as a ready-strung disposable product. Flossers are also known under the terms flossette or dental bow.

Thus DE 20 2012 008 171 U1 describes a flosser with a hand grip and a holder which are connected to one another. The holder comprises two limbs, between which dental floss is tensioned. A toothpick is moreover integrated into the hand grip.

WO 2012 116451 A1 likewise describes a flosser with a handgrip and a holder for dental floss, and these are connected to one another. The holder comprises two limbs, between which dental floss is tensioned. A toothpick is moreover integrated in the hand grip and can be angled away from the grip body by way of bending-away via a hinge.

With known flossers, the premanufactured dental floss is connected to the holder arms of the holder during the manufacturing process. As a rule, the dental floss during an injection moulding method is enclosed at its end sections by the plastic mass forming the holder arms.

The thus arising interconnection between the dental floss and the holder arm however is often not sufficient, so that the dental floss is torn out of the holder arm quite often when being used. One has attempted to achieve a mechanical anchoring in the holder arm by way of creating a knot in the dental floss, so as to avoid this. The incorporation of knots into dental floss however is effected manually as was hitherto the case, and therefore requires much effort. This disproportionately increases the manufacturing costs of the flosser conceived as a disposable article.

Apart from the dental floss being torn out of the holder arm, breakages of the thread at the exit point of the dental floss out of the holder arm also occur again and again. This is the result of an increased change of stiffness at the exit point on use.

It is the object of the present invention, to provide a multifunctional flosser with several functional elements for fulfilling different tasks in the field of oral hygiene. The flosser moreover should be able to be manufactured with as little as possible expense with regard to material, and as simply as possible. The flosser should moreover be reliable in its application.

The object is achieved by the features of the independent claim 1. Advantageous further developments and embodiments of the invention are to be deduced from the dependent claims, the description and the drawings.

The holder or its holder arms can be arranged such that the interdental space cleaning element runs at a right angle to the grip body. Moreover, the holder or its holder arms with respect to the grip body can also be arranged in a manner such that the interdental space cleaning element runs at an angle of smaller than 90° and 0° or larger, with respect to the grip body.

The interdental space cleaning element in particular is an elongate body which can be inserted into the interdental space. The interdental space cleaning element connects the two holder arms to one another and in particular is tensioned between these.

The holder can form a bow section, via which the holder arms are connected to one another. The grip body is connected to the holder via the bow section.

The holder arms can moreover lead to into the grip body, and partly form this grip body. The holder arms for example can enclose an intermediate space in the grip body. The holder arms can moreover be connected to one another in the grip body via connection webs. A connection web can moreover delimit the grip body from the actual holder.

The flosser in a transition section between the holder arms and grip body can comprise a flexible, compliant section, which e.g. yields when the interdental space cleaning element is led with too much pressure. The transition section can therefore be designed in an elastically resilient manner.

The transition section in particular can be a neck section between the holder arms and the grip body. The flexible design of the transition section can be achieved by way of the material and/or the geometry.

The transition section can consist of an elastic material or comprise this, e.g. a rubber-elastic plastic. Moreover, the transition section can also comprise a spring element. This for example can be integrated into the flosser as an insert in the injection moulding method.

Spring-elastic characteristics can also be achieved by way of particular geometries. Thus the transition section can have a smaller cross-sectional size compared to the grip body, or comprise narrowing locations or grooves.

The transition section can be designed such that this is compliant or elastic in the longitudinal direction and/or transverse direction of the flosser. Moreover, the transition section can as be compliant or elastic with respect to a rotation or twisting about the longitudinal axis of the flosser.

The length of the holder arms of the holder can e.g. be 10 to 25 mm, in particular 14 to 20 mm. The width of the holder arms can e.g. be 1 to 3 mm, preferably 1.5 to 2.3 mm. The depth of the holder arms can e.g. be 1.5 to 2.3 mm.

The holder arms can have a round cross section, for example circular or oval, or a polygonal cross section, such as for example square or rectangular with rounded corners.

The cross-sectional geometry and the cross-sectional size of the holder arms can be designed in a constant or changing manner along their longitudinal extension. The holder arms can e.g. taper towards their free end.

The cross-sectional geometry and/or the cross-sectional size of the two holder arms can moreover be equal or different. Thus e.g. at least one holder arm can be designed more thinly, in order to simplify the care/cleaning of interdental spaces, even with those who wear braces.

The holder can be connected to the grip body via an integrated hinge and be able to be bent or pivoted with respect to the grip body via the hinge, from a passive position into a functional position. Thus the holder and grip body can be arranged in a common plane in the passive position of the holder. The holder is pivoted via the hinge out of the plane into the functional position. The hinge can be an integrated film hinge.

The use of a film hinge has advantages with regard to the manufacture. This is therefore less expensive. Moreover, the ergonomics during applications are improved. Further functional elements such as tongue cleaner, polishing element, mirror, interdental brush, stand, stand foot or toothpicks for example can likewise be brought into a different position via the film hinge. The mentioned functional elements in particular can be pivoted or folded out via the film hinge.

Thereby, it is possible to accommodate several different pivotable or foldable functional elements in a holder, and several pivot directions can be realised thereby. I.e. the rotation axes of the film hinges are not necessarily parallel.

Moreover, connection means, as described further below, can be provided, by way of which the holder can be releasably or non-releasably locked (retained) on the grip body, in its passive position and/or functional position. Thus a first connection means can be arranged on the holder, and a second connection means on the grip body, via which connection means the connection is created.

The connection means in particular are designed for forming a frictional and/or positive connection. The connection means e.g. can be designed for manufacturing a snap-in connection or detent connection and comprise corresponding detent means or snap-in means. The connection can accordingly be realised in a releasable or non-releasable manner.

The flosser preferably consists of plastic or comprises plastic. The flosser can e.g. be manufactured in a single-stage or multi-stage injection moulding method. Individual elements of the flosser, in particular functional elements such as tongue cleaners, or its cleaning elements, interdental space cleaning elements, polishing elements, mirrors, interdental brushes or toothpicks can consist of a different material or comprise a material different to other elements of the flosser, such as holder, holder arms or grip body.

It is further possible for the basic elements of the flosser, specifically the holder, the holder arms and the grip body, to be manufactured in more than one injection moulding step and from more than one material.

The flosser can comprise one or more hard components as well as one or more soft components. The soft component can e.g. be a rubber-elastic plastic material.

The flosser for example is designed with it functional elements in a single-part manner. The functional elements as well as any hinges, predetermined breaking locations and connection means of the flosser can be integrally manufactured with the flosser in an injection moulding method.

The flosser thus for example can be manufactured in a so-called co-injection method. With the co-injection method, at least two material components, e.g. a hard component and a soft component are simultaneously of successively injected into a common tool cavity through a common or through different gating points.

The second component can thereby penetrate the first component or envelope this.

Thus according to one variant, a first material component can be injected into the tool cavity e.g. via a hot-runner nozzle, wherein the tool cavity is partially filled with the first material component. The injected first material component is subsequently cooled in the tool cavity, wherein at least a free-flowing core is retained.

A second material component is subsequently injected through the same hot-runner nozzle into the same tool cavity of the injection moulding tool, wherein the tool cavity is filled further, which is to say filled to a complete manner, with the second material component.

The still free-flowing core of the first material component injected previously into the tool cavity, e.g. in the region of the holder arms or the grip body, is displaced in the material flow direction during the injection moulding of the second material component, wherein the at least partly solidified first material component which in particular bears on the cavity wall, at least partly surrounds the second material component flowing in.

Thus gating points can e.g. be arranged in the region of the holder, e.g. in the holder arms, and/or in the region of the grip body. The injection moulding method is preferably carried out such that no flow fronts meet in the interdental space cleaning element and/or in the holder arms, since these parts are mechanically loaded to a high extent during use.

It is also possible to apply so-called core-back technology, in order to accordingly control the filling of the injection moulding cavity, in order to achieve this.

With core-back technology, also called composite injection moulding, the different materials are successively injected. A change of the cavity is produced after the cavity is filled with the first component. The already filled cavity regions is opened or extended to a still unfilled cavity region. The remaining filling of the component is effected through a further gating with a second component. The same components as well as different components can be applied. A precondition of the core-back method is a mould part geometry which permits the cavity to be released to the second component via suitable means, and that both components bond to one another.

The interdental space cleaning element can be inserted into the tool mould prior to the injection moulding and be cut before the ejection of the flosser, in the case that the interdental space cleaning element is not injection moulded.

Thus e.g. an interdental space cleaning element can be inserted into the injection mould, and subsequently a first component, in particular a soft material can be injected in a co-injection method. A second material, in particular a hard material is injected in a further step. The flosser is thereafter removed from the mould.

The holder arms can thus consist of a hard material or comprise this. The hard material fixes the interdental space cleaning element. The grip body can also consist of a soft material or comprise this, e.g. as an outer-lying layer.

The different material components during the manufacture form a material(-fit) connection and/or positive(-fit) connection for example. However, with certain applications, as yet specified further below, one can envisage the material components not connecting to one another.

One can e.g. envisage a connection section of a flexible, in particular elastic material component (e.g. a soft component) being arranged between the holder and the grip body, so that the holder and the grip body can be moved to one another. One can further also envisage dimensioning the hard component in a slimmer manner and/or covering this with a soft component, in order to achieve the mentioned elasticity.

The flosser can be designed such that this can be divided into two or more than two parts for use. This is usefully effected by way of abruptly bending or tearing the parts along a predetermined breaking location. The predetermined breaking location can be a zone of weakening. Functional elements, such as e.g. toothpicks, tongue cleaners, polishing elements, mirrors, interdental brushes, etc. can be released by way of separating way parts of the flosser, in particular of the grip body.

One can envisage two parts separated from one another, e.g. a stand foot separated from the flosser, being able to be rejoined in another position relative to one another, by way of sticking together. This e.g. one can envisage the holder being separable from the grip body and being able to be stuck together again.

Functional elements can also be separated from the flosser and be able to be stuck together with this again.

Functional elements can moreover be pivoted or folded out from the flosser.

The flosser can be designed in a flat manner and comprise a flat grip body. Flat means that the height of the flosser or of the grip body is significantly smaller than the length and width of the flosser or grip body. The holder with its holder arms e.g. can lie with the grip body in one plane. Functional elements can also lie with the grip body in one plane, at least in their passive position.

The flosser can also be designed as a volume body. A volume body means that the width and height of this lie within a similar magnitude range. The volume body can also be designed as a solid body or as a hollow body. A volume body designed as a hollow body can comprise openings to the outside through the body wall.

Openings through the body can be realised in parts of the flosser, and these openings permit a significant reduction of the material expense.

Parts of the flosser, in particular the grip body can e.g. comprise (reinforcement) ribs which permit a stable but lightweight volume body with as little as possible material expense.

Moreover, it is also possible to create a volume body by way of folding individual elements of the flosser which e.g. are designed in a flat manner. Thus for example a volume body simplifying the handling of the flosser can be created from a flat base body by way of folding individual elements. A grip body can be manufactured as a volume body in this manner, in particular by way of folding and possibly snapping in elements of the flosser again. For this, the flosser, in particular in the grip body, can for example comprise a plurality of sheet segments which can be folded to one another.

The folding of the elements for example is effected along predetermined crease locations, which e.g. form film hinges. The elements or the sheet segments in the folded condition as the case may be can be connected to one another via connection means, as are described in the context of the toothpick.

One can also succeed in the connections means locking into one another, but being movable, for example guided, in one another, on account of the folding. No or only a limited movement is possible in the functional position on account of this, for example by way of the body being able to be shaped in a flat as well as voluminous manner.

The functional elements of a flosser can be arranged next to one another or over one another, e.g. in the grip body. Certain parts of the functional elements can have several functions. Thus the elements of the tongue cleaner, e.g. one or more lamellae or one or more nubs can form a connection means for a positive and/or frictional connection between a functional element, such as toothpick or interdental brush, and the grip body. The functional element for this is applied over the tongue cleaner which is provided e.g. in the grip body.

The two functional elements lie over one another with this. Generally, the connection elements can lie in the region of another functionality, for example in the functionality or at the rear side of the mentioned functionality.

The interdental space cleaning element according to an embodiment variant is designed in an integral manner together with the two holder arms of the flosser. The holder arms and interdental space cleaning element in particular are integrally manufactured. Thus the holder arms and the interdental space cleaning element can be manufactured integrally in one or more injection moulding methods or injection moulding steps. One can make do without a feeding and processing-technological integration of dental floss in this manner, and this reduces the manufacturing effort and accordingly the manufacturing costs.

The holder or the holder arms and the interdental space cleaning element can be manufactured in a single injection moulding step, wherein the holder or the holder arms and the interdental space cleaning element can consist of the same or different materials.

The holder or the holder arms and the interdental space cleaning element can also be manufactured in two or more injection moulding steps, wherein the holder or holder arms and the interdental space cleaning element can e.g. consist of different materials.

Thus the holder or the holder arms and the interdental space cleaning element can be manufactured in a two-stage injection moulding method, in particular in a co-injection method described above.

Moreover, a first material component can be injected into the tool cavity which forms the holder or the holder arms as well as the grip body, in the co-injection method, in a first injection moulding step.

The second material component forming the interdental space cleaning element is injected in a second injection moulding step. This in particular is effected before the first material component is completely solidified.

The second material component in particular flows through the first material component and thus fills the part of the cavity which is still free and which forms the interdental space cleaning element.

The two material components can be injected into the tool cavity via a common gating point (co-injection method). The gating point can lie in the holder arms.

Thereby, a part of the first material component can be displaced in the holder arm or holder arms when injecting the second material component. I.e., the second material component forming the interdental space cleaning element breaks through in the region of the holder arms.

A further application possibility of the co-injection method lies in the interdental space cleaning element already being applied into the cavity for the first injection moulding step. A soft component is then brought into the cavity in a first injection moulding step. A hard component is incorporated in the second injection moulding step. One is to succeed in the interdental space cleaning element being anchored for example by way of a suitable timing in the method. The flosser in the grip body has a surface of a soft component which is for a good gripping.

The holder arms and the interdental space cleaning element preferably assume a material fit with one another. The material of the holder arms and of the interdental space cleaning element can be matched to one another for the purpose of forming an optimal material fit (adhesive bond), so that the interdental space cleaning element is not torn away from the holder arm or torn out of this, on use.

A positive fit is envisaged at the interface in the case that this is not possible due to the material selection.

Thus for example the interdental space cleaning element can be manufactured in a first step, optionally together with anchoring interfaces.

The holder or the holder arms and, as the case may be, also the grip body can be manufactured in a second step by way of peripherally injecting the flosser part from the first injection moulding step.

The separately manufactured interdental space cleaning element for example can be a film, for example of plastic. The film can be a two-component or multi-component film. The film can be a PET film or contain such. The film can be structured and e.g. have a surface topography.

The separately manufactured interdental space cleaning element can also be a dental floss. Hereby, it is possible for the first step to be the actual manufacture of a conventionally known dental floss which e.g. is provided with knots at the end.

The term fibre body is hereinafter used instead of dental floss. Fibre body in the present document is to be understood as follows:
- A fibre body is a formation which is thin in comparison with the length and is flexible, in particular a linear textile formation which can only accommodate tensile forces in the longitudinal direction, but no compressive forces, since this bends in the case of a compression loading;
- A fibre body can be dental floss or a dental thread from or with one or more fibres (e.g. volume dental floss);
- A fibre body can be a textile formation, such as a woven;
- A fibre body can be manufactured as a single-part body in the injection moulding method, thus comprise no fibres or be designed as a single fibre, for example manufactured in the form of a single fibre by way of injection moulding.

One can also envisage the interdental space cleaning element, in particular a fibre body, together with connection elements arranged laterally of the interdental space cleaning element, being manufactured in a single-part manner in an injection moulding method. The flosser with the grip body and holder arms is preferably likewise manufactured in an injection moulding method and in particular in a single-part manner. The holder arms and connection elements comprise connection interfaces which permit the interdental space cleaning element to be connected to the holder arms via the connection elements by way of a positive and/or non-positive connection, e.g. a click or snap connection. A material connection such as bonding or welding as well as a material fit by way of peripheral injecting the interface which is to say injecting around the interface, are likewise possible.

The interdental space cleaning element can be manufactured of a soft component or a combination of soft and hard component. The interdental space cleaning element can e.g. be manufactured by way of core-back technology.

The interdental space cleaning element is designed at least in sections as a fibre body. The interdental space cleaning element can also be designed as a fibre body in a continuous manner between both holder arms.

The outer diameter of the fibre body can be 0.08 to 0.3 mm, preferably 0.1 mm to 0.25 mm, if it is manufactured in the injection moulding method. The diameter of fibre bodies of conventional, known dental floss corresponds to the diameter of common dental floss.

The cross section of the fibre body can be round, such as for example be circular or oval, or also polygonal, for example rectangular or triangular. Several cross-sectional shapes can be combined and thus form a cross section. The cross section can be designed in a symmetrical as well as asymmetrical manner. The outer contour of the cross section is preferably closed.

The cross section can change over the length of the fibre body and form a cross-sectional course. Thus the cross section at the ends for example can be larger than in the middle section. The cross section can also have a wave-like cross-sectional profile increasing and reducing over the length.

A different cross-sectional profiling accordingly entails a correspondingly changing longitudinal profiling, which can again be designed in a wave-like, straight-lined or other manner dependent on cross section.

The interdental space cleaning element can comprise cleaning elements, such as bristles, nubs or lamellae which project radially from a central base body or fibre body. The cleaning elements can be arranged e.g. annularly, over the whole periphery, thus 360° (angle degrees) or over one or more part peripheries of the base body. The lamellae can surround the base body as a lamellae ring or in a spiral-shaped manner.

The interdental space cleaning element or its central base body can moreover be provided with a special surface. The surface can be designed for example as a texture such as a serration, erosion structure, alternating smooth/polished surface and roughened surface or also in a combination of the above mentioned possibilities.

The exit location of the interdental space cleaning element out of the holder arms is a key location in the case of the interdental space cleaning element being manufactured by way of injection moulding or being anchored in the holder arms by way of injection moulding. This transition is preferably not designed in a sharp-edged manner and is provided with generous transition radii. A funnel-like narrowing away from the holder arms in each case is also possible.

The cleaning elements can be arranged between the two holder arms, in sections or over the complete longitudinal extension of the interdental space cleaning element. Cleaning elements can also be provided in sections, as well as a fibre body in sections, between the two holder arms. Thus for example cleaning elements can be provided only in a middle region of the interdental space cleaning element.

The cleaning elements can be integrally formed with the base body or fibre body. Thus the holder arms, cleaning elements and base body can be integrally manufactured in an injection moulding method.

The interdental space cleaning element can also be designed as a separate component which is connected to the holder arms within the framework of the manufacturing process, e.g. in the injection moulding method, or a mechanical assembly step. According to this embodiment, the interdental space cleaning element can also be designed as a fibre body in the form of a dental thread which consist of one or a plurality of fibres, e.g. plastic fibres. Such interdental space cleaning elements for cleaning interdental spaces are also known under the term dental floss.

The fibre body with its end sections can be integrated into the holder arms in an injection moulding method. Anchoring elements which are designed for example in a spherical or cylindrical manner can be provided in the end sections of the dental floss, for anchoring the dental floss in the holder arms during the manufacture of these. The anchoring elements can be injected onto the fibre body in an injection moulding method. The anchoring elements can also be knots which are incorporated into the fibre body, in particular into the dental floss.

Moreover, it is also possible for the connection elements to be laterally attached onto the interdental space cleaning element, e.g. on a fibre body, such as dental floss. These e.g. can be injected on with an injection moulding method. The connection elements and the holder arms of the flosser comprise connection interfaces for creating a positive and/or non-positive or material connection. The interdental space cleaning element then in a mechanical assembly step can be connected to the holder arms via the connection elements by way of a positive and/or non-positive connection or also a material connection.

The interdental space cleaning element, in particular the fibre body can be pretensioned or non-tensioned, between the holder arms. On fashioning (shape) the flosser for example, one can make sure that the holder arms exert a (tensile) stress, which is to say tension, upon the fibre body after the solidification of the plastic mass and the shrinkage resulting therefrom, independently of the type of the fibre body.

The connection locations between the holder arms and the interdental space cleaning element are preferably arranged at the outermost end of the holder arm.

The interdental space cleaning element and the end points of the holder arms preferably lie on a line, in particular in the case in which the interdental space cleaning element is injection moulded. The holder arms in particular do not form end sections going beyond the interdental space cleaning element.

A distance can also be formed between the outermost end or between the free end of the holder arm, and the connection location. The distance from the outermost, free end of the holder arm to the connection location of the interdental space cleaning element, in particular of the fibre body can e.g. be 1 to 3 mm and in particular 1 to 2.5 mm.

These dimensions are preferably only valid in variants, in which the outer end of the holder arms are not manufactured with the interdental space cleaning element in the same step, since sufficient volume of the holder arms must be present around the connection location, in order to create an optimal connection.

The connection location to the holder arm preferably lies on the middle plane which goes through the holder arms.

Moreover, several interdental space cleaning elements, in particular fibre bodies, which are arranged at a distance to one another, can be provided. The interdental space cleaning elements in each case form connection locations to the holder arms, said locations being distanced to one another along the holder arms.

Thus two, three or more than three interdental space cleaning elements can be provided.

The interdental space cleaning elements can be arranged parallel to one another. The interdental space cleaning elements can be arranged in a crossing manner. The interdental space cleaning elements can be arranged running at an angle to one another.

The distance between the interdental space cleaning elements or between their connection locations can be 0.5 to 3 mm, preferably 1 to 2 mm.

The several interdental space cleaning elements can be arranged on a line along the holder arms. The several interdental space cleaning elements can be arranged in a plane.

The interdental space cleaning elements, considered transversely to the holder arms, can be arranged laterally offset to one another and as a result not in a common plane, in particular of three or more of these are provided. The connection locations on the holder arm accordingly do not lie in a line.

The interdental space cleaning elements can be designed in the same or in a different manner. Thus a first, outer interdental space cleaning element can be designed as a film of a PTFE, and a second, inner interdental space cleaning element as a volume dental floss. The first interdental space cleaning element assists the simplified penetration into the interdental space. Both interdental space cleaning elements together serve for cleaning the interdental space.

The interdental space cleaning element which is manufactured in the injection moulding method can consist of hard material and/or soft material or a mixture of hard and soft material. An application of material which is used for the manufacture of injected bristles is also possible.

The distance between the holder arms or the length of the interdental space cleaning element is between 10 and 25 mm, preferably between 12 and 18 mm.

According to this further embodiment variant, the holder comprises at least one damping element. This can be important if the holder and in particular the holder arms are manufactured from a hard component. As explained hereinafter, the damping element serves for reducing knocks or impacts on the gums and teeth caused by the flosser during its use.

The damping element preferably has elastic characteristics. The elastic characteristics can be created by way of the material and/or by way of the shaping.

The damping element can consist of a soft component or comprise this. This is particularly the case if the elastic characteristics of the damping element are created by way of the material.

The damping element can be designed as a solid body, in particular if the elastic characteristics are created by way of the material.

The damping element can consist of a hard component or comprise this. This is particularly the case of the elastic characteristics of the damping element are created by way of the shaping.

Elastic characteristics due to the shaping are achieved for example by way of the design of the damping element as a hollow body, or by way of a design similar to an accordion. A hollow body comprise elastic walls for example. The damping element can moreover also be designed as an elongate element of a comparatively small diameter. The damping element can e.g. be designed as a bow.

The damping element can be shaped with a geometry which is inherently closed, half open or open.

The damping element can be integrally formed with the arms or the bow section. The damping element and the arms or bow section can be integrally manufactured in an injection moulding method. The manufacture of the flosser with a damping element can e.g. be effected in a multi-component injection moulding method.

The damping element for example can be injected onto the holder in a separate injection moulding step, in a multi-stage injection moulding method.

According to a first aspect, a damping element is arranged between the two arms and at a distance to the interdental space cleaning element in the direction of the grip body. The damping element with its damping section is directed to the interdental space cleaning element. The damping element in particular can be arranged in the bow section which connects the holder arms to one another, or can form this bow section.

The damping element serves as a protection from injuries caused by the element of the flosser which is manufactured of a hard component, with a sudden penetration of the interdental space cleaning element into the interdental space, or also as a protection from too deep a penetration of the interdental space cleaning element into the interdental space which is to say into the gums.

The damping element can e.g. be designed concavely or convexly towards the interdental space cleaning element.

The damping element can also be designed as an elastically deformable bow which is arranged in the bow section and extends between the holder arms. The bow e.g. can be designed in a flat manner. In this case, the damping material can also consist of a hard component. The bow is preferably designed in a convex manner. It is also possible for the damping element to be designed in a wave-like, holed, lamella-like manner, etc.

The damping element can also be arranged on a connection web connecting the arms to one another, in the transition to the grip body, or form this.

According to a second aspect, the damping element is arranged on the holder arm at the inner side and/or at the outer side. The damping element departing from the bow section can extend up to the connection locations of the interdental space cleaning element on the holder arms. "At the inner side" means that the damping element is directed towards the interdental space cleaning element.

The damping element in particular damps impacts of the flosser against teeth and gums as can occur when moving the flosser to and fro.

According to a particular embodiment, the interdental space cleaning element preferably leads through the damping element, at the connection location of this interdental space cleaning element to the holder arm. I.e. the damping element is arranged around the connection location of the interdental space cleaning element. The interdental space cleaning element can also be connected to the damping element, and in particular it can be integrally connected.

The diameter of the damping element can e.g. be 1 to 6 mm, preferably 2 to 4 mm. The diameter preferably reduces departing from the holder arm, in the direction of the opposite holder arm.

The length of the damping element in the direction of the interdental space cleaning element for example is 1 to 4 mm, preferably 2 to 3 mm.

The damping element for example can be arranged around the interdental space cleaning element in a rotationally symmetrical manner. The damping element can also have a shape adapted to dental geometry.

The damping element can be designed as a hollow body or as a solid body, and a shaping in the manner of an accordion is particularly possible.

The damping element can be fixed on the respective holder arm, for example injected on, bonded on or mechanically locked. The damping element can moreover also be arranged in a loose manner, i.e. in a manner movable in the longitudinal direction of the interdental space cleaning element.

According to a third aspect, the damping element is arranged on the end section of the holder arms. Knocks caused by the ends of the holder hitting the teeth and gums are damped by way of this. The damping element can e.g. be arranged in a cap-like manner over the end section. The end section can be coated with a soft component.

The length of the coating in the direction of the holder arms can e.g. be 1 to 5 mm, preferably 1 to 3.5 mm. The layer thickness can e.g. be 0.1 to 1.5 mm, in particular 0.3 to 1 mm.

According to a fourth aspect, the damping element is arranged in an arched manner along the inner bow formed by the bow section and the holder arms, i.e. along the bow section and the holder arms. The damping element can further extend around the end sections of the holder arms to their outer sides and cover the end surfaces of the holder arms.

The damping element in particular is designed as a type of lip.

According to a first variant, the damping element is fastened on the bow section and the holder arms, in particular fastened in a continuous manner.

According to a second variant, the damping element is designed as an exposed, lip-like element along the inner bow. Thus the damping element can be fastened e.g. only with its end sections, onto the holder arms on the outer side of these and in the region of their end sections.

Intermediate forms between the first and second variant are also possible by way of the damping element e.g. being fastened on the inner bow in a pointwise manner or in sections, and being designed in an exposed manner in sections.

Damping elements according to the first, second, third, fourth and fifth aspect can be infinitely combined with one another.

The flosser can moreover comprise a tensioning element for tensioning the interdental space cleaning element, in particular the fibre body. The tensioning element can be a finger rest on one of the holder rms. The tensioning of the interdental space cleaning element is effected by way of the application of pressure onto the finger rest by a finger.

The holder arm which is applied for tensioning preferably comprises an elastic zone, so that this is suitably elastically bendable for tensioning the interdental space cleaning element. This e.g. can be a tapering in the holder arm, or an arm section from or with a soft component.

The tensioning element is preferably arranged on the holder arm which is arranged on the grip body side.

According to a further embodiment variant, the flosser in the grip body comprises at least one or more further functional element for oral hygiene. The further functional element or elements are preferably integrally formed with the grip body. The further functional element or elements in particular are integrally manufactured with the grip body in an injection moulding method. Accordingly, it can consist of the same material component as the grip.

The further functional element can consist of or comprise a material component such as e.g. a soft component, which is different with respect to the grip body.

Moreover, it is also possible for the functional element to be manufactured from the same material component as the grip body, but in a separate injection moulding step. A different colour for example can be realised in the manner, or other additives can be admixed to the material component.

The further functional element can be bent away out of the grip body and angled away from this via a hinge which is integrated between the grip body and the functional element. Moreover, it is also possible for the hinge to be arranged in the grip body, and a part of the grip body to be able to be pivoted away via the hinge, by which means the functional element is released from the grip body. The hinge for example can be a film hinge.

The pivot angle can be infinite and is fixed by the geometric constraints. The pivot angle in particular can be 30, 60, 90, 120, 150 and 180 degrees.

The further functional element can comprise a first connection means. Preferably, a second connection means is also arranged on the grip body. The connection means are designed for forming a releasable or non-releasable connection between the functional element and the grip body in the pivoted-out condition of the functional element when this is in its functional position.

A possible design of the connection means mentioned above is hereinafter disclosed of example in the context of the toothpick. The connection means can be applied to different functional elements such as toothpicks, tongue cleaners, polishing elements, mirrors, interdental brushes etc.

A predetermined breaking location can also be provided instead of a hinge, via which predetermined breaking location the functional element can be broken away from the grip body and be used as a separated part.

Moreover, a connection element can be provided on the grip body, and this element permits the functional element which is broken away from the grip body to be assembled or fastened on this again. This can be accomplished by way of a positive-fit connection, such as a detent connection for example.

The further functional element for example can be a toothpick. The toothpick can be attached on the flosser in a fixed manner or, as already described, can be folded out of the flosser or be separated from the flosser.

The toothpick comprises a cleaning tip at its free end.

The flosser can comprise a cover cap for covering the cleaning tip or the toothpick. The cover cap can be stuck on the toothpick or the cleaning tip. The cover cap can be manufactured in the injection moulding method. The cover cap can be manufactured from a different plastic material than the toothpick.

The cover cap in particular can be manufactured of a material which does not connect to the material of the toothpick. The manufacture of the cover cap can thus be effected in the same injection moulding method as the toothpick.

The cover cap itself can form a functional element. This functional element can be a brush such as a twisted brush, or a mini toothbrush. The toothpick thereby serves as a basic structure for the functional element. The cover cap is stuck on for the application of the functional element on the cover cap. The toothpick in particular is not pivotably mounted according to this embodiment variant.

The cross-sectional shape of the toothpick can be round, such as circular or oval, or polygonal, such a rectangular or triangular. The toothpick can be designed in a flat manner, with two flat sides lying opposite one another and two narrow side edges lying opposite one another.

The cross section of the toothpick can reduce from the exit point towards the cleaning tip and run into a tip or point. The cross section can moreover also be shaped in a constant manner over the length and taper to a point in an end section.

The surface of the toothpick can be smooth or rough. The surface can comprise a texture and e.g. be serrated or have a different roughness pattern, such as an erosion structure. The toothpick can also comprise projecting elements, for example in the form of geometric figures such as crosses or lines.

The toothpick can be straight-lined or arcuate, e.g. designed in a sickle-shaped manner. Straight-lined means that the cleaning tip lies in the longitudinal axis of the toothpick.

The toothpick can be pivoted from a passive position into a functional position, away from the grip body and in particular out of its plane and be angled away from this, via a hinge which is arranged between the grip body and the toothpick. A predetermined breaking location, via which the toothpick can be broken away from the grip body, can also be provided instead of a hinge.

The toothpick in the passive position can lie in the plane of the grip body.

The toothpick or generally the functional elements can be pivoted in different directions. The toothpick for example can be placed over the interdental space cleaning element or also onto the side which is opposite to the interdental space cleaning element.

The toothpick, departing from the hinge or from the predetermined breaking location preferably forms side edges which taper to one another into a tip/point. The toothpick can moreover form an upper and a lower base surface, between the side edges. The base surfaces of the toothpick for example are arranged parallel to the plane of the grip body.

According to a preferred further development of this aspect of the invention, at least the tip of the toothpick and preferably the whole toothpick is surrounded along the side edges at least partly, preferably completely, by the grip body, in the passive position. The grip body or parts thereof form a protection for the toothpick, in particular for the cleaning tip.

The toothpick and in particular the tip of the toothpick, in the pivoted-out condition, i.e. in the functional position, is preferably pivoted out of the plane of the grip body and in particular projects away from this. The cleaning tip of the toothpick points away from the grip body. The toothpick in its functional position can still lie in the plane of the grip body or form an angle to this.

The grip body for example can form an intermediate space. The grip body for example can comprise a first arm and a second arm which enclose the intermediate space. The arms for example are connected to one another in the end section of the grip body which is remote from the holder. The arms can also be the continuation of the holder arms.

The toothpick can then be arranged in the mentioned intermediate space in its passive position and be connected to the grip body via the hinge or the predetermined breakage location. The hinge or the predetermined breaking location can be arranged on the end section of the grip body which is remote from the holder, or on one of the arms or on a connection web between the two arms. The connection web for example can be arranged towards the holder.

The toothpick can also be arranged laterally on the grip body, so that the one side edge of the toothpick is directed towards the grip body and the other side end of the toothpick forms a section of the outer contour of the grip body.

A first connection means can be arranged on the toothpick, and a second connection means on the grip body. The connection means are designed for forming a releasable or non-releasable connection between the toothpick and the grip body in the pivoted-out condition of the toothpick, when this is in the functional position. The toothpick is held in the functional position by way of the described connection.

The connection means in particular are designed for forming a frictional and/or positive connection. The connection means e.g. can be designed for creating a snap connection or detent connection and comprise suitable detent or snap means.

Thus the one connection means can comprise a recesses or an opening, such as a pocket hole or through-hole, and the other connection means a prominence, e.g. nub or pin. The prominence engages into the recess or into the opening with a positive fit on reaching the functional position, when pivoting out the toothpick. The connection e.g. is created by a click effect.

The toothpick can also be broken way from the grip body via a predetermined breaking location and be put together again with the grip body in the functional position via the mentioned connection means, instead of pivoting out via a hinge.

The nub and recess or opening can be designed in a cylinder-shaped manner. The nub can have a rounding at the end side. The nub can also be designed as a hemisphere. The nub can be designed conically. I.e. the diameter at the free end is smaller than the diameter at the attachment. The nub can also be designed conically only towards the end section. The height of the conically designed end section is e.g. maximal 50% of the total height.

The recess or the opening can have a diameter of 0.5 to 2 mm, preferably 0.8 to 1.5 mm.

The nub can have a diameter of 0.5 to 2 mm, preferably 0.8 to 1.5 mm. The nub can have a height of 0.8 to 3 mm, preferably from 1.2 to 1.8 mm.

Preferably, a clamping or locking-in (detent) takes place with the interaction of the two elements of the recess and nub. The clamping is produced by an overdimension, which is to say that the two elements "overlap". The overlapping is 0.005 to 0.2 mm, preferably from 0.01 to 0.06 mm. A detent locking can be achieved by way of geometric undercuts and corresponding projections on the counter-element.

One can also envisage the hinge or the predetermined breaking location being arranged in the grip body, and one or more parts of the grip body, hereinafter protective parts, being able to be pivoted away or broken away via the hinge and the predetermined breaking location respectively, by which means the toothpick is released. The mentioned protective parts form a protection for the toothpick in its passive position.

The protection in the functional position can be fixed by one or more connection means, but it can also be designed without fixation. The same applies to the toothpick which is bent into the functional position.

The protective parts themselves can comprise a functional element such as tongue cleaner.

The grip body at least in regions can be designed in an at least two-layered manner. The one layer forms a functional element such as toothpick which in the described manner can be pivoted out of the grip body via a hinge, or can be broken away from the grip body via a predetermined breaking location.

A protective cap which can be removed for use can be arranged over the toothpick, in particular over the cleaning tip. The protective cap is preferably stuck on via a positive and/or friction connection. The protective cap can be of a soft component, for example with elastic characteristics and which jams on the toothpick. The protective cap can also be of a hard component.

The protective cap is preferably manufactured in a multi-component injection moulding method, in order to avoid an additional assembly step on manufacture, wherein the plastics of the protective cap and of the toothpick or its surface are preferably non-connecting.

The toothpick can further be provided with a soft surface, and the core consists of a hard material and the surface of soft material. The hard material and soft material in this case have a material fit.

If present, the various zones (toothpick, tongue cleaner, damping element, grip surfaces, bristle body, polishing body etc.) consisting of soft material are preferably created on the flosser in the same manufacturing step by way of a gating point.

The flosser as a further functional element can comprise a tongue cleaner. The tongue cleaner can for example comprise one or more equal or differently designed cleaning elements.

The tongue cleaner or its cleaning elements can be arranged in the grip body, in particular in its end section which is remote from the holder.

The tongue cleaner or its cleaning elements can be arranged on one or more receiving elements which are integrally formed on the grip body. The receiving element can be part of the grip body.

The receiving element can e.g. be a spring arm which on use provides a certain elasticity. The elasticity in this case for example can also be realised by locations on the spring arms, and these locations are realised as material weakenings.

The receiving element can e.g. be pivoted out of the grip body from a passive position into a functional position via a hinge, in particular a film hinge. The receiving element can also be broken way from the grip body via a predetermined breaking location.

The spring arms are preferably U-shaped contours which are closed. A realisation of spring arms which are not closed is possible, but such a design is not optimal for oral hygiene due to the risk of injury by way of piercing.

The mentioned spring elements for example permit the realisation of different cleaning elements on different spring arms and thus of a tongue cleaner constructed with spring arms. Such a construction for example would be possible by way of several U-shaped spring arms which lie in one another. The cross section of the individual spring arm can change over the length, for example from the spring arm profile to the scraper edge profile.

The tongue cleaner or its cleaning element can also be arranged on the holder or on its holder arms, on the bow section, on the toothpick or on another functional element.

Thus the tongue cleaner or its projecting cleaning elements, such as nubs or lamellae, can be arranged on the outer side of the holder arm. The cleaning elements can e.g. be arranged on the holder arm in a row next to one another. The cleaning of the tongue is effected in a movement direction transversely to the longitudinal direction of the flosser.

The cleaning elements can be arranged and aligned such that the cleaning movement can be carried out transversely to the longitudinal axis of the grip body or in the longitudinal axis of the grip body.

The cleaning element can e.g. be a lamella. The lamella can e.g. be arranged in the longitudinal axis of the grip body, transversely thereto or at an angle to the longitudinal axis. The lamella can comprise an end-edge. The lamella e.g. is flexibly, i.e. compliantly designed. The lamella in particular can have elastic characteristics. The lamella or the previously described spring arm can be manufactured from a soft component or a combination of a soft component and hard component.

Thus the lamella e.g. can comprise a support body of a hard component and on the support body can comprise a cleaning part of a soft component.

The lamella can have a width of 0.25 to 1.2 mm, preferably from 0.6 to 0.9 mm. The lamella can have a height of 0.4 to 3 mm, preferably from 1 to 2 mm. The lamella can have a length of 0.5 to 2.5 cm, preferably from 1.5 to 2 cm.

The tongue cleaner can comprise several lamellae, which are e.g. arranged successively in a row. The lamellae can also form a lamellae field. The lamellae can be of the same type or be different with regard to the geometry and/or material. Thus soft and hard lamellae can alternate.

An individually standing lamella which is set apart from the rest of the tongue cleaner is also called a scraper edge. Scraper edges are manufactured of hard material or of a combination of hard material and soft material, preferably of hard material.

The cleaning element can also be a nub. A nub is to be understood as a bump-like, conical or ball-like prominence on a surface.

The nub e.g. is designed in a flexible, i.e. compliant manner. The nub in particular can have elastic characteristics. The nub can be manufactured from a soft component, a hard component or a combination of hard and soft component.

Thus the nub can e.g. comprise a support body of a hard component, and a cleaning part of a soft component which is on the support body.

The nub can have a diameter of 0.25 to 1.2 mm, preferably 0.6 to 0.9 mm. The nub can have a height of 0.25 to 0.6 mm, preferably from 0.3 to 0.45 mm.

The tongue cleaner can comprise several nubs, which are arranged one after the other in a row or next to one another in a line. The nubs can moreover form a nub field.

Nubs and/or lamellae and/or scraper edges can be manufactured integrally with the flosser or with the grip body in an injection moulding method, in particular in a multi-component injection moulding method.

The cleaning element can also comprise a bristle body. The bristle body comprises a plurality of bristles. The bristles can be integrally manufactured with the flosser, i.e. injected, in an injection moulding method.

The diameter of an individual bristle is e.g. 0.25 to 1.2 mm, preferably 0.6 to 0.9 mm. The length of an individual bristle is e.g. 1.5 to 4 mm, preferably 2 to 3 mm.

The cross-sectional contour of the individual bristles can e.g. be closed or open. The bristle can also be designed as a hollow body. The cross-sectional contour however should be capable of being injection moulded.

The individual bristle can comprise a closure cap. This can be designed in a polygonal or round manner. The bristle body can contain individual rows of bristles. The bristle body can also comprise a bristle field.

Combinations of different cleaning elements such as lamellae, bristle bodies and nubs, are also possible. Thus nubs and lamellae can alternate with one another. The lamellae and bristle bodies can also alternate with one another.

The flosser can comprise a polishing element as a further functional element. The polishing element serves for polishing surfaces of the teeth, in order e.g. to free these from deposits.

The polishing surface preferably consists of a soft component. The polishing element can be a solid body, e.g. of a soft component. The polishing element can also have a base body, e.g. of a hard component, and a polishing part, e.g. of a soft component, which is arranged on the base body. Furthermore, it is possible to design the polishing element as a spherically shaped membrane of a soft component, wherein the membrane is fixed on a frame of a hard component. The soft component preferably has elastic characteristics.

The polishing part can also be designed as a membrane of a soft component, wherein the membrane is fixed on a frame of a hard component forming a part of the base body. The membrane is preferably designed in an elastic manner.

The polishing element can be arranged in the end section of the grip body which is remoter from the holder.

The polishing element can form a polishing surface which is arranged in an elevated or raised manner with respect to the grip body. The polishing element for example can be designed in a bump-like manner.

The polishing element can have a diameter of 3 to 15 mm, preferably 4 to 8 mm. The polishing element can have a height of 1 to 5 mm, preferably from 2 to 3 mm. A polishing part which is designed as a membrane can have a thickness of 0.3 to 1.2 mm, preferably from 0.5 to 0.8 mm.

The flosser can also comprise a mirror as a further functional element. The mirror, analogously to the toothpick can be folded out via a hinge or be separable from the flosser via a predetermined breaking location. The disclosure with respect to this is referred to.

The mirror can be integrated into the flosser as an insert, in the injection moulding method.

The flosser as a further function element can comprise a mini toothbrush, in particular a disposable toothbrush, with a bristle field. The bristles in particular are injected in the injection moulding method. The mini toothbrush can be folded out via a hinge, such as a film hinge. The mini toothbrush can be separable from the flosser e.g. via a predetermined breaking location.

The flosser as a further functional element can comprise an interdental brush. The interdental brush can be attached on the grip body and, analogously to the toothpick, for example via a hinge is pivotable or foldable out of the grip body from a passive position into a functional position. The interdental brush can also be broken away from the grip body also via a predetermined breaking location. The grip body or parts thereof, analogously to the toothpick, can form a protection for the interdental brush in the passive position.

The interdental brush can also be integrated into the interdental space cleaning element which is arranged between the holder arms and is held by these. The interdental space cleaning element comprises the bristles as described above for this.

The interdental brush comprises a plurality of bristles. The bristles or the interdental brush can be injected in an injection moulding method and be an integral part of the flosser.

The interdental brush can also be arranged as a so-called single tuft and be attached on the flosser by way of a tufting method.

The interdental brush can also be a brush which is twisted in.

The interdental brush can comprise a base body, such as e.g. a rod-like element, from which the bristles lead away. The bristles can be aligned in the plane of the base body.

The flosser as a further functional element can comprise a suction cup. The suction cup can be attached on the grip body. The suction cup serves for fastening the flosser on a surface. The flosser can thus be hung on a bathroom mirror or be securely placed in a standing manner on a surface, by way of the suction cup.

The flosser as a further functional element can comprise a foot element or a support element for supporting the flosser on a surface. The foot or the support element can be attached on the grip body.

The foot can be folded out, e.g. via a film hinge. The foot can also be separable from the flosser, e.g. via predetermined breaking location, and can be fastened onto the flosser via a positive connection, e.g. plug-in connection, for carrying out its function.

The support element can e.g. be designed as a stand. The stand e.g. can be folded out. The stand e.g. with the flosser can form a tripod. The stand can be folded out via a film hinge, analogously to the toothpick. The description with regard to this is referred to.

The foot or the support element permits the flosser to be set up for drying.

The suction cup or the foot element or a support element can be integrally manufactured together with the flosser or the grip body in an injection moulding method, in particular in a multi-component injection moulding method.

The flosser can comprise one or more functional elements for dispensing at least one active substance. The at least one active substance, e.g. together with a suitable carrier material forms the functional element.

The functional element for example can be an active body, in particular an active bead. The active body can be a solid body.

The active bead can e.g. comprise a mouthwash or a tooth-cleaning substance.

An "active bead" in this description is to be understood as a round body with an active substance.

The active substance, in particular together with a carrier material can be present in a granular, powdery, fluid, pasty or gel-like form. The active substance of the functional element for example can be water-soluble.

The active substance can serve for cleaning, disinfection, for flavouring and/or for perfuming in the context of oral hygiene. The activate substance can also serve for indicating the successive of cleaning. The active substance can also serve for bleaching the teeth.

For this reason, the following types of active substances can be differentiated:

Active substances for cleaning teeth. These can develop an effect similar to toothpaste. The active substances can be: sorbitol, aromas, hydrated silica, sodium lauryl sulphate, sodium monoflourophosphate, creatine, zinc sulphate, tricolsan, glycerine, sodium saccharine, propylene glycol, disodium phosphate, alumina, trisodium phosphate, sodium fluoride, betaine, titanium dioxide, cellulose gum, tetrasodium pyrophosphate, etc.;

Active substances with an antibacterial effect: The active substances can be: sodium bicarbonate, citric acid, phosphoric acid, sodium carbonate, potassium carbonate, sodium perborate, sodium hexametaphosphate, sodium benzoate, sodium stearate, etc.;

Active substances for indicating the success of cleaning, e.g. by colouring the plaque on the tooth surface. The active substances can be: glucose, maltodextrin, magnesium sterate, aroma, saccharin, microcrystalline cellulose, etc.;

active substances with additional active ingredients, which assist the previously mentioned effects;

active substances for bleaching/whitening the teeth. The active substances can contain hydrogen peroxide.

The cleaning substance in cooperation with conventional cleaning means, in particular toothpastes, can also acts as a two-component system. A chemical or physical reaction arises when the active substances come together. This system in particular is envisaged for active substances which cannot be integrated together into a cleaning means, such as toothpaste, since they would otherwise directly react with one another.

The functional element can comprise one or more different active substances. The functional element can comprise several active substances which are released one after the other in a temporal sequence and thus develop different active phases.

The functional element for this purpose can be an active body in the form of a solid body which comprises several shells or layers, in each case with different active substances, wherein one shell or layer after the other is broken down (decomposed) over the course of time.

The active body can comprise a shell and a fluid or powdery or grainy core, which is released after the breakdown of the shell.

The functional element with its release region for active substances in particular is arranged in the proximity of cleaning elements, such as bristles and/or soft elastic elements, and these have the effect that the active substances develop their optimal effect in interaction with the mechanical movements of the cleaning elements.

Moreover, the cleaning elements can be designed such that the functional element for active substances is part of the cleaning element.

The cleaning elements can be adapted to the characteristics of the active substances, in order to achieve optimal results. For example:

with mini toothbrushes, abrasive active substances in combination with short bristles for surface cleaning with a "whitening" effect;

antibacterial active substances for deep cleaning in combination with longer interdental bristles;

skin-care active substances in combination with rubber-elastic polishing elements, massage elements or cleaning elements for revitalising gums, oral cavity or tongue.

The active body is e.g. attached on the flosser. The active body can e.g. be arranged in a recess in the flosser, e.g. in a deepening in the holder arm.

The functional element, in particular active body can be arranged on a tongue cleaner, on a polishing element, on a toothpick, on an interdental brush, on a mini toothbrush, on the holder arms, on the interdental space cleaning element, on the damping element or directly on the grip body.

The mini toothbrush in particular in the region of the bristle field can comprise an active body, in particular an active bead, with a cleaning-effective active substance.

Thus the active substance can have e.g. an antibacterial effect in the brush head of an interdental brush or a mini toothbrush.

The functional element can also be attached as a coating, i.e. by spraying on, immersing, brushing, vapour deposition, etc. The functional element can be attached in an injection moulding procedure. The functional element can also be attached by way of bonding, e.g. as a label. The functional element can also be assembled or attached in an undercut. The functional element can also be attached by a positive-fit connection, such as a rivet connection.

Materials having an active ingredient often do not assume a material connection with other plastics, so that a mechanical connection, in particular by a positive fit becomes necessary in these cases.

The active substance for example can be a mouthwash, toothpaste or a tooth cleaning extract.

It is moreover possible to integrate this functionality in another functional element. The functional element with the active substance can thus be attached on a tongue cleaner or a polishing element, and specifically on a side which lies opposite to the cleaning-effective or polishing-effective side.

The flosser can comprise a sensor element as a further functional element. The sensor element can be attached on the grip body. The sensor element for this can be designed to detect certain parameters such as halitosis, pH-value or bacteria. The sensor element can be attached on the flosser as a sensor strip.

The grip body can form special grip surfaces, in particular grip recesses, for improving the grip. These are characterised by a special structuring or texture of the surface (roughness pattern) and/or by a special material selection (bonding characteristics). The grip surface can therefore comprise grooves, lamellae or nubs. Writing or logos (raised or sunk in the body) can also be incorporated into this structure and these of course also serve for an improved gripping.

The material can also have good adhesion characteristics. Such adhesion characteristics are achieved e.g. with the use of a soft component or a rubber-like material. Thus in particular the grip body can comprise a thumb grip. The surface of the thumb grip, i.e. the grip surfaces, can be designed as described above and e.g. be of a soft component or comprise these.

The cleaning elements such as nubs and lamellae can moreover form grip surfaces for the fingers, in particular for the thumb. Thus for example the tongue cleaner can also serve as a thumb grip.

The grip body moreover can comprise openings or recesses for the purpose of saving material and or optimising the weight.

The flosser can moreover comprise means for tensioning the interdental space cleaning element. These means, which are described hereinafter by way of two embodiments, can be applied to any flossers.

The interdental space cleaning element, in particular a dental floss, often loses a pretensioning incorporated before and during the injection moulding step, due to the cooling and shrinkage of the plastic of the flosser, in particular of the holder arms, subsequently to the injection moulding step. The means for tensioning, in particular should then counteract the loss of the pretensioning due to the material shrinkage.

According to a first variant with regard to this aspect of the invention, at least one holder arm or both holder arms comprise at least two different materials, in particular plastic materials. The at least two materials are characterised in particular by way of a different shrinkage behaviour on cooling. An effect similar to the bimetallic principle is achieved by way of this.

The materials are then arranged in the at least one holder arm such that the pretensioning of the interdental space cleaning element is retain during the cooling, or is broken down to a lesser extent, or the tension is even increased, subsequent to the injection moulding process with the cooling of the flosser.

The at least one holder arm for example is designed in a multi-layer manner transversely to its longitudinal direction. Thus a plastic material with a higher shrinkage can be arranged on the outer side of the holder arm, and a plastic material with a lower shrinkage in a comparison between the two plastic materials can be arranged on the inner side of the holder arm.

Thus an outwardly directed force counteracting a reduction of the pretensioning, can act upon the holder arm during the cooling due to the special arrangement of at least two different plastic materials.

The at least one holder arm in particular can be bent outwards during the cooling, and thus tension the interdental space cleaning element.

The at least two plastic components in the holder arm can be connected to one another via a material connection or positive connection.

According to a second variant, the flosser comprises a tension element. The tension element can e.g. be a rib or web, in particular connection rib or connection web. The tension element in particular is connected to a holder arm. The tension element can be designed and arranged on the flosser such that this, on cooling, exerts a tensile stress or tension acting outwards away from the interdental space cleaning element, upon the holder arm due to the shrinkage. This tensile stress has the effect that the pretensioning of the interdental space cleaning element is retained during the cooling or is broken down to a lesser extent, or the tension is even increased.

The tension element can even have the effect that it bends the holder arm outwards away from the interdental space cleaning element during the cooling, and thus increases the tension of the interdental space cleaning element.

The tension element in particular is attached on the holder arm at the outside. The tension element in particular at the outer side connects the holder arm to the grip body or to a neck section. The tension element in particular spans a bending or bow, which is formed by the holder arm and the grip body. The tension element in particular can be arranged on the inner holder arm of a flosser designed in a bent or angled manner, said inner holder arm facing the grip body.

The tension element in particular is likewise manufactured of plastic and by way of injection moulding. The tension element in particular is manufactured together with the flosser in an injection moulding method. The tension element can be of the same plastic as the holder arm or the grip body.

A further embodiment of a flosser is characterised by the particular type of its manufacture.

A flat or two-dimensional component of plastic or containing plastic is manufactured in a first step. The flat component can be plate-like. The flat component in particular is a flat extrusion profile of plastic. The component in particular is designed in a tape-like manner. The component in particular is a longitudinal component.

The component in particular comprises a longitudinal groove. This can be incorporated into the component at a later stage. The longitudinal groove can also be co-extruded with the extrusion profile.

In a second step, recesses which are open to the longitudinal side are incorporated into the component next to one another on the one longitudinal side of the component and at a distance to one another. The recesses e.g. can be incorporated by punching out. The recesses in particular are arched. The recesses in particular are identical in each case.

The finger-like integral formations result between two recesses in each case. These form the later holder arms. The recesses between the finger-like integral formations form an intermediate space which is spanned by the interdental space cleaning element which is incorporated at a later stage.

The longitudinal groove after this step is arranged in the form of longitudinal groove sections in the finger-like integral formations. The longitudinal groove is no longer continuous but interrupted.

The interdental space cleaning element, in particular a fibre body or a dental thread, is inserted into the longitudinal groove sections in the finger-like integral formations and fixed in these, in a third step. The fixation can be effected by way of locking, clamping, bonding, welding or pressing.

According to an alternative embodiment, a film hinge can be provided instead of a longitudinal groove, to which film hinge a pivot section connects towards the longitudinal side. The pivot section in particular forms a later end section of the finger-like integral formation. The interdental space cleaning element is now inserted in the region of the pivot section and is clamped by way of pivoting the pivot section. The interdental space cleaning element alternatively to this can also be additionally bonded or welded.

In a fourth step, the individual flossers are separated from the prepared component along a predefined partition line, e.g. by way of punching out. The partition line in each case leads through the finger-like integral formations and divides these in each case into a holder arm of two adjacent flossers.

The separated-away flosser comprises two holder arms, an interdental space cleaning element running between these, and a grip body.

The present embodiment is characterised by a favourable and extremely rational manufacturing process which is perfectly suitable for mass production. The flossers which are manufactured in this manner have an optimal tension of the interdental space cleaning element, since here the pre-tensioning is not broken down by way of the effects of shrinkage, in comparison to the injection moulding method, and this is due to the fact that the processing of the extruded component preferably takes place in the cooled-down condition.

A further embodiment of a flosser is likewise characterised by the particular type of manufacture.

Two flat components of plastic or containing plastic are manufactured in a first step. The components can be films or plates. The components can be extrusion components.

In a second step, recesses are incorporated into the components on the one longitudinal side of the two flat components, next to one another and at a distance to one another, said recesses being open to the longitudinal side. The recesses can be incorporated e.g. by way of punching out. The recesses e.g. are arched. The recesses in particular are identical in each case.

Finger-like integral formations result between two arched recesses in each case. These form the later holder arms. The recesses between the finger-like integral formations form an intermediate space which is spanned by the interdental space cleaning element which is introduced later.

In the third step, the two components are led together and connected in a surfaced manner. The recesses or the finger-like integral formations in the two components are thereby aligned to one another, e.g. in a register.

The interdental space cleaning element in the region of the end sections of the finger-like integral formations is inserted between the two components on or before joining the two components together, and connected to the two components. The connection of the two components and accordingly the fastening of the interdental space cleaning element can be effected by way of bonding or welding.

The connection of the two components can either be effected over the whole surface, i.e. over the whole identical surface of the components, or only partially, i.e. over a part of the whole identical surface.

In a fourth step, individual flossers are separated out of the prepared component along a predefined partition line, e.g. by punching out. The partition line leads through the finger-like integral formation and subdivides this in each case into a holder arm of two adjacent flossers.

The flosser which is separated out comprises two holder arms, a dental thread running between these, and a grip body.

A three-dimensional structure with prominences and recesses in the component, in particular in the later grip body of the flosser, can be incorporated into the flat components by way of a deep-drawing method or an embossing method. The three-dimensional structures can improve the haptics and the stability of the flosser.

The three-dimensional structures can be brought into one or both of the components before the connection of the components. The three-dimensional structures can also be brought into one or both of the components after the connection.

The incorporation of three dimensional structures in the region of the thread holding/mounting can serve for improving the holding or mounting of the thread.

Moreover, it is possible to apply haptics labels on the surface, in order to improve the haptics, wherein these haptics labels give the surface more structure and thus improve the ergonomy or the grip.

The present embodiment in characterised by a favourable and extremely rational manufacturing process which is particularly suitable for mass production. The flossers which are manufactured in this manner have an optimal tension of the interdental space cleaning element, since here the pre-tensioning is not broken down due to the effects of shrinkage, in comparison to injection moulding methods.

It can occur that sharp edges arise at the punch edges/cutting edges after the punching and cutting respectively, with those embodiments, with which the flossers are punched out or cut out. It is therefore possible to post-treat these edges. This can be effected for example by way of grinding or heat treatment.

A further post-treatment possibility relates to the interdental space cleaning element. Certain characteristics which the interdental space cleaning element is supposed to have can have negative effects with regard to the manufacturing process. For this reason, it is possible to provide the interdental space cleaning element with these characterises not until in a post-treatment. Hereby, the possibilities in particular are the later deposition of substances for changing the sliding properties or of aromas or active ingredients.

The interdental space cleaning element can be of polyamide (PA), in particular PA6, PA6.6, PPA6.10, PA6.12, of polytetrafluoroethylene (PTFE), of polyethylene (PE) or of polyester. The interdental space cleaning element can be coated or non-coated. Thus the interdental space cleaning element can be waxed or non-waxed. Bees wax (Cera Alba), Cera Microcristallina or Vinpas® of the company Wacker Chemie AG are considered as waxes for example.

The interdental space cleaning element can moreover be impregnated or comprise a further coating. The impregnation or coating can serve for providing an aroma (e.g. mint). Moreover, the impregnation or coating can also comprise an active ingredient such as fluoride (sodium fluoride or ammonium fluoride) or chlorhexidine.

The flosser can have a total length of 6 to 11 cm, preferably of 7 to 9 cm. The flosser can have a total width of 2 to 4 cm, preferably 2.5 to 3.5 cm. The flosser can have a height of 1 to 3 mm, preferably of 1.5 to 2.3 mm. The details regarding the height only relate to the grip body but not the functional elements which are arranged thereon and whose dimension can vary therefrom. The ratio of the height to length can be 1:11 to 3:11, preferably 3:18 to 2.3:7.

The soft components can e.g. be a thermoplastic elastomer (TPE). The soft component can for example be a:
  thermoplastic polyurethane elastomer (TPE-U);
  thermoplastic styrene elastomer (TPE-S), such as for example a styrene ethylene butylene styrene copolmer (SEBS) or styrene butadiene styrene copolymer (SB S):
  thermoplastic polyamide elastomer (TPE-A);
  thermoplastic polyolefin elastomer (TPE-O)
  thermoplastic polyester elastomer (TPE-E) or
  a polyethylene which is softer than the hard component (PE).

The hard component can for example be a:
  styrene polymerisate, such a styrene acrylonitrile (SAN), polystyrene (PS), acrylonitrile butadiene styrene (ABS), styrene methyl methacrylate (SMMA) or styrene butadiene (S B);

polyolefin, such as polypropylene (PP) or polyethylene (PE) for example also in the forms of high density polyethylenes (HDPE) or low density polyethylenes (LDPE)

polyester, such as polyethylene terephthalate (PET) in the form of acid-modified polyethylene terephthalate (PETA) or glycol-modified polyethylene terephthalate (PETG), polybutylene terephthalate (PBT), acid-modified polycyclohexylene dimethylene terephthalate (PCT-A) or glycol-modified polycyclohexylene dimethylene terephthalate (PCT-G);

cellulose derivative such as cellulose acetate (CA), cellulose acetobutyrate (CAB), cellulose propionate (CP), cellulose acetate phthalate (CAP) or cellulose butyrate (CB); polyamide (PA) such a PA 6.6, PA 6.10 or PA 6.12;

polymethyl methacrylate (PMMA);

polycarbonate (PC);

polyoxymethylene (POM);

polyvinyl chloride (PVC) or a polyurethane (PUR).

A polypropylene (PP) with a modulus of elasticity of 1000-2400 N/mm, preferably from 1300 to 1800 N/mm$^2$ is preferably applied as a hard component. A TPE-S is preferably applied as a soft component. The shore A harness of the soft component preferably lies below 90 Shore A, preferably below 40 Shore A.

The thermoplastics polyethylene (PE) and polyurethane (PU) can be applied as hard or soft components.

The applied hard and soft components are preferably processed in the injection moulding method and preferably form a material fit.

If the bristles of the interdental brush, of the tongue cleaner or of the interdental space cleaning element are injected in the injection moulding method, then these can be of the following material:

polyamide elastomer (e.g. Grilflex ELG 5930 of the company Ems-Chemie AG)

polyester elastomer (e.g. Riteflex 672 RF Nat or Riteflex RKX 193 RF Nat of the company Ticona Polymers or Hytrel 7248 of the company DuPont).

These materials for bristle elements e.g. have a Shore hardness of 0 to 100, preferably 30 to 80.

Of course, it is possible to apply so-called bio-plastics (organic plastics), thus plastics which are manufactured from renewable raw materials, for all applied components.

The material components can also be biologically degradable. The material components in particular can be biologically degradable plastics.

Moreover, material components which are water-soluble can be applied for manufacturing the flosser. The material components can moreover be edible.

The material components can e.g. comprise hydrocolloids, starches, rubber arabicum, polyvinyl alcohol or Polyox® or consist thereof.

The material components can also comprise Polyox® or consist thereof. Plyox® is marketed by Dow Chemical. It is a water-soluble artificial resin based on polyethylene oxide polymers. Polyox® has thermoplastic characteristics and can therefore be processed in a varied manner, e.g. moulding, injection moulding, extrusion, etc.

Poylox® is also suitable for forming matrix or a carrier (active body) for an active substance.

The manufacture of the dental cleaning apparatus is preferably effected in one or more steps in one or more injection moulding tools.

The manufacture in particular is effected in one or more manufacturing steps which in particular are integrated into a common process sequence or course.

If the interdental space cleaning element is likewise injected in an injection moulding method, then this can be effected by way of an injection compression moulding method. With this method, the tool cavity is not completely closed until after the injection of the plastic mass, which is to say the cavity is further restricted, i.e. reduced in size in the closed condition.

The material is thus injected into the cavity with pressure. Fine structures can be incorporated into the interdental space cleaning element in an improved manner by way of this. The precision of the interdental space cleaning element which per se is quite delicate is greater.

Moreover, the tool cavity can be treated in special manner in the region of the interdental space cleaning element to be injected, and e.g. comprise erosion structures or etching structures (i.e. the tool cavity is treated with acid on certain surface parts). Such structures increase the roughness of the tool cavity and can therefore provide the interdental space cleaning element with a special surface texture.

If the interdental space cleaning element, such as fibre body or dental fibre is not manufactured in the injection moulding method, then this in particular is inserted into the tool mould as an insert.

A tool mould can thus contain several cavities, in each case for one flosser. The interdental space cleaning element is then tensioned at one go over several cavities. The interdental space cleaning element can be tensioned on the movable tool mould part or on the fixed tool mould part. The tool mould is closed and the flosser injection moulded after the insertion of the interdental space cleaning element.

The interdental space cleaning element in particular is separated from the tool mould directly before or during the ejection of the flosser from the tool mould, so that the individual flossers are no longer connected to one another via the interdental space cleaning element. The interdental space cleaning element in particular is cut before the flosser is ejected from the cavity. A precise step can be carried out due to the fact that the flosser is positioned in the cavity in a precise manner, and this would no longer be possible in such a simple manner after the ejection of the flosser. The cutting can be effected by way of a cutting tool.

In a further method step, anchoring elements can be attached or created on the interdental space cleaning element, and these effect the anchoring of the interdental space cleaning element in the subsequently injection moulded holder arms.

If the interdental space cleaning element consists of plastic, then a thickening acting as an anchoring element can be formed by way local singeing-on or melting-on. The singeing or melting can be effected by way of a flame or a heated punch. The singeing or the melting can be effected before the injection moulding, when the interdental space cleaning element is tensioned in the tool mould.

The problem of the good sliding characteristics being of a hindrance for the optimal holding in the holder arm exists if the interdental space cleaning element consists of PTFE dental floss. The good sliding characteristics however are advantageous for the application of the interdental space cleaning element in the interdental spaces.

Starting from this problem, the interdental space cleaning element can be provided with through-openings such as a perforations, in the anchoring regions, independently of its material or geometric nature. The through-openings have the effect that the injected plastic material of the holder arm penetrates the through-openings and thus creates an anchoring.

A loop, windings or a knot can moreover be applied in the anchoring regions. These too effect an anchoring of the interdental space cleaning element.

Moreover, the surface can be roughened in the anchoring regions of the interdental space cleaning element. This for example can be effected by way of etching or sand blasting.

The interdental space cleaning element can moreover also be a volume dental floss. This is characterised by a fibre body which on use fluffs up or swells out and thus becomes voluminous. The volume dental floss can then be fluffed up or swelled in the anchoring regions beforehand. The subsequently injected plastic components of the holder arms create an optimal anchoring in the fluffed-up or swelled up region. In this case, the injected plastic component likewise flows through the dental floss.

The dental cleaning apparatus can be manufactured by way of different injection moulding technologies.

A first injection moulding technology is the core-back multi-component, in particular two-component injection moulding technology which has already been described further above.

A multi-component, in particular two-component injection moulding method can also be carried out by way of a so-called transfer injection moulding tool. With this method, a first component is moulded in a first working region in a first tool cavity of the injection moulding tool. The preform is thereafter removed from the mould and transferred. A second component is moulded in a second mould cavity of a second working region of the injection moulding tool.

The transfer is effected by way of a transfer device. The transfer device forms a part-cavity of the first tool cavity. On transfer, the preform (premoulding) is then held by the part-cavity and is laterally displaced with the part-cavity. The laterally displaced part-cavity subsequent to the transfer is complemented by a stationary cavity part into a second tool cavity. The second component in particular is thereby injected into the stationary cavity part.

In the case that the interdental space cleaning element is designed in a separate manner, then this at the first tool cavity in a first working region is tensioned into the tool mould before the first injection moulding step. The interdental space cleaning element is cut by way of a cutting tool before the transfer for the purpose of carrying out the second injection moulding step.

Such a transfer tool for example is described in the patent publications EP-B1 166 992. This patent publication is referred to concerning further details of this injection moulding technology.

Moreover, servo cavity positioning system (SCPS) injection moulding tools, as are described in the patent publications DE-A10 2004 056433 and DE-A-10 2005 029365 are also suitable for multi-component injection moulding methods. These patent publications are referred to with regard to further details of this injection moulding technology.

A multi-component, in particular two-component injection moulding method can also be carried out by way of a so-called rotary table injection moulding tool. According to this injection moulding method, arising preforms are arranged in movable tool parts which are arranged on a rotary table of the injection moulding tool and are led to various injection stations for injecting several materials, by way of rotating the rotary table. The movable tool parts form tool cavities which unite with the tool cavities on the stationary tool parts of the injection station into a closed cavity, for carrying out an injection moulding step.

One does not necessarily need to carry out an injection moulding step at all stations. Thus other processing steps, such as cooling of the preforms or of the completed flosser, cutting a interdental space cleaning element inserted into the tool mould or an ejection of the finished flosser can also be carried out at a station.

An inserted interdental space cleaning element in particular is inserted on the stationary part of the tool mould of the injection moulding tool. The preform or the completed flosser in particular is held by the movable part of the tool mould.

Such a rotary table tool for example is described in the patent publication EP-A-0 671 251. This patent publication is referred to concerning further details of this injection moulding technology.

A further possibility for the application of the multi-component injection moulding method is so-called helicopter technology, with which so-called helicopter tools are applied.

With this technology, plastic parts are injection moulded in several injection moulding stations. The transfer of the plastic parts or the preforms is effected by a transfer robot, which forms rotor blades. Cavities are formed on the rotor blades. The preforms are held in the cavities on the rotor blades and are brought to the next processing step in this manner on transfer. The rotor blades are rotated about a rotor axis for this.

A significant advantage of this tool technology is the fact that one succeeds in the finished plastic parts being able to be removed during which the injection moulding procedure runs, on account of the arrangement of the rotor blades and the release of certain cavities.

Such a helicopter tool is described in the published document DE 103 35 223. This publication is referred to with regard to further details of this injection moulding technology.

A multi-component, in particular two-component injection moulding method can also be carried out by way of a so-called index plate injection moulding tool. The index plate injection moulding tool is characterised by a stationary tool plate which e.g. is at the nozzle side, and by a movable tool plate, and these comprise tool cavities which face one another and complement one another into closed injection moulding cavities.

The movable tool plate is linearly movable to the stationary tool plate and away from this, for opening and closing the injection moulding tool.

An index plate which is movable relative to the movable tool plate is contained in this movable tool plate. The index plate in a linear movement can be retracted out of the plane of the tool plate and extended back into this. The index plate is rotatable about a rotation axis in the retracted condition.

The index plate forms co-moved part-cavities which amongst other things serve for holding and transporting the preforms from a first injection station to a subsequently arranged injection station. The part-cavities compliment the tool cavities in the movable tool plate.

The preforms which are held in the part-cavities of the index plate can now be transferred to different injection stations and/or processing stations in the tool plate by way of retracting the index plate out of the movable tool plate and rotating the index plate about the rotation axis.

The injection moulding tool comprises a feed runner system with an injection nozzle which runs out into the mould hollow formed from the cavities, in particular a hot runner system with at least one hot runner nozzle.

Such an index plate tool is described for example in the patent publication DE-A-10 2006 037954 and DE-C-4127621. These patent publications are referred to concerning further details of this injection moulding technology.

A multi-component, in particular two-component injection moulding method can also be designed by way of a so-called cube injection moulding tool. This injection moulding method compared to the methods which have been mentioned above is characterised in that this comprises four working regions arranged in several planes. Different method steps are carried out in each of the working regions. These method steps can be: insertion of an interdental space cleaning element into the tool mould, a first injection moulding step, a second injection moulding step, cutting the interdental space cleaning element, cooling the mould part, ejecting the mould part. The planes of the working regions in particular are vertically aligned.

If an injection moulding step is carried out in one working region, then the plane corresponds to a mould partition plane for example. Suitable tool cavities are formed in the mentioned working region.

The cube injection moulding tool comprises a central tool body with four working regions, of which two in each case lie opposite one another and parallel to one another. The planes of adjacent working regions are in each case arranged at a right angle to one another. The central tool body can be cube-shaped.

The central tool body can be rotatable about one, in particular a vertical rotation axis. The planes of the processing regions are accordingly arranged around this rotation axis. In this case, the central tool body also forms the transfer device for the transfer of the preforms between the individual working stations or working regions.

The injection moulding tool can comprise a transfer device with mould part holders which can be extended out of the central tool body and retracted back into this, in a linear manner, in the case that the central tool body cannot be rotated. The mould part holders hold or mount the mould parts or preforms for the purpose of transfer between two working regions. The extended mould part holders are rotatable in particular about a vertical rotation axis, for the purpose of transferring the mould parts about a rotation axis.

The injection moulding tool further comprises tool bodies which can be linearly displaced to the working regions on the central tool body. If an injection moulding step is carried out in a working region, then the linearly displaceable tool body assigned to this likewise comprises cavities which unify with the tool cavities in the working region of the central tool body into closed injection moulding cavities.

Thus the interdental space cleaning element is inserted in a first working region which is arranged in a first plane, and the first plastic component injected.

The preforms can be cooled in a second working region which is assigned to a second plane. Moreover, one or more of the following working steps can be carried out in a second working region alternatively to the cooling or additionally to the cooling:
cutting the interdental space cleaning element:
attaching a label;
positive, non-positive or material attachment of a functional element, in particular one described above, such as interdental brush;
positive, non-positive or material attachment of additional parts, e.g. by way of a clip connection;
attaching a cap for the toothpick;
assembly steps, such as pivoting parts of the flosser along film hinges, assembling the interdental space cleaning element if this has not been peripherally injected around in a first station, assembling a part with the interdental space cleaning element to a further part of the grip;
treatment steps on the preform;
treating the interdental space cleaning element, in particular the dental thread, such as e.g. coating with wax, with an active ingredient (aroma). The coating can be effected by way of spraying, immersing, tampon-printing;
blowing hot air for making the dental thread fluffy;
melting the thread ends, in order e.g. to carry out a mushroom-like end.

A second plastic component can be injected in a third working region which is arranged in a third plane arranged for example parallel to the first one and at right angles to the second. The second plastic component is injected around the first plastic component or penetrates it.

The finished flosser can be removed from the injection moulding device in a fourth working region, which is preferably arranged in a fourth plane which is parallel to the second one.

The individual preforms or the completed flossers in particular are moved from one to the next working region by way of a movably arranged transfer device of the injection moulding tool. The working regions one and three, as well as two and four in particularly run simultaneously.

Such a cube tool is described for example in the patent publications WO-A-2007 082394 (cube injection moulding tool not rotatable) and EP-B-1 628 819 (rotatable cube injection moulding tool). These patent publications are referred to concerning further details of this injection moulding technology.

If the interdental space cleaning element, in particular a dental thread, is inserted into the tool mould, then this in particular is effected in the first working region, i.e. in the first step, before injecting the first component.

If the interdental space cleaning element is likewise injection moulded, then this is e.g. likewise effected in the first working region, i.e. in the first step. Thus the preform which forms the base body of the flosser, as well as the interdental space cleaning element can be injected in the first working region.

The two mould parts can be assembled or joined together in a second working region, i.e. in a second step. A cooling can also be effected in this step.

The injection moulding, in particular peripheral injection of a second component can be effected in a third working region, i.e. in the third step. The second injection moulding step can create the material-fit connection between the interdental space cleaning element and the preform.

The flosser can be removed from the mould in a fourth working region, i.e. in the fourth step.

According to an alternative embodiment, the interdental space cleaning element, in particular a dental thread can be inserted into the tool mould in a first working region, i.e. in the first step, before the injection of the first component.

Then two mould parts can be injected with a first component in the first working region, wherein the one mould part comprises the interdental space cleaning element.

The two mould parts can be assembled or led together in a second working region, i.e. in a second step. A cooling can also be effected in this step.

The injection moulding, in particular peripheral injection of a second component can be effected in a third working region, i.e. in the third step. The second injection moulding step can create the material connection between the two mould parts. An improved anchoring of the interdental space cleaning element can be achieved by way of a targeted selection of the geometry of the two mould parts.

The flosser can be removed from the mould in a fourth working region, i.e. in the fourth step.

The injection moulding technologies which are described above are characterised in that the preforms are transferred between different working regions. The preforms must be held by a transfer device with a holding mechanism for the transfer of these. The transfer device or its holding mechanism itself can form a part of a tool cavity.

Thus the transfer device can be designed such that the preform forming the later flosser is held in the region of the holder arms on transfer.

The preform can also comprise a holding notch, e.g. in the grip body. A holding notch in particular is suitable with an index tool or cube tool.

A further possibility for holding the preforms for the transfer between the stations of the injection moulding tools is the use of the thread recess for holding/mounting.

According to one variant, a first component is injection moulded in a first step in a first working region. A second component is injected in a second working region in a second step after transfer of the preform. This second component peripherally injects an interdental space cleaning element, such as a dental thread for example, which was previously inserted into the tool mould in the second working region.

The interdental space cleaning element is subsequently cut and the individual flossers are ejected.

The second component in particular can peripherally inject around the first component in the region of the holder arms and thus better fix the interdental space cleaning element, in particular a dental thread. The additional fixation for example can be achieved by a shrinkage effect which occurs on cooling.

The tooth cleaning apparatus preferably requires no further manufacturing steps after the injection moulding process, for achieving the functionality. Any occurring further manufacturing steps serve essentially only for packaging. Thus the finished tooth cleaning apparatus can be ejected from the injection moulding tool and fed to a packaging device in an inline manner, which is to say into the continuous manufacturing process.

The individual process steps can be coupled in a direct manner for a manufacture which is optimal with regard to costs. I.e. the flossers are packaged directly (inline production) after their completion.

The numerous aspects of the invention of the flosser as are described above can otherwise be infinitely combined with one another, without departing from the scope of the invention.

Figure 9B:
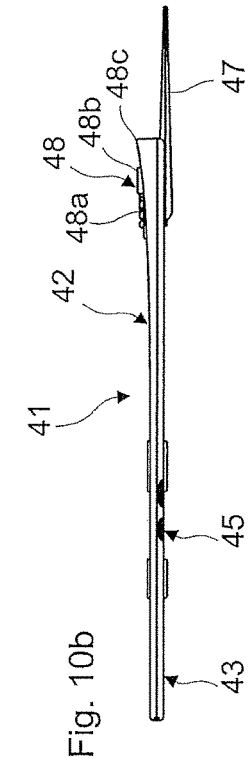
Figure 10A:
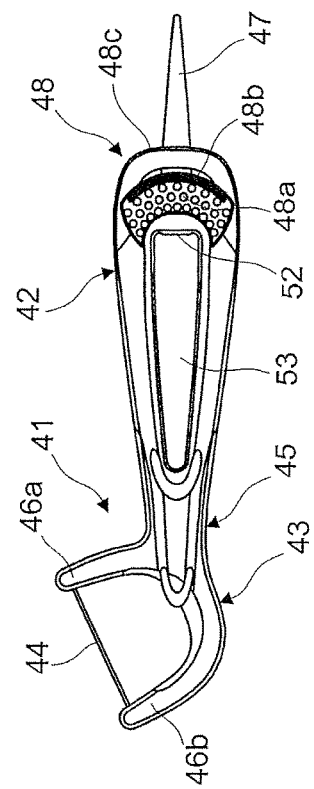
Figure 10B:
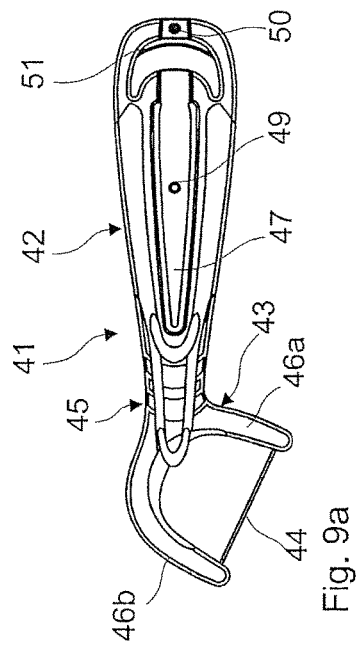
Figure 11A:
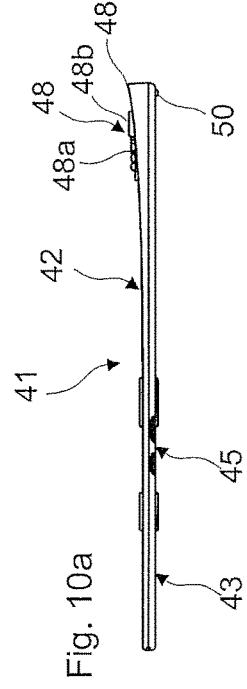
Figure 11B:
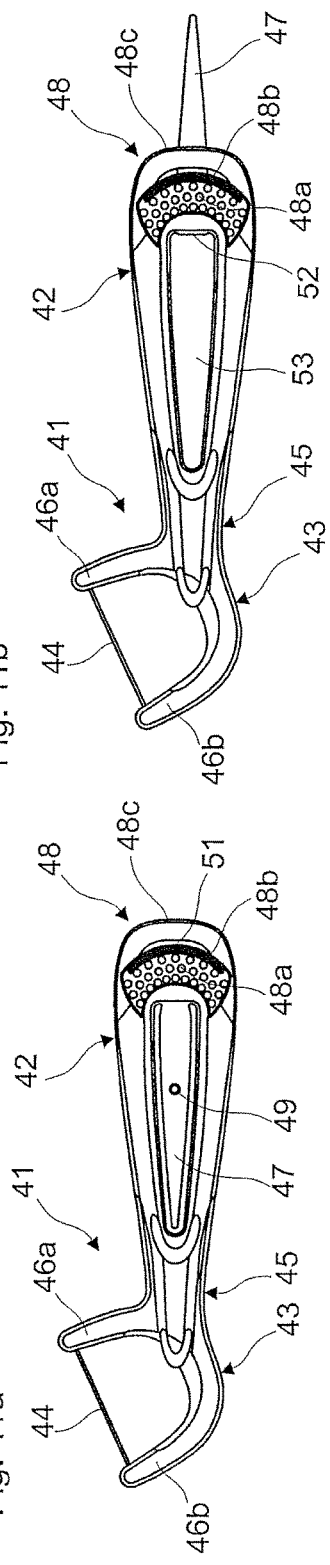
Figure 40:
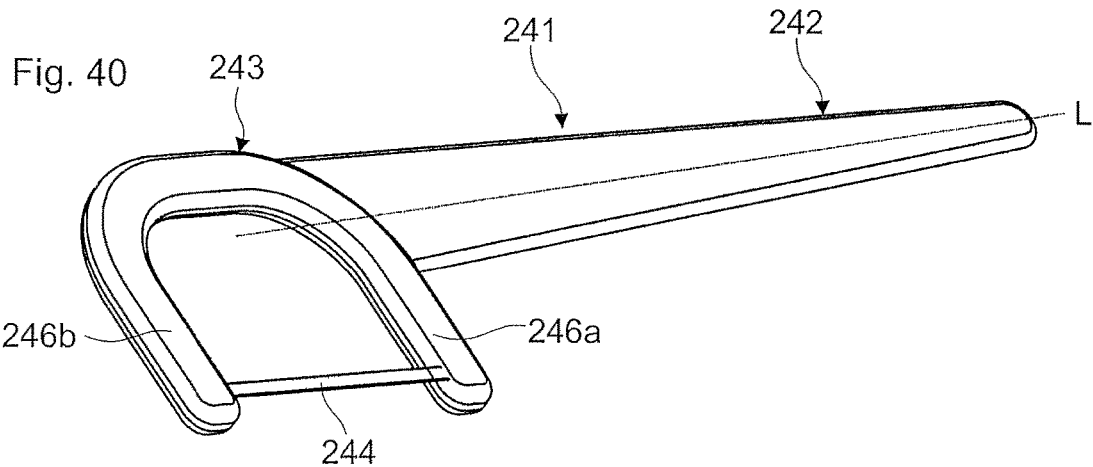
Figure 41:
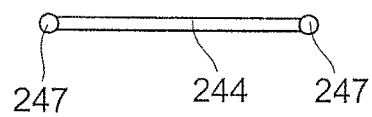
Figure 42:
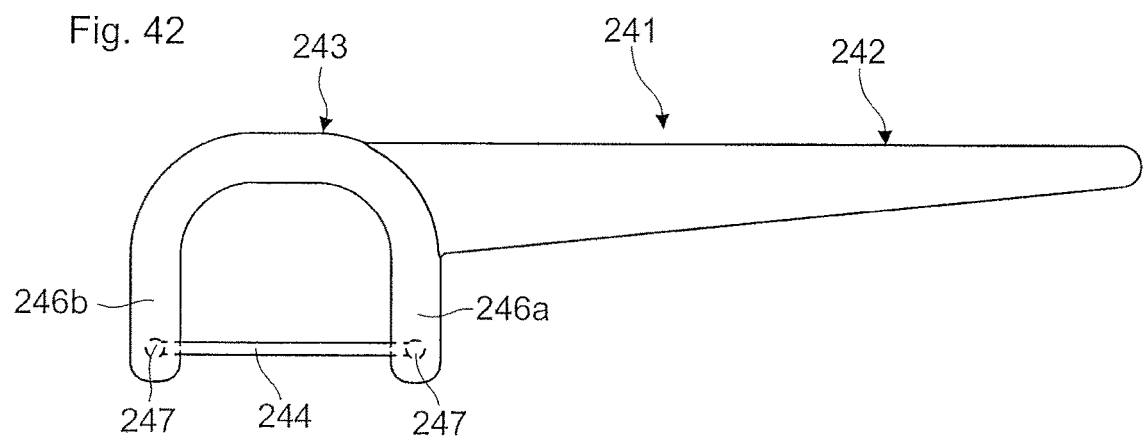
Figure 48:
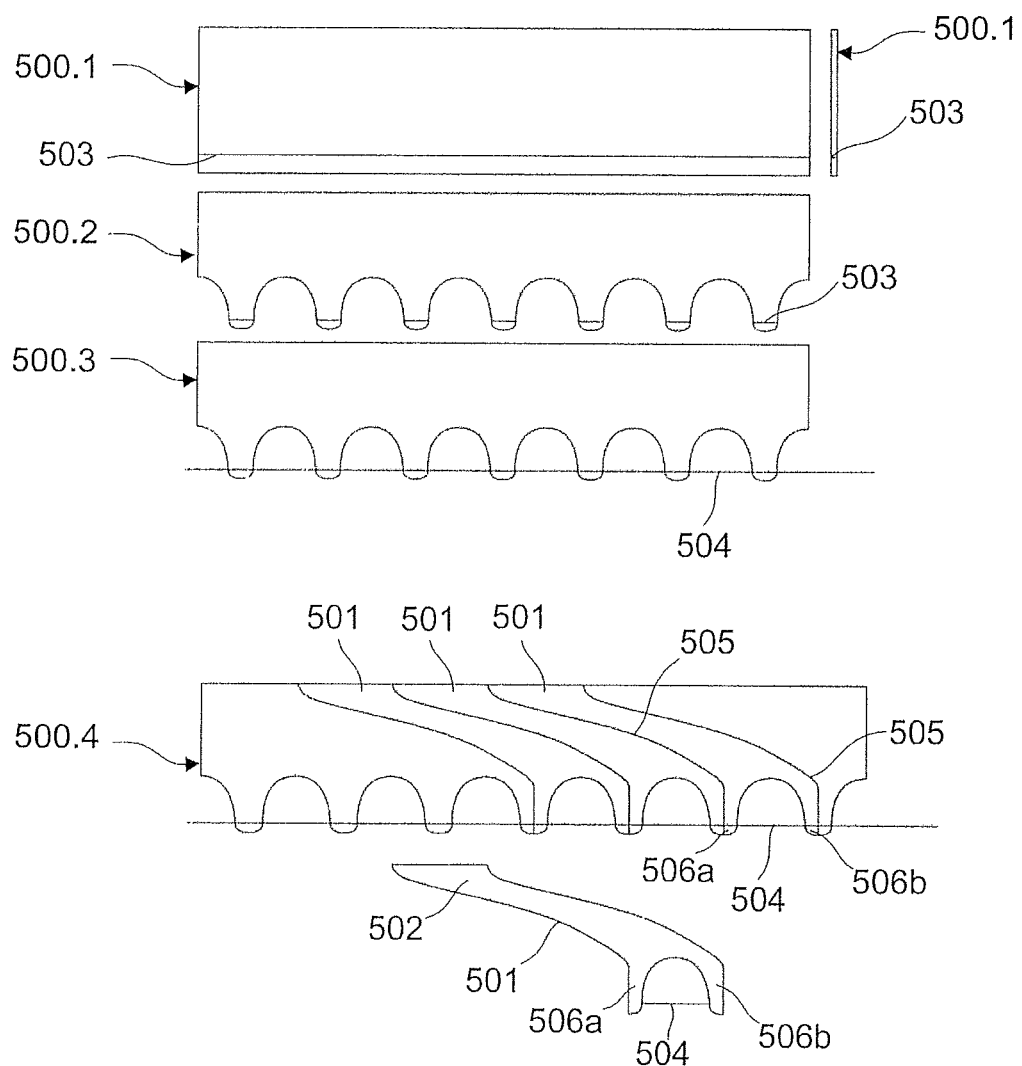

The subject-matter of the invention is hereinafter described in more detail by way of preferred embodiment examples which are represented in the accompanying drawings. In these are shown schematically in:

FIGS. 1a-1b: a plan view of the front side of a first embodiment of a flosser;

FIGS. 2a-2b: a lateral view of the flosser according to FIGS. 1a and 1b;

FIGS. 3a-3b: a plan view of the rear side of the flosser according to FIGS. 1a, 1b and 2a, 2b;

FIGS. 4a-4b: a perspective view from the front side and rear side of the flosser according to FIGS. 1a, 1b, 2a, 2b and 3a, 3b;

FIGS. 5a-5b: a plan view onto the front side of a second embodiment of a flosser;

FIGS. 6a-6b: a lateral view of the flosser according to FIGS. 5a and 5b;

FIGS. 7a-7b: a plan view onto the rear side of the flosser according to FIGS. 5a, 5b and 6a, 6b;

FIGS. 8a-8b: a perspective view from the front side and rear side of the flosser according to FIGS. 5a, 5b, 6a, 6b and 7a, 7b;

FIGS. 9a-9b: a plan view onto the front side of a third embodiment of a flosser;

FIGS. 10a-10b: a lateral view of the flosser according to FIGS. 9a and 9b;

FIGS. 11a-11b: a plan view of the rear side of the flosser according to FIGS. 9a, 9b and 10a, 10b;

FIGS. 12a-12b: a perspective view from the front side and rear side of the flosser according to FIGS. 9a, 9b, 10a, 10b and 11a 11b;

FIGS. 13a-13b: a plan view onto the front side of a fourth embodiment of a flosser;

FIGS. 14a-14b: a lateral view of the flosser according to FIGS. 13a and 13b;

FIGS. 15a-15b: a plan view onto the rear side of the flosser according to FIGS. 13a, 13b and 14a, 14b;

FIGS. 16a-16b: a perspective view from the front side and rear side of the flosser according to FIGS. 13a, 13b, 14a, 14b and 15a, 15b;

FIGS. 17a-17b a plan view onto the front side of a fifth embodiment of a flosser;

FIGS. 18a-18b a lateral view of the flosser according to FIGS. 17a and 17b;

FIGS. 19a-19b a plan view onto the rear side of the flosser according to FIGS. 17a, 17b and 18a, 18b;

FIGS. 20a-20b a perspective view from the front side and rear side of the flosser according to FIGS. 17a, 17b, 18a, 18b and 19a, 19b;

FIGS. 21a-21b: a plan view onto the front side of a sixth embodiment of a flosser;

FIGS. 22a-22b: a lateral view of the flosser according to FIGS. 21a and 21b;

FIGS. 23a-23b: a plan view onto the rear side of the flosser according to FIGS. 21a, 21b and 22a, 22b;

FIGS. 24a-24b: a perspective view from the front side and the rear side of the flosser according to FIGS. 21a, 21b, 22a, 22b and 23a, 23b;

FIG. 25a: a plan view onto the front side of a seventh embodiment of a flosser;

FIG. 25b: a lateral view of the flosser according to FIG. 25a;

FIG. 26a: a plan view onto the rear side of the flosser according to FIGS. 25a and 25b;

FIG. 26b: a cross-sectional view through the polishing element according to FIG. 26a;

FIGS. 27a-27b: a perspective view from the front side and rear side of the flosser according to FIGS. 25a, 25b, 26a, and 26b;

FIG. 28a: a plan view onto the front side of an eighth embodiment of a flosser;

FIG. 28b: a lateral view of the flosser according to FIG. 28a;

FIG. 28c: a plan view onto the rear side of the flosser according to FIGS. 28a and 28b;

FIGS. 29a-29b: a perspective view from the front side and rear side of the flosser according to FIGS. 28a to 28c;

FIG. 30a: a plan view onto the front side of a ninth embodiment of a flosser;

FIG. 30b: a lateral view of the flosser according to FIG. 30a;

FIG. 30c: a plan view onto the rear side of the flosser according to FIGS. 30a and 30b;

FIGS. 31a-31b: a perspective view from the front and rear side of the flosser according to FIGS. 30a to 30c;

FIG. 32a: a plan view of a tenth embodiment of a flosser in its passive position;

FIG. 32b: a lateral view of the flosser according to FIG. 32a;

FIG. 32c: a perspective view of the flosser according to FIGS. 32a and 32b;

FIG. 33a: a plan view of the flosser according to FIG. 32, folded into its functional position;

FIG. 33b: a lateral view of the flosser according to FIG. 33a;

FIG. 33c: a perspective view of the flosser according to FIGS. 33a and 33b;

FIG. 34a: a plan view of the front side of an eleventh embodiment of a flosser in the passive position;

FIG. 34b: a lateral view of the flosser according to FIG. 34a;

FIG. 34c: a plan view of the rear side of the flosser according to FIGS. 34a and 34b;

FIG. 35a: a plan view of the front side of the flosser according to FIG. 34 in the part-assembled position;

FIG. 35b: a lateral view of the flosser according to FIG. 35a;

FIG. 35c: a plan view of the rear side of the flosser according to FIGS. 35a and 35b;

FIG. 36a: a perspective view of the flosser according to FIG. 34 in the passive position;

FIG. 36b: a perspective view of the flosser according to FIG. 35 in the part-assembled position;

FIG. 36c: a perspective view of the flosser in the functional position;

FIG. 37a: a front view of the flosser according to FIG. 36c;

FIG. 37b: a plan view of the flosser according to FIG. 36c and FIG. 37c;

FIG. 37c: a rear side view of the flosser according to FIG. 36c, FIG. 37a and FIG. 37b;

FIG. 38: a plan view of the front side of a twelfth embodiment of a flosser;

FIG. 39a: a perspective view of the flosser according to FIG. 38;

FIG. 39b a perspective view of the flosser according to FIG. 39a in a non-assembled condition;

FIG. 40: a perspective view of a thirteenth embodiment of a flosser;

FIG. 41: a plan view of the interdental space cleaning element of a flosser according to FIG. 40;

FIG. 42: a plan view of the front side of the flosser according to FIG. 40;

FIGS. 43 to 47: different embodiments of dental threads, in each case in a lateral view and in a cross-sectional view;

FIG. 48: a plan view of a further embodiment of a flosser in different production stages;

FIG. 49: a plan view of a further embodiment of a flosser in different production stages;

FIG. 50: a plan view of a further embodiment of a flosser;

FIG. 51: a plan view of a further embodiment of a flosser;

FIG. 52: a plan view of a further embodiment of a flosser;

FIG. 53: a plan view of a further embodiment of a flosser;

FIG. 54a: a plan view onto the front side of a further embodiment of a flosser;

FIG. 54b: a lateral view of the flosser according to FIG. 54a;

FIG. 55a: a plan view onto the rear side of the flosser according to FIGS. 54a and 54b;

FIG. 55b: a cross-sectional view through the polishing element according to FIG. 55a;

FIGS. 56a-56b: a perspective view from the front side and rear side of the flosser according to FIGS. 54a, 54b, 55a and 55b.

Basically, the same parts in the figures are provided with the same reference numerals. The described embodiment examples are exemplary for the subject-matter of the invention and have no limiting effect.

The embodiment example according to FIGS. 1 to 4 shows a flosser 1 which is manufactured of a hard component. The embodiment examples according to FIGS. 5 to 8, 9 to 12 and 13 to 16 in each case show a flosser which comprises a hard component as well as a soft component. The soft component is thereby designed on both sides of the flosser 1. It is the case for all embodiments that the specified soft components can also be substituted by hard components.

The flosser 1, 21, 41, 61 according to the embodiments according to FIGS. 1 to 4, FIGS. 5 to 8, FIGS. 9 to 12 and FIGS. 13 to 16 comprises a grip body 2, 22, 42, 62 and a holder 3, 23, 43, 63 which is connected to the grip body 2, 22, 42, 62 via a neck section 5, 25, 45, 65. The grip body 2, 22, 42, 62 is designed in a flat manner. I.e., its length and width are significantly greater than its height. The holder 3, 23, 43, 63 comprises a first and second holder arm 6a, 6b; 26a, 26b; 46a, 46b; 66a, 66b which are connected to one another via a bow section.

A dental floss 4, 24, 44, 64 extends between the two holder arms 6a, 6b; 26a, 26b; 46a, 46b; 66a, 66b. The dental floss 4, 24, 44, 64 is connected to the holder arms 6a, 6b; 26a, 26b; 46a, 46b; 66a, 66b via connection locations. The holder arms 6a, 6b; 26a, 26b; 46a, 46b; 66a, 66b are angled (bent) with respect to the longitudinal axis L of the grip body 2, 22, 42, 62. Grip surfaces for the fingers are formed in the neck section 5, 25, 45, 65.

The grip body 2, 22, 42, 62 forms two arm sections, which enclose a closed intermediate space 13, 33, 53, 73. A toothpick 7, 27, 47, 67 is arranged in this intermediate space 13, 33, 53, 73, in its passive position. The toothpick 7, 27, 47, 67 in the passive position lies in the plane of the grip body 2, 22, 42, 62 and is aligned in its longitudinal axis L. The toothpick 7, 27, 47, 67 forms a cleaning tip which is directed to the holder 3, 23, 43, 63 in the passive position. The toothpick 7, 27, 47, 67 with its end which is remote from the cleaning tip is connected to the grip body 2, 22, 42, 62 via a film hinge 12, 32, 52, 72. The toothpick 7, 27, 47, 67 forms two base surfaces which lie opposite one another, as well as two laterally arranged narrow side edges.

The side edges including the cleaning tip are laterally framed or encompassed by the arm sections of the grip body 2, 22, 42, 62. The pivot movement of the toothpick 7, 27, 47, 7 67 runs along the longitudinal axis L of the grip body 2, 22 42, 62, to its end section which lies opposite the holder 3, 23, 43, 63. Accordingly, the rotation axis of the film hinge 12, 32, 52, 72 is arranged perpendicularly to the longitudinal axis L.

The toothpick 7, 27, 47, 67 with its base surfaces lies in the plane of the grip body 2, 22, 42, 62, in the passive position as well as in the functional position. The pivot angle is accordingly 180°. The toothpick 7, 27, 47, 67 in its functional position is applied over the end section of the grip body.

An opening 9, 29, 49, 69 is arranged on the base surface of the toothpick 7, 27, 47, 67. A nub 10, 30, 50, 70 corresponding to the opening 9, 29, 49, 69 is arranged on the grip body 2, 22, 42 62. The film hinge 12, 32, 52, 72 is located at half the distance between the nub 10, 30, 50, 70 and the opening, so that the nub 10, 30, 50, 70 and the opening 9, 29, 49, 69, on pivoting the toothpick 7, 27, 47, 67 about the hinge 12, 32, 52, 72 into its functional position, meet one another or lie over one another on reaching the functional position. The nub 10, 30, 50, 70 locks in the opening 9, 29, 49, 69 of the toothpick 7, 27, 47, 67 with a positive fit. The thus arising positive connection holds the toothpick 7, 27, 47, 67 in its functional position.

The grip body 2, 22, 42, 62 in the mentioned end section forms a groove-like recess which is orientated in the longitudinal axis L of the grip body 2, 22, 42, 62. The nub 10, 30, 50, 70 is arranged in the groove-like recess. The toothpick is positioned in the groove-like recess on pivoting the toothpick 7 27, 47, 67 into its functional position. The width and height of the groove-like recess is designed such that the toothpick 7, 27, 47, 67 fits into the groove-like recess in a flush or approximately flush manner, and the toothpick section overlapping with the grip body is at least partly sunk in the groove-like recess.

The arrangement of the nub 10, 30, 50, 70 and the opening 9, 29, 49, 69 can also be the other way round. Thus the nub can be arranged on the toothpick and the opening or a corresponding recess in the grip body. The arrangement of the nub 10, 30, 50, 70 in the recess in the grip body entails the advantage that this is arranged in a somewhat protected manner and essentially does not project out of the body.

The grip body 2, 22, 42, 62 furthermore in its end sections which lies opposite the holder 3, 23, 43, 63 forms an opening 11, 31, 51, 71 which is arranged between the film hinge 12, 32, 52, 72 and the free end.

Moreover, a tongue cleaner 8, 28, 48, 68 is arranged in the mentioned end section. The tongue cleaner 8, 28, 48, 68 is arranged between the film hinge 12, 32, 52, 72 and the free end. The tongue cleaner 8, 28, 48, 68 is arranged on that side of the end section which lies opposite the side, on which the toothpick 7, 27, 47, 67 bears in its functional position.

In its functional position, the toothpick 7, 27, 47, 67 is arranged above the tongue cleaner 8, 28, 48, 68. The elements considered over the cross section lie directly above one another, The nub 10, 30, 50, 70 can be formed on an element of the tongue cleaner 8, 28, 48, 68, for example on the rear side of the scraper edge 8b, 28b, 48c, 68c.

The scraper edge 8b, 28b, 48c, 68c in cross section is preferably formed completely of hard material. In any case, the side of the scraper edge 8b, 28b, 48c, 68c which comprises the nub 10, 30, 50, 70 is formed of hard material. The actual scraper edge 8b, 28b, 48c, 68c in the individual case in cross section can be completely of soft material or of a hard material core and a soft material coating.

The tongue cleaner 8 according to the embodiment example according to FIG. 1 to 4 comprises cleaning elements in the form of nubs 8a which are arranged in a nub field and the scraper edge 8b. The nub field is arranged on the grip body 2, between the film hinge 12 and the opening 11.

A scraper edge 8b as a further element of the tongue cleaner 8 is arranged at the free end. The design of the nubs in the region of the grip likewise entails the advantage that these can serve for the use of the flosser as an anti-slip element, and the tooth cleaning apparatus can be securely held by the fingers during use.

The tongue cleaner 28 according to the embodiment example according to FIG. 5 to 8 comprises cleaning elements in the form of lamellae 28a which are arranged one after the other along the longitudinal axis L, and a scraper edge 28b. The lamellae 28a are aligned transversely to the longitudinal axis L of the grip body 22. The lamellae 28a are arranged over the opening 31. A scraper edge 28b as a further element of the tongue cleaner 28 is arranged at the free end. A tongue cleaner 28 thus consists of a combination of lamellae 28 and a scraper edge 28b.

A sickle-shaped damping element 35 is moreover arranged in the bow section of the holder 23, between the two holder arms 26a, 26b. The damping element 35 consists of a soft component.

The tongue cleaner 48 according to the embodiment example according to FIG. 9 to 12 comprises cleaning elements in the form of nubs 48a which are arranged in a nub field, combined with a soft-elastic lamella 48b as well as a scraper edge 48c. The further cleaning element in the form of a lamella 48b which extends transversely to the longitudinal axis L of the grip body 42 and delimits the nub field to this side is arranged at the end of the nub field which is remote from the holder 43. The nubs 48a and the lamella 48b are arranged over the opening 51 and are designed from a hard or soft component, preferably a soft component. A scraper edge 48c as a further element of the tongue cleaner 48 is arranged at the free end.

The tongue cleaner 68 according to the embodiment example according to FIG. 13 to 16 comprises cleaning elements in the form of nubs 68a, lamellae 68b and a scraper edge 68c. The nubs 68a are arranged in a nub field. The lamellae 68b are arranged one after the other along the longitudinal axis L of the grip body 62 and extend transversely to the longitudinal axis L. The lamellae 68b in the mentioned end section are arranged between the film hinge 72 and the nub field, above the opening 71. The nubs 68a are arranged in the end section between the free end and the lamellae 68b or between the scraper edge 68c and the lamellae 68b. The scraper edge 68c is located at the free end of the body.

The flosser 81, 101 according to the embodiments according to FIG. 17 to 20 and FIG. 21 to 24 comprises a grip body 82, 102 and a holder 83, 103 which is connected to the grip body 82, 102 via a neck section 85, 105. The grip body 82, 102 is designed in a flat manner. I.e., its length and width are significantly larger than its height.

The holder 83, 103 comprises a first and a second holder arm 86a, 86b; 106a, 106b. A dental floss 84, 104 extends between the two holder arms 86a, 86b; 106a, 106b. The dental floss 84, 104 is connected to the holder arms 86a, 86b; 106a, 106b via connection locations. The holder arms 86a, 86b; 106a, 106b are angled or bent with respect to the longitudinal axis L of the grip body 82, 102.

The grip body 82, 102 forms a laterally arranged recess 93, 113. A toothpick 87, 107 is arranged in this recess 93, 113 in its passive position. The toothpick 87, 107 forms two base surfaces which lie opposite one another as well as two laterally arranged narrow side edges.

The one exposed side edge of the toothpick 87, 107 thereby forms a section of the outer contour of the grip body 82, 102. The toothpick 87, 107 in the passive position lies in the plane of the grip body 82, 102 and is aligned essentially in its longitudinal axis L. The toothpick 87, 107 forms a cleaning tip which in the passive position is directed towards the holder 83, 103. The toothpick 87, 107 with its end remote to the cleaning tip is connected to the grip body 82, 102 via a film hinge 92, 112.

The second side edge of the toothpick 87, 107 is adjacent the grip body 82, 102. The pivot movement of the toothpick 87, 107 runs along the longitudinal axis L of the grip body 82, 102 to its end section which lies opposite the holder 83, 103. Accordingly, the rotation axis of the film hinge 92, 112 is arranged transversely to the longitudinal axis L.

The toothpick 87, 107 in the passive position as well as in the functional position lies in the plane of the grip body 82, 102. The pivot angle is accordingly 180°. The toothpick 87, 107 in its functional position is applied over the end section of the grip body 82, 102.

A nub 89, 109 is arranged on the base surface of the toothpick 87, 107. An opening 90, 110 corresponding to the nub 89, 109 is arranged on the grip body 82, 102. The film hinge 92, 112 is located at half the distance between the nub 89, 109 and the opening 90, 110, so that on pivoting the toothpick 87, 107 into its functional position about the film hinge 92, 112, the nub 89, 109 and the opening 90, 110 meet or lie over one another on reaching the functional position. The nub 89, 109 of the toothpick 87, 107 snaps or clicks in the opening 90, 110 of the grip body 82, 102 with a positive fit. The thus arising connection holds the toothpick 87, 107 in its functional position.

The arrangement of the nub 89, 109 and the opening 90, 110 can also be the other way round. Thus the nub can be arranged on the grip body, and the opening or a corresponding recess can be arranged on the toothpick.

An arched lamella or scraper edge 94, 114 is arranged around the round terminating contour of the end section of the grip body 82, 102, in the end section of the grip body 82 which lies opposite the holder 83, 103. The lamella or scraper edge 94, 114 is arranged on that side of the end section which lies opposite the side, on which the toothpick 87, 107 bears in its functional position. The lamella or scraper edge 94, 114 forms a tongue cleaner which is supplemented with a second lamella 116.

A grip surface 88 is which is formed by a nub field is moreover formed on the mentioned end section of the grip body 82, 102. The grip surface 88 is arranged on that side of the end section, on which the toothpick 87, 107 bears in its functional position.

The holder 83, 103 moreover comprises a damping element 95, 115 in the bow section between the two holder arms 86a, 86b; 106a, 106b.

According to the embodiment example according to FIG. 17 to 20, the damping element 95 is designed in a disc-like manner and has a convex contour towards the dental floss 84. The damping element 95 is preferably formed from of a soft component.

According to the embodiment example according to FIG. 21 to 24, the damping element 115 is designed as a bow which has a convex curvature towards the dental floss 104. The bow is flexible per se and is preferably formed from a soft component.

The embodiment example according to FIG. 21 to 24 moreover comprises a second lamella 116 which is likewise arranged in the end section on the side of the first lamella or scraper edge 114. The second lamella 116 in the longitudinal axis L is arranged in a manner offset towards the holder 103 with respect to the first lamella or scraper edge 114. The second lamella 116 is led over an opening 111 in the end section. Nubs of the nub filed are arranged on the second lamella 116 on the opposite side of the opening 111. These nubs form a nub row.

The flosser 121 according to the embodiment example according to FIGS. 25a, 25b, 26a, 26b, 27a and 27b comprises a grip body 122 and a holder 123 which is connected to the grip body 122. The grip body 122 is designed in a flat manner. I.e., its length and width are significantly greater than its height. The holder 123 comprises a first and second holder arm 126a, 126b. A dental floss 124 extends between the two holder arms 126a, 126b. The dental floss 124 is connected to the holder arms 126a, 126b via connection locations. The holder arms 126a, 126b are arcuate with respect to the longitudinal axis L of the grip body 122.

The grip body 122 forms two arm sections which enclose a closed intermediate space 133. The arm sections correspond to the extension of the holder arms 126a, 126b. The arm sections together with the holder arms 126a, 126b form a sickle-like curvature. The transition from the holder 123 to the grip body 122 is formed by a connection web 135 which connects the two holder arms 126a, 126b to one another and delimits the intermediate space 133 to the holder 123. The arm sections run together into an end section, at the end of the grip body 122 which is remote from the holder 123.

A toothpick 127 is arranged in the mentioned intermediate space 133 in its passive position. The toothpick 127 in the passive position lies in the plane of the grip body 122 and is aligned in its longitudinal axis L. The toothpick 127 forms a cleaning tip which is directed away from the holder 123 towards the end section of the grip body 122. The toothpick with its end remote to the cleaning tip is connected to the connection web 135 via a film hinge 132. The toothpick 127 forms two opposite base surfaces as well as two laterally arranged narrow side edges.

The side edges including the cleaning tip are framed by the arm sections of the grip body 122. The pivot movement of the toothpick 127 runs essentially along the longitudinal axis L of the grip body 122 towards the holder 123. The cleaning tip is thereby pivoted towards the holder 123. Accordingly, the rotation axis of the film hinge 132 is arranged at an angle to the longitudinal axis L of the grip body 122.

The toothpick 127 lies in the plane of the grip body 122 in the passive position as well as in the functional position. The pivot angle accordingly is 180°. The toothpick 127 in its functional position is applied over the connection web 135. The toothpick lies above the dental floss 124 in its functional position on account of this.

The grip body 122 moreover in its end section which lies opposite the holder 123 comprises a polishing element 128. The polishing element 128 comprises a bump-like polishing part 128b which is attached on a base body 128a and which for example is of a soft component. The base body 128a is part of the grip body 122 or part of its end section. According to a variant which is not shown, the polishing element 128 is designed as a membrane and is only carried by a base body 128a in the end regions. The polishing element 128 is thus very flexible and adaptable with respect to the surface.

The flosser 141 according to the embodiments according to FIGS. 28 and 29 comprises a grip body 142 and a holder 143 which is connected to the grip body 142 via a neck section 145. The holder 143 and the neck section 145 are designed as sheet components. A sheet component in this description means that the length and width are significantly greater than the height of the component.

The grip body 142 comprises an elongate volume body 153 with a bulgy middle part and two end sections which taper in a projectile-like manner. The volume body is designed as a hollow body which comprises round openings 151 through the body wall. The openings 151 accordingly form passages to the cavity. The presenet design of the volume body 153 amongst other things serves for the weight reduction and material saving. The holder 143 is connected to the volume body 153 via the neck section 145.

A mounting element 154 which is likewise designed as a sheet component is arranged at that end section of the volume body 153 which is arranged opposite to the holder 143.

The holder 143 comprises a first and second holder arm 146a, 146b which are connected to one another via a bow section. An interdental space cleaning element 144 in the form of a fibre body extends between the two holder arms 146a, 146b. The fibre body is connected to the holder arms 146a, 146b via connection locations. The holder arms 146a, 146b are angled with respect to the longitudinal axis L of the grip body 142.

A toothpick 147 is moreover arranged in the grip body 142. The toothpick 147 is connected to the mounting element 154 via a film hinge 152. The toothpick 147 forms two base surfaces which lie opposite one another as well as two laterally arranged narrow side edges.

The toothpick 147 in the passive position lies in the plane of the grip body 142 and is aligned in its longitudinal axis L. The one exposed side edge of the toothpick 147 in the passive position of the toothpick 147 forms a section of the outer contour of the grip body 142. The toothpick 147 forms a cleaning tip which is directed towards the holder 143 in the passive position. The second side edge of the toothpick 147 is adjacent the volume body 153.

The toothpick 147 is pivoted out of the longitudinal axis L of the grip body 142 into is functional position for use. The pivot movement of the toothpick 147 runs along the longitudinal axis L of the grip body 142 to its end section which lies opposite the holder 143. Accordingly, the rotation axis of the film hinge 152 is arranged transversely to the longitudinal axis L.

The flosser 161 according to FIGS. 30 and 31 comprises a grip body 162 and a holder 163 which is connected to the grip body 162 via a neck section 165. The flosser 161 is designed as a sheet component.

The grip body 162 comprises two arm sections 167a, 167b, which are connected to one another in an arched manner in the end section of the grip body 162 which is remote from the holder 163. The arm sections 167a, 167b unite into a loop-like formation, towards the neck section.

The holder 163 comprises a first and a second holder arm 166a, 166b which are connected to one another via a bow section. An interdental space cleaning element 164 in the form of a fibre body extends between the two holder arms 166a, 166b. The fibre body 164 is connected to the holder arms 166a, 166b via connection locations. The holder arms 166a, 166b are angled or bent with respect to the longitudinal axis L of the grip body 162.

The arm sections 167a, 167b of the grip body 162 run together into a type of knot in the neck section 165. The arm sections 167a, 167b are optically continued on the other side of the neck section 165 in the holder 163, as holder arms 166a, 166b.

The flosser according to FIGS. 30 and 31 with regard to the functioning principle is directed to those in FIGS. 32 and 33. A grip body 162 which is no longer flat, but is present as a volume shape can be bent by way of parts of the grip body 162 which are connected via film hinges 168a, 168b. If the two arm sections 167a, 167b are pressed against one another, then the film hinges 168a, 168b are actuated and the two arm sections are bent out of the plane, so that an angle sets in between the grip and the holder 163. This is not shown, but with regard to the principle is evident in FIG. 33.

The flosser 161 is manufactured in a flat manner and is deformed by the user if required.

The flosser 181 according to FIGS. 32 and 33 comprises a grip body 182 and a holder 183 which is connected to the grip body 182 via a connection section 185. The flosser 181 is designed as a sheet component.

The flosser 181 comprises a plurality of sheet segments 191a, 191b, 192a, 192b which are connected to one another via fold hinges 193 which are designed as film hinges. The sheet segments 191a, 191b, 192a, 192b in the passive position lie in one plane together with the holder 183 which is likewise designed in a two-dimensional or sheet-like manner.

The grip body 182 comprises two sheet segments in the form of a first and a second fold arm 192a, 192b which can be folded to one another along the longitudinal axis L of the grip body 182 via a fold hinge 193. The fold hinge 193 which is designed as a film hinge accordingly forms a fold axis, which runs parallel to the longitudinal axis L of the grip body 182.

The holder 183 comprises a first and a second holder arm 186a, 186b which are connected to one another via a bow section. An interdental space cleaning element 184 in the form of a fibre body extends between the two holder arms 186a, 186b. The fibre body 184 is connected to the holder arms 186a, 186b via connection locations.

A connection section 185 lies between the holder 183 and the grip body 182. This comprises two triangular sheet segments 191a, 191b which via fold hinges 193 are connected on the one hand to the fold arms 192a, 192b and on the other hand to the bow section of the holder arms 186, 186b. The triangular sheet segments 191a, 191b run to one another into a tip or point.

The grip body 182 can be brought from the passive position into a functional position, in which the flosser 181 is brought out of the plane into a three-dimensional shape, by way of folding the sheet segments 191a, 191b, 192a, 192b to one another along the fold hinges 193.

With this procedure, the fold arms 192a, 192b are bent downwards. Thereby, the holder 183 is likewise creased downwards with its holder arms 186a, 186b over the triangular sheet segments 191a, 191b and assumes its functional position.

The flosser 201 according to the embodiments according to FIG. 34 to 37 comprises a grip body 202 and a holder 203 which is connected to the grip body 202 via a connection section 205. The flosser 201 is designed as a sheet component.

The flosser 201 comprises a holder 203, onto which arms sections 211a, 211b of a grip body 202 are articulated via a connection section 205. The arm sections 211a, 211b are pivotably articulated on the connection section 205 via film hinges.

The sheet-like arm sections 211a, 211b in the passive position lie together with the holder 203 likewise designed in a surface-like manner, in one plane. The two arm sections 211a, 211b in this position lie in a common axis which corresponds to the longitudinal axis A1, A2 of the arm sections 211a, 211b (see FIG. 34a to 34c, 36a). The connection section 205 is hereby arranged between the arm sections 211a, 211b.

A connection pin 212 is arranged in a first arm section 211a. A receiving slot 213 running parallel to the longitudinal axis A2 of the arm section 211b is arranged in the second arm section 211b.

The holder 203 comprises a first and a second holder arm 206a, 206b which are connected to one another via a bow section. The bow section is an integral part of the connection section 205. An interdental space cleaning element 204 in the form of a thread body extends between the two holder arms 206a, 206b. The fibre body 204 is connected to the holder arms 206a, 206b via connection locations.

The first arm section 211a is pivoted to the second arm section 211b or vice versa, for bringing the flosser 201 from its passive position into its functional position, with which procedure the flosser 201 is brought out of the plane into a three-dimensional shape. With this procedure, the connection pin 212 meets the receiving slot 213 and locks into this. The arm sections 211a, 211b with this step are still aligned parallel to one another (see FIGS. 35a to 35c and 36b).

The connection pin 212 slides in the receiving slot 213 to the outer-lying slot end by way of setting up the two arm sections 211a, 211b out of the plane of the passive position. The two arm sections 211a, 211b together with the connection section 205 in a plan view form a triangular arrangement (see FIGS. 36c and 37a to 37c). With this procedure, the end regions of the arm sections 211a, 211b which lie remote to the connection section 205, are brought together. The flosser 201 is in its functional position in this position.

A further functional position is shown in FIG. 35. The flosser 201 in the locked-in situation can also assume this shown position of use.

The connection pin 212 can be moved in the receiving slot 213, so that apart from the shown positions of FIGS. 34 and 35, positions lying between these positions in the figures can also be realised.

The flosser 221 according to FIGS. 38 and 39 has an elongate grip body 222 and a holder 223 which is connected to the grip body 222. The holder 223 and the grip body 222 are designed as sheet components.

The holder 223 comprises a first and a second holder arm 226a, 226b which are connected to one another via a bow section. The holder arms 226a, 226b are bent with respect to the longitudinal axis L of the grip body 222.

An interdental space cleaning element 24 in the form of a fibre body extends between the two holder arms 226a, 226b (FIG. 38, 39a). The fibre body 224 is connected laterally in each case to a connection section 227. The two connection sections 227 each comprise a connection pin 228. The connection sections 227 are connected to the respective holder arm 226a, 226b via the connection pin 228. For this, the connection pin 228 of the connection section 227 positively engages into a corresponding recess 2299 at the face-side end of the respective holder arm 226a, 226b. The connection section 227 thereby forms a continuation of the holder arm 226a, 226b (FIG. 39a).

The fibre body 224, the connection sections 227 as well as the connection pins 228 are preferably designed in a single-part manner. The holder 223 and the grip body 222 are likewise preferably designed in a single-part manner.

An injection moulding method is particularly suitable for the manufacture. The manufacture can be effected in a single-component or multi-component method. Accordingly, the mentioned assembly components can consist of one or more plastic components.

The flosser 241 according to FIG. 40 to 42 comprises an elongate grip body 242 and a holder 243 which is connected to the grip body 242. The holder 242 and the grip body 242 are designed as sheet components.

The holder 243 comprises a first and second holder arm 246a, 246b which are connected to one another via a bow section. The holder arms 246a, 246b are angled (bent) with respect to the longitudinal axis L of the grip body 242.

An interdental space cleaning element 244 in the form of a fibre body (FIG. 40) extends between the two holder arms 246a, 246b. The fibre body 244 is connected laterally in each case to an anchoring element 247. The anchoring element 247 is designed in a spherical manner.

The fibre body 244 together with the anchoring element 247 is manufactured separately for example in a prior injection moulding step (FIG. 41). The previously separately manufactured fibre body 244, with the anchoring elements 247 is inserted into a tool mould on manufacture of the flosser 241. The grip body and the holder are subsequently injected in an injection moulding method. The holder arms 246a, 246b are hereby injected around the anchoring elements 247. The anchoring elements 247 are anchored in the holder arms 246a, 246b by way of this (FIG. 42).

The fibre body 244 and the anchoring elements 247 are preferably designed in a single-part manner. The holder 243 and the grip body 242 are preferably likewise designed in a single-part manner.

An injection moulding method is particularly suitable for manufacture. The manufacture can be effected in a single-component or multi-component method. Accordingly, the mentioned assembly components can consist of one or of several plastic components.

FIGS. 43 to 47 show different embodiments of interdental space cleaning elements.

Figure 43A:
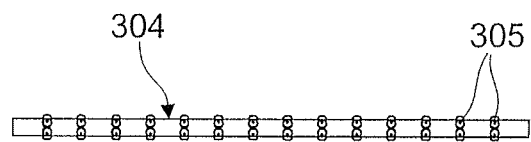
Figure 43B:
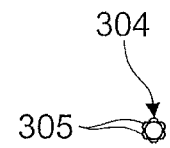

The interdental space cleaning element 304 according to FIGS. 43a and 43b comprises nubs 305 which are arranged annularly around a fibre body. A plurality of such annular nub arrangements are arranged at a distance to one another in the longitudinal direction of the fibre body.

Figure 44A:
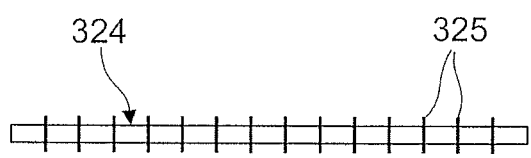
Figure 44B:
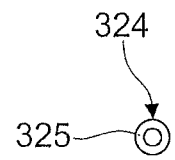

The interdental space cleaning element 324 according to FIGS. 44a and 44b comprises individual lamellae 325 which are formed in an annular manner about the fibre body. A plurality of such lamellae 325 are arranged at a distance to one another in the longitudinal direction of the fibre body.

Figure 45A:
Figure 45B:
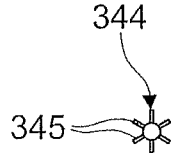

The interdental space cleaning element 344 according to FIGS. 45a and 45b comprises bristles 345 which are arranged annularly about the fibre body. A plurality of such annular bristle arrangements are arranged at a distance to one another in the longitudinal direction of the fibre body.

Figure 46A:
Figure 46B:
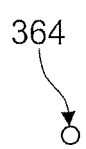

The interdental space cleaning element 364 according to FIGS. 46a and 46b is only formed from a fibre body and has no functional elements.

Figure 47A:
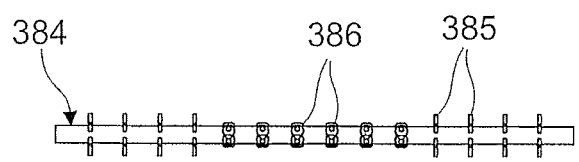
Figure 47B:
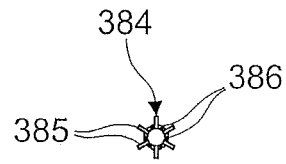

The interdental space cleaning element 384 according to FIGS. 47a and 47b comprises a combination of bristles 385 according to the embodiment example according to FIG. 45 and nubs 386 according to the embodiment example according to FIG. 43. A plurality of annular bristle arrangements and annular nub arrangements are thus alternately provided on the fibre body.

The interdental space cleaning elements together with their functional elements are preferably designed in a single-part manner. An injection moulding method is particularly suitable for manufacture. The manufacture can be effected in a single-component or multi-component method. Accordingly, the interdental space cleaning element with functional elements can consist of one or more plastic components.

The steps for the production of a further embodiment of a flosser 501 which are represented by way of FIG. 48, in a first step comprise the manufacture of a sheet-like (two-dimensional) extrusion component 500.1 of plastic. The extrusion profile 500.1 is designed in a tape-like manner and comprises a co-extruded longitudinal groove 503.

In a second step, arched recesses are punched out on the one longitudinal side of the extrusion profile 500.2 next to one another and at a distance to one another. Finger-like integral formations which form the later holder arms 506a, 506b result in each case between two arched recesses. The longitudinal groove 503 in now arranged in the form of longitudinal groove sections in the finger-like integral formations.

In a third step, the dental thread 504 is inserted into the longitudinal groove 503 of the extrusion profile 500.3 and is locked or fixed in this, e.g. by locking in, bonding etc.

In a fourth step, individual flossers 501 are punched out of the prepared extrusion profile 500.4 along the partition line 505. The partition line 505 leads through the finger-like integral formation and divides this in each case into a holder arm 506a, 506b of two adjacent flossers 501. The partition line 505 corresponds to the contour of the punching knife when punching out.

The punched-out flosser 501 comprises two holder arms 506a, 506b, a dental thread 504 running between these, and a grip body 502.

The steps for production of a further embodiment of a flosser 521 which are represented by FIG. 49, in a first step comprise the manufacture of two plastic films.

Identical arched recesses are punched out on the one longitudinal side of the films, next to one another and at a distance to one another, in a second step. The film sections 520.1, 520.2 arise. Finger-like integral formations which form the later holder arms 526a, 526b result between two arched recesses in each case.

The two film sections 520.1, 520.1 are led together and connected in a surfaced manner in a third step. The recesses in the two film sections 520.1, 520.2 are thereby aligned to one another, e.g. in a register.

The dental thread 524 in the region of the end sections of the finger-like integral formations is inserted between the two film sections 520.1, 520.1 and connected to the two film sections 520.1, 520.2, before or on leading together the two film sections 520.1, 520.2. The connection of the two film sections 520.1, 520.2 and accordingly the fastening of the dental thread can be effected by way of bonding or welding.

In a fourth step, the individual flossers 521 are punched out of the prepared extrusion profile 520.3 along the partition line 525. The partition line 525 leads through the finger-like integral formation and subdivides this in each case into a holder arm 526a, 526b of two adjacent flossers 521.

The punched-out flosser 521 comprises two holder arms 526a, 526b, a dental thread 525 running between these, and a grip body 522.

The embodiments of flossers 451, 481 which are shown in FIGS. 50 and 51 comprise a grip body 451, 482 as well as a holder 453, 483 which is arranged in an angled manner with respect to the grip body 452, 482. The holder 453, 483 comprises a first and a second holder arm 456a, 456b; 486a, 486b, between which a dental floss 454, 484 is tensioned.

The flosser 451, 481 moreover comprises a tension (pull) element 455, 485 in the form of a tension rib. The tension element 455, 485 with one end is arranged on the inner holder arm 456a, 486a of the holder 452, 483 which is angled with respect to the grip body 452, 482, said inner holder arm facing the grip body 452, 482. The tension element 455, 485 is attached on the grip body 452, 482 with the other end. The tension element 455, 485 spans the bending which is formed by the holder arm 456a, 486a and the grip body 452, 482. The tension element 455, 485 is injection moulded together with the flosser 451, 481.

The tension element 455, 485 on cooling and on account of shrinkage produces a tensile stress (tension) upon the holder arm 456a, 486a, and this tensile stress acts outwards away from the dental thread 454, 484. This tensile stress has the effect that the prestressing of the dental thread 454, 484 is retained or even increases, during the cooling.

The flosser 401, 431 according to the embodiments according to FIGS. 52 and 53 comprises a grip body 402, 432 and a holder 403, 433 which is connected to the grip body 402, 432. The holder 403, 433 comprises a first and a second holder arm 406a, 406b; 436a, 436b which are connected to one another via a bow section.

A dental floss 404, 434 extends between the two holder arms 406a, 406b; 436a, 436b. The holder arms 404, 434 are angled with respect to a longitudinal axis of the grip body 402, 432. The holder 403, 433 moreover comprises a damping element 405, 435.

The damping element 405 according to the embodiment according to FIG. 52 is arranged in an arched manner along the inner bow which is formed by the bow section and the holder arms 406a, 406b. The damping element is thereby attached on the bow section and the holder arms 406a, 406b. The damping element 405 moreover extends around the end sections of the holder arms 406a, 406b to their outer sides and covers the end-surfaces of the holder arms 406a, 406b. The damping element 405 is designed as a type of lip.

The damping element 435 according to the embodiment according to FIG. 53 is likewise arranged in an arched manner along the inner bow which is formed by the bow section and the holder arms 436a, 436b, i.e. along the bow section and the holder arms 436a, 436b. The damping element 435 moreover likewise extends around the end sections of the holder arms 436a, 436b to their outer sides and covers the end-surfaces of the holder arms 436a, 436b.

In contrast to the embodiment according to FIG. 52, the damping element 435 along the inner bow is formed as an exposed, lip-like element which is only fastened with its end sections on the outer side of the holder arms 436a, 436b in the region their end sections, on these holder arms.

The damping element 405, 435 according to FIGS. 52 and 53 consist for example of a soft component of the type mentioned above. The damping element 405, 435 in particular is injected in a separate injection moulding step.

The dental floss penetrates the damping element 405, 435 or is at least partly surrounded by this.

The flosser 121' according to the embodiment example according to FIG. 54a, 54b, 55a, 55b, 56a and 56b with the exception of the subsequently described features corresponds to the embodiment according to FIG. 25a, 25b, 26a, 26b, 27a and 27b. Accordingly, the same features are provided with identical reference numerals in the present figures. The description concerning the mentioned FIGS. FIG. 25a, 25b, 26a, 26b, 27a and 27b is referred to regarding the description of these features.

A further tongue cleaner is arranged on the inner holder arm 126a of the flosser 121' curved in a sickle-like manner, said holder arm facing the grip body 122. This tongue cleaner is designed in the form of a row of nubs 137 which are arranged in a row next to one another on the holder arm 126a.

The descriptions made with regard to the specific figures can of course also be conferred to the other figures, which show the same or similar fashions, and in which the fashions are not described with the same detail.

The invention claimed is:
1. A flosser comprising:
a holder having a first and a second holder arm, with an interdental space cleaning element extending therebetween, a grip body extending from the holder from a proximal end to a distal end, the grip body comprising:
- a first arm and second arm extending between respective first and second ends and defining a first intermediate space, the first ends located proximal to the proximal end of the grip body and the second ends located toward the distal end of the grip body;
- a tongue cleaner arranged to extend between the second ends of the first and second arms; and
- a scraper element located at the distal end of the grip body and arranged to extend between second ends of the first and second arms in a spaced relation to the tongue cleaner such that a second intermediate space is formed between the tongue cleaner and scraper element; and
- a toothpick arranged in the grip body and configured to be located within the first intermediate space in a passive position and is connected to the grip body via an integrated hinge,
- the integrated hinge is arranged on a side of the tongue cleaner facing toward the first intermediate space, so that the toothpick can be pivoted relative to the tongue cleaner toward an active position, where the toothpick is configured to extend from the hinge over the second intermediate space and beyond the distal end of the grip body.

2. A flosser according to claim 1, wherein the tongue cleaner comprises more than one lamellae, arranged to form a lamellae field.

3. A flosser according to claim 1, wherein the tongue cleaner comprises more than one nub, arranged to form a nub field.

4. A flosser according to claim 1, wherein the scraper element is manufactured integrally with the grip body.

5. A flosser according to claim 1, wherein the tongue cleaner comprises one or more lamellae and/or one or more nubs extending in a direction normal to a plane of the grip body.

6. A flosser according to claim 5, wherein the one or more lamellae are manufactured integrally with the grip body.

7. A flosser according to claim 5, wherein the one or more nubs are manufactured integrally with the grip body.

* * * * *